US006978933B2

(12) United States Patent
Yap et al.

(10) Patent No.: US 6,978,933 B2

(45) Date of Patent: Dec. 27, 2005

(54) CARD FOR SERVICE ACCESS

(75) Inventors: Sue-Ken Yap, New South Wales (AU); Andrew Timothy Robert Newman, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/363,217

(22) PCT Filed: Sep. 12, 2001

(86) PCT No.: PCT/AU01/01143

§ 371 (c)(1),
(2), (4) Date: Jun. 6, 2003

(87) PCT Pub. No.: WO02/23321

PCT Pub. Date: Mar. 21, 2002

(65) Prior Publication Data

US 2003/0191713 A1 Oct. 9, 2003

(30) Foreign Application Priority Data

Sep. 12, 2000 (AU) .............................................. PR0073
Jun. 8, 2001 (AU) .............................................. PR5593

(51) Int. Cl.[7] ................................................ G06K 7/08

(52) U.S. Cl. ....................... 235/451; 235/375; 235/380; 235/382; 235/487; 235/492

(58) Field of Search ................................ 235/375, 380, 235/382, 451, 487, 492, 494; 340/825.22; 463/44

(56) References Cited

U.S. PATENT DOCUMENTS

| | | | | |
|---|---|---|---|---|
| 4,843,223 A | | 6/1989 | Shino | 285/487 |
| 4,977,310 A | | 12/1990 | Studer et al. | 285/375 |
| 5,002,062 A | | 3/1991 | Suzuki | 128/696 |
| 5,015,830 A | | 5/1991 | Masuzawa et al. | 235/441 |
| 5,235,328 A | | 8/1993 | Kurita | 340/825.72 |
| 5,353,016 A | * | 10/1994 | Kurita et al. | 340/825.22 |
| 5,461,222 A | * | 10/1995 | Haneda | 235/492 |
| 5,601,489 A | * | 2/1997 | Komaki | 463/44 |
| 5,880,769 A | | 3/1999 | Nemirofsky et al. | 348/12 |
| 5,949,492 A | | 9/1999 | Mankovitz | 348/473 |
| 5,973,475 A | | 10/1999 | Combaluzier | 320/107 |
| 6,014,593 A | | 1/2000 | Grufman | 700/136 |
| 6,068,183 A | * | 5/2000 | Freeman et al. | 235/375 |
| 6,125,452 A | | 9/2000 | Kuriyama | 713/600 |

(Continued)

FOREIGN PATENT DOCUMENTS

| | | | |
|---|---|---|---|
| AU | 9528896 | 1/1996 | |
| AU | 53527/99 A | 4/2000 | |
| DE | 3637684 | 5/1987 | |
| EP | 0 469 581 | 2/1992 | |
| EP | 992953 A2 * | 4/2000 | G07F/7/10 |
| JP | 59-123986 | 7/1984 | |
| JP | 04-88547 | 3/1992 | |
| JP | 5-189624 | 7/1993 | |
| JP | U3071329 | 6/2000 | |
| WO | WO 95/35534 | 12/1995 | |
| WO | WO 96/32702 | 10/1996 | |
| WO | WO 02/23320 | 3/2002 | |
| WO | WO 02/23411 | 3/2002 | |

*Primary Examiner*—Steven S. Paik

(74) *Attorney, Agent, or Firm*—Fitzpatrick, Cella, Harper & Scinto

(57) ABSTRACT

An interface card comprising a substrate with indicia formed thereon. The card is configured for insertion into a read device. The read device has a substantially transparent touch sensitive membrane arranged to overlay the interface card so as to present the indicia to a user of the read device through the membrane. The read device also comprises a memory for storing a service identifier for identifying a service to be received from an external device according to indicia selected by the user and data stored in the memory and associated with the indicia.

30 Claims, 49 Drawing Sheets

U.S. PATENT DOCUMENTS

| | | | | | |
|---|---|---|---|---|---|
| 6,145,740 | A | | 11/2000 | Molano et al. | 235/380 |
| 6,229,694 | B1 | * | 5/2001 | Kono | 361/683 |
| 6,249,290 | B1 | | 6/2001 | Herndon et al. | 345/439 |
| 6,466,804 | B1 | | 10/2002 | Pecen et al. | 455/558 |
| 6,557,753 | B1 | | 5/2003 | Beaujard et al. | 235/375 |
| 6,557,768 | B2 | | 5/2003 | Yap et al. | 235/492 |
| 6,591,229 | B1 | | 7/2003 | Pattinson et al. | 702/189 |
| 6,686,908 | B1 | * | 2/2004 | Kobayashi | 345/173 |
| 6,735,456 | B2 | | 5/2004 | Cathey et al. | 455/574 |
| 6,760,014 | B1 | | 7/2004 | Liberman | 345/169 |
| 6,764,001 | B1 | | 7/2004 | Kawai et al. | 235/380 |
| 6,804,786 | B1 | | 10/2004 | Chamley et al. | 713/201 |
| 2001/0017616 | A1 | | 8/2001 | Kobayashi | 345/173 |
| 2003/0023554 | A1 | | 1/2003 | Yap et al. | 705/43 |
| 2004/0122753 | A1 | | 6/2004 | Yap et al. | 705/34 |

* cited by examiner

| Field Number | Description (Card Header) |
|---|---|
| Magic Number | Two byte magic number. A constant that specifies this as being a valid card. Currently defined as the ASCII value for 'i' followed by the ASCII value for 'C'. |
| Version | One byte version number. Each version increment specifies a change in the card layout that can not be read by a reader that is compatible with lower versions of the layout. This document describes version 1(0x01) of the card format. |
| Reserved | This data is reserved for future use. Its value must be set to zero. |
| Flags | Four bytes of flags for this card. (See Fig. 13.) All non-assigned bits must be zero. |
| Distinguishing ID | Eight byte distinguishing identifier. Distinguishing identifiers include two fields - service identifier and service-specific identifier. The service identifier is five bytes and identifies the service associated with the card. The service-specific identifier is three bytes of service-specific value. |
| Number of Objects | One byte. The number of objects following this header. Can be zero. |
| Checksum | Card checksum, 2 bytes. The card checksum is sixteen bit, unsigned integer sum of all data bytes on the card excluding the checksum. |

Fig. 12

| Name | Description (Pre-Card Flag Values) | Value (hex) |
|---|---|---|
| Don't Beep | Stops the reader unit providing audio feedback by default. If this bit is set the reader will not issue any audio feedback when a UI element is pressed unless that element has the "INVERT BEEP" flag set in the UI Element object | 0x0000 0001 |
| No MOVE Events | Stops the reader unit from acting as a mouse when the user moves their finger around on the reader surface | 0x0000 0002 |
| No Event Co-ordinates | Stops the reader unit from sending co-ordinates for PRESS, RELEASE and MOVE events. X and Y values are sent with value zero. | 0x0000 0004 |

Fig. 13

| Name | Description (Object Structure) | Length |
|---|---|---|
| Type | The type of object (see Fig. 16). | 1 byte |
| Object Flags | The general object flags that are associated with this object (see Fig. 15). Note: Additional flags specific to an object type are specified within the data field of the object. | 1 byte |
| Length | The length of the data following this object. This value can be zero. | 2 bytes |
| Data | The data associated with this object. The structure of this data is dependent on the type of object. | Variable |

Fig. 14

| Name | Description (Pre-Object Flag Values) | Value (hex) |
|---|---|---|
| Inactive | Indicates to the reader that the object is valid but is to be ignored regardless of it's type. | 0x01 |

Fig. 15

| Name | Description (Object Types) | Value (hex) |
|---|---|---|
| UI Object | A UICard button. | 0x10 |
| Card Data | Contains data that relates specifically to this card. | 0x20 |
| Fixed Length Data | An object that can be used to store fixed length blocks of data on the card. | 0x30 |
| Reader Insert | An object that can be used to give instructions to the reader when the card is inserted. | 0x40 |
| No Operation | An object that is used to fill blocks of empty space on the card. | 0x01 |
| No Operation (Single byte) | A single byte object that doesn't have a standard object header. Used to fill spaces on the card that are too small for a normal object header. | 0x00 |

Fig. 16

| Field | Description (User Interface Object Structure) | Size |
|---|---|---|
| Flags | Flags specific to this UI element on the card. | 1 byte |
| X1 | X value of the bottom-left hand corner co-ordinate of this object's rectangle. | 1 byte |
| Y1 | Y value of the bottom-left hand corner co-ordinate of this object's rectangle. | 1 byte |
| X2 | X value of the top-right hand corner co-ordinate of this object's rectangle. | 1 byte |
| Y2 | Y value of the top-right hand corner co-ordinate of this object's rectangle. | 1 byte |
| Data | Zero or more bytes of data associated with this object. The size of this field is determined by the object data size minus the combined size of the above fields. | Variable |

Fig. 17

| Name | Description (Flags for UI Object) | Value |
|---|---|---|
| Invert Beep Enable | This flag causes this button to have the inverse of the don't beep flag in the card header. If the Don't Beep flag isn't set in the header, this flag causes this button not to beep and vice versa. | 0x01 |
| Auto-repeats | Messages associated with this button automatically repeat when the press is held on the button. | 0x02 |
| Don't Send Data on Press | This causes this button not to send the data associated with this button in the press event. The default is to send the data associated with the button in the press event. | 0x04 |
| Don't Send Data on Release | This causes this button not to send the data associated with this button in the release event. The default is to send the data associated with the button in the release event. | 0x0a |

Fig. 18

| Field | Description (Message Header Format) | Bytes |
|---|---|---|
| Preamble | Preamble to the message. Value is always 0xAA 0x55 (bit sequence 10101010 01010101). This is to make it easier for the EM to find the beginning of a message. | 2 |
| Version | The version of the UICard IR message protocol this messages uses. This version of the protocol is version 1(0x01 in the version field.) | 1 |
| Type | Type of message. This is one of the values given in Fig. 20 | 1 |
| Reader ID | The 16 bit id of the reader that sent the message. This number is a pseudorandom generated number that is changed when the battery is replaced in the reader. This is needed to distinguish readers when multiple readers are being used with applications. | 2 |
| Service | Service identifier as stored on the card. | 5 |
| Service-specific | Service-specific identifier as stored on the card. | 3 |

Fig. 19

| Name | Description (Message Type Codes) | Code |
|---|---|---|
| INSERT | A card has been inserted into the reader. | 'I' |
| REMOVE | The card has been removed from the reader. | 'E' |
| PRESS | The touch panel has been pressed. | 'P' |
| RELEASE | The press on the touch panel has been released. | 'R' |
| MOVE | The press position has moved but the press has not been released. | 'M' |
| BADCARD | A card had been inserted however it has not passed validation | 'B' |
| LOW_BATT | The battery in the reader is getting flat. | 'L' |

Fig. 20

| Field | Description (Simple Message Format) | Bytes |
|---|---|---|
| Header | Message header as defined by Fig. 19. | 14 |
| Checksum | Message checksum. This is the sum of all the bytes in the message. | 1 |
| Checksum' | The 1's complement of the checksum. | 1 |

Fig. 21

| Field | Description (INSERT Message Format) | Bytes |
|---|---|---|
| Header | Message header as defined by Fig. 19. | 14 |
| Length | The number of bytes of data. Can be zero. | 2 |
| Data | The data from a Card Data object on the card. | Length |
| Checksum | Message checksum. This is the sum of all the bytes in the message. | 1 |
| Checksum' | The 1's complement of the checksum. | 1 |

Fig 21(a)

| Field | Description (Move Message Format) | Bytes |
|---|---|---|
| Header | Message header as defined by Fig. 19. | 14 |
| X | The X co-ordinate of the touch position. | 1 |
| Y | The Y co-ordinate of the touch position. | 1 |
| Checksum | Message checksum. This is the sum of all the bytes in the message. | 1 |
| Checksum' | The 1's complement of the checksum. | 1 |

Fig. 22

| Field | Description (Press and Release Message Format) | Bytes |
|---|---|---|
| Header | Message header as defined by Fig. 19. | 14 |
| X | The X co-ordinate of the touch position. | 1 |
| Y | The Y co-ordinate of the touch position. | 1 |
| Length | The number of bytes of data. Can be zero. | 2 |
| Data | The data associated with the user interface element. | Length |
| Checksum | Message checksum. This is the sum of all the bytes in the message. | 1 |
| Checksum' | The 1's complement of the checksum. | 1 |

Fig. 23

Sequential

Hierarchical

Fully Meshed

Process Tree Service Groups

CARD FOR SERVICE ACCESS

This application is a National Stage Filing Under 35 U.S.C. 371 of International Application No. PCT/AU01/01143, filed Sep. 12, 2001, and published in English as International Publication No. WO 02/23321 A1, on Mar. 21, 2002.

TECHNICAL FIELD OF THE INVENTION

The present invention relates to a control template or smart card for use with a remote reader device and, in particular, to a card interface system for providing a service. The invention also relates to a computer program product including a computer readable medium having recorded thereon a computer program for a card interface system.

BACKGROUND ART

Control pads of various types are known and used across a relatively wide variety of fields. Typically, such pads include one or more keys, buttons or pressure responsive areas which, upon application of suitable pressure by a user, generate a signal which is supplied to associated control circuitry.

Unfortunately, prior art control pads are somewhat limited, in that they only allow for a single arrangement of keys, buttons or pressure sensitive areas. Standard layouts rarely exist in a given field, and so a user is frequently compelled to learn a new layout with each control pad they use. For example many automatic teller machines ("ATMs") and electronic funds transfer at point of sale ("EFTPOS") devices use different layouts, notwithstanding their relatively similar data entry requirements. This can be potentially confusing for a user who must determine, for each control pad, the location of buttons required to be depressed. The problem is exacerbated by the fact that such control pads frequently offer more options than the user is interested in, or even able to use.

Overlay templates for computer keyboards and the like are known. However these are relatively inflexible in terms of design and require a user to correctly configure a system with which the keyboard is associated, each time the overlay is to be used.

One known system involves a smart card reading device intended for the remote control of equipment. Such, for example, allows a television manufacturer, to manufacture a card and supply same together with a remote control housing and a television receiver. A customer is then able to utilise the housing, in conjunction with the card, as a remote control device for the television receiver. In this way the television manufacturer or the radio manufacturer need not manufacture a specific remote control device for their product, but can utilise the remote control housing in conjunction with their specific card. However, the above described concept suffers from the disadvantage in that control data (e.g. PLAY, RECORD, REWIND commands etc.,) stored upon the card, and to be used for controlling an associated apparatus, comes from the manufacturer of the apparatus and is thus limited in its application.

Another known system involves an operating card reading device known as a 'remote commander' used for remote-controlling a video device, audio device etc. The operating card of this known system includes a card identification mechanism for identifying which mode the remote commander is operating in and as such what control data is to be transmitted from the remote commander. The operating card identification mechanism can be in the form of either electrodes/notches formed on side surfaces of the cards or identification information stored within the operating cards. The operating card identification mechanism can be configured in order to enable the remote commander to send commands for either a video tape recorder or for a television receiver, depending on the configuration of the identification mechanism. Again, this known system suffers from the disadvantage in that control data (e.g. PLAY, RECORD, REWIND commands etc.,) to be used for controlling the video tape recorder or television, comes from the manufacturer of the apparatus and is thus limited in its application. Further, the operating card identification mechanism must be configured each time the user wishes to change the apparatus to be controlled and is restricted to the operating card such that the identification mechanism can not be used to interact with the video device, audio device etc., to be controlled.

Still another known smart card system includes optics for receiving information from a television channel and a modem for providing real-time two way communication with an application running on a remote service provider. This known smart card system is used for remote service transactions such as an existing home shopping application. In accordance with this known system, information including home shopping program information, an item name, an item description, an item price and item commercial and programming re-run times, can be down-loaded to a smart card. The smart card can then use the access information along with the modem of the smart card to automatically dial a home shopping program automated service computer to place an order. However, again this system is limited in its application since the access information must be downloaded to the smart card each time the smart card is to be used to purchase an item and can only be used to purchase the item specified by the item name and description.

The above-described systems all lack flexibility and are all limited in their respective applications. These systems are all used with pre-running applications and there is no interaction with the application other than that specified by the manufacturer.

SUMMARY OF THE INVENTION

It is an object of the present invention to substantially overcome, or at least ameliorate, one or more disadvantages of existing arrangements.

According to one aspect of the present invention there is provided an interface card comprising:

a substrate with indicia formed thereon, said card being configured for insertion into a read device, said read device having a substantially transparent touch sensitive membrane arranged to overlay said interface card so as to present said indicia to a user of said read device through said membrane; and a memory for storing a service identifier for identifying a service to be received from an external device according to indicia selected by the user and data stored in said memory and associated with the indicia.

According to another aspect of the present invention there is provided a control template configured for insertion into a read device, said template comprising:

an electronic card formed of a substrate having associated therewith a memory device;

a plurality of indicia arbitrarily on said substrate; and data stored within said memory device, said data defining at least a mapped position of each of said indicium relative to the substrate, and a service identifier, said service identifier being for identifying a service to be provided by a peripheral device upon receipt of further data from said read device according to at least one of said indicia selected by said user.

According to still another aspect of the present invention there is provided an interface card comprising:

a substrate with indicia formed thereon, said card being configured for insertion into a read device having a substantially transparent touch sensitive membrane arranged to overlay said interface card upon said card being received therein, whereby at least card said indicia can be viewed through said touch sensitive membrane; and a memory for storing at least a service identifier for identifying a service to be provided by an external device, said service being associated with indicia selected by the user and further said data stored in said memory.

According to still another aspect of the present invention there is provided detachable interface card having a substrate and an indicia formed on said substrate, said card being configured for insertion into a read device, said card comprising:

a memory for storing a service identifier for identifying a service to be received from an external device according to a user selected indicia and data associated with indicia which is used to access said external device.

According to still another aspect of the present invention there is provided detachable interface card being configured for insertion into a read device, said card comprising:

a memory for storing a information that affects function that said card performs in said read device, wherein said read device performs the functions based on said information.

According to still another aspect of the present invention there is provided method of providing a service to be received from an external device using an interface card, said interface card comprising a substrate with indicia formed thereon and being configured for insertion into a read device, said method comprising at least the step of:

accessing a memory storing a service identifier for identifying a service to be received from an external device according to a user selected indicia and data associated with said selected indicia, said data being used to access said external device.

According to one aspect of the present invention there is provided a program for providing a service to be received from an external device using an interface card, said interface card comprising a substrate with indicia formed thereon and being configured for insertion into a read device, said program comprising at least:

code for accessing a memory storing a service identifier for identifying a service to be received from an external device according to a user selected indicia and data associated with said selected indicia, said data being used to access said external device.

Other aspects of the invention are also disclosed.

BRIEF DESCRIPTION OF THE DRAWINGS

One or more embodiments of the present invention will now be described with reference to the drawings, in which:

FIG. 6(*b*) shows another hardware architecture of a card interface system;

FIG. 12 shows a description of each of the fields of the header of FIG. 11;

FIG. 13 shows a description of each of the flags contained in the header of FIG. 11;

FIG. 14 shows a description of each of the fields of the object structure for the card of FIG. 1;

FIG. 15 shows a description of the flag for the object structure of FIG. 14;

FIG. 16 shows a description of each of the object types for the object structure of FIG. 14;

FIG. 17 shows a description of each of the fields for a user Interface Object Structure according to the object structure of FIG. 14;

FIG. 18 shows a description for each of the user Interface object flags according to the object structure of FIG. 14;

FIG. 19 shows the format of a message header that is sent from the reader of FIG. 1;

FIG. 20 shows a table listing message event types for the header of FIG. 19;

FIG. 21 shows the format of a simple message;

FIG. 21(*a*) shows the format of an INSERT message;

FIG. 22 shows the format of a MOVE message;

FIG. 23 shows the format of PRESS and RELEASE messages;

FIG. 47(*b*) is a view similar to FIG. 47(*a*), with a card partially inserted into the receptacle of the reader;

FIG. 47(*c*) is a view similar to FIG. 47(*a*), with a card fully inserted into the template receptacle of the reader.

DETAILED DESCRIPTION INCLUDING BEST MODE

Figure 1:
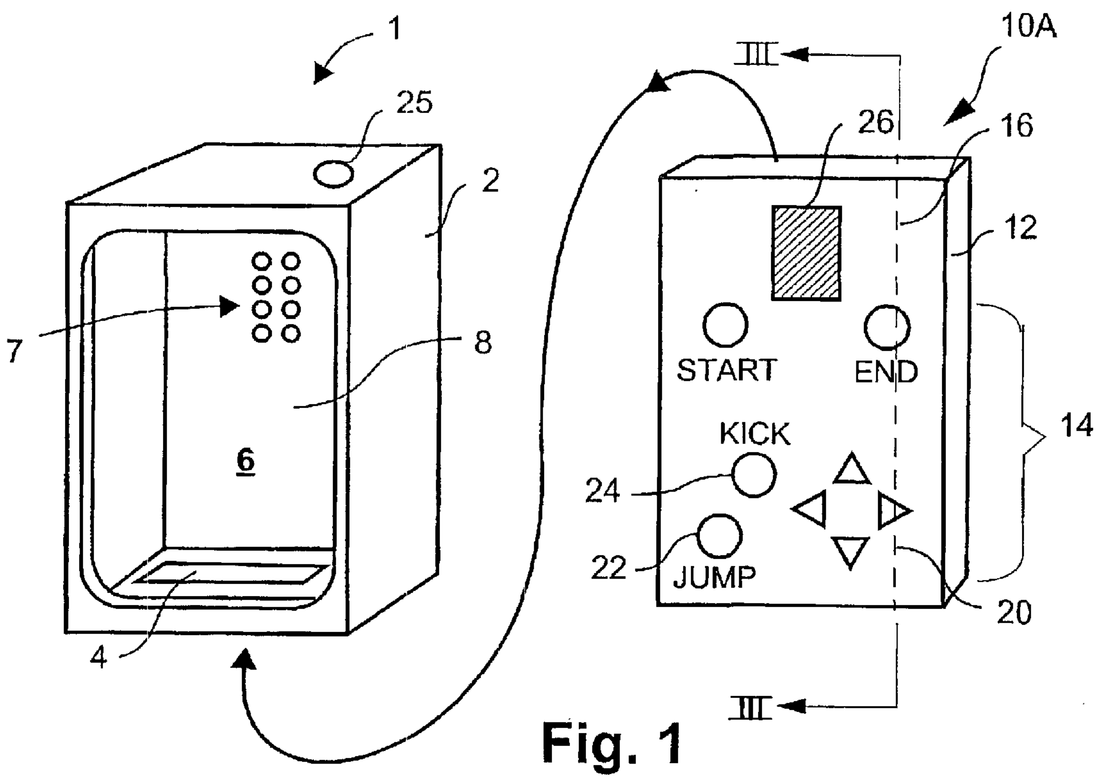
FIG. 1 is a perspective view of a read device and an associated card.

Where reference is made in any one or more of the accompanying drawings to steps and/or features, which have the same reference numerals, those steps and/or features have for the purposes of this description the same function(s) or operation(s), unless the contrary intention appears.

The embodiments disclosed herein have been developed primarily for use with remote control systems, automatic tellers, video game controllers and network access, and will be described hereinafter with reference to these and other applications. However, it will be appreciated that the invention is not limited to these fields of use.

For ease of explanation the following description has been divided into Sections 1.0 to 13.0, each section having associated subsections.

1.0 Card Interface System Overview

Figure 2:
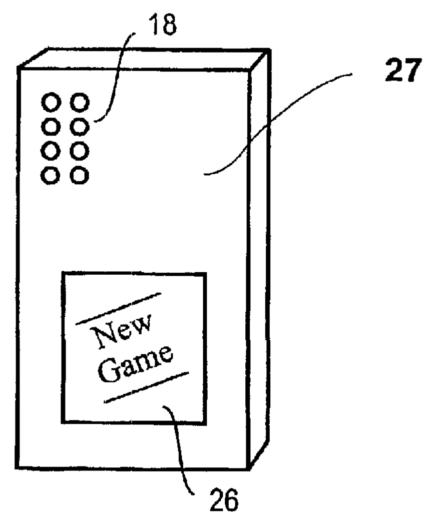
FIG. 2 is a perspective view of an opposite side of the card shown in FIG. 1.

FIG. 1 shows a remote reader 1, having a housing 2, which defines a card receptacle 4 and a viewing area 6. Data reading means are provided in the form of exposed electrical contacts 7 and associated control circuitry (not shown). The remote reader 1 also includes sensor means in the form of a substantially transparent pressure sensitive membrane forming a touch panel 8 covering the viewing area 6. The remote reader 1 disclosed herein has been described with a substantially transparent pressure sensitive membrane forming the touch panel 8, however it will be appreciated by one skilled in the art that alternative technology can be used as a substantially transparent touch panel. For example, the touch panel can be resistive or temperature sensitive. The remote reader 1 is configured for use with a user interface card, which, in the cards shown in FIGS. 1 to 3, takes the form of an electronic smart card 10A. The smart card 10A includes a laminar substrate 12 with various control indicia 14 in the form of a four way directional controller 20, a "jump button" 22, a "kick button" 24, a "start button" and an "end button" printed on an upper face 16 thereof. Other non-control indicia, such as promotional or instructional material, can be printed alongside the control indicia. For example, advertising material 26 can be printed on the front face of the smart card 10A or on a reverse face 27 of the card 10A, as seen in FIG. 2.

Figure 3:
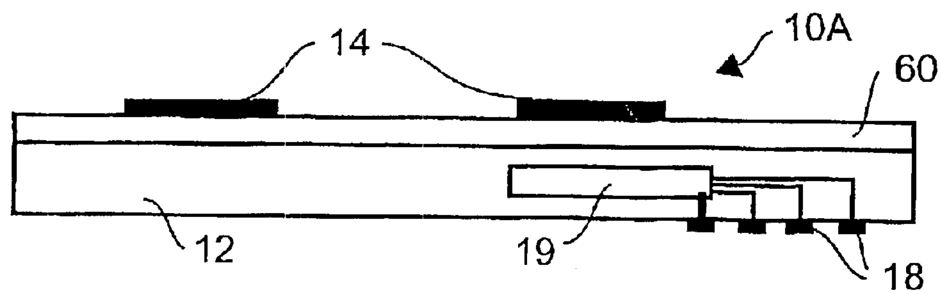
FIG. 3 is a longitudinal cross-sectional view of the card shown in FIG. 1 taken along the line III—III.

As seen in FIG. 3, the smart card 10A includes storage means in the form of an on-board memory chip 19 for data associated with the control indicia. The smart card 10A also includes electrical data contacts 18 connected to the on-board memory chip 19 corresponding with the exposed contacts 7 on the remote reader 1.

As seen in FIG. 3, the upper face 16 may be formed by an adhesive label 60 upon which are printed control indicia 14, in this case corresponding to the "End Button" and the Right arrow "button" of the directional controller 20. The label 60 is affixed to the laminar substrate 12. A home user can print a suitable label for use with a particular smart card 10A by using a printer, such as a colour BUBBLEJET™ printer manufactured by Canon, Inc. Alternatively, the control indicia 14 can be printed directly onto the laminar substrate or separate adhesive labels can be used for each of the control indicia.

In use, the smart card 10A is inserted into the card receptacle 4, such that the pressure sensitive touch panel 8 covers the upper face 16 of the smart card 10A. In this position, the control indicia are visible within the viewing area 6 through the transparent pressure sensitive touch panel 8.

The exposed contacts 7 and associated circuitry of the reader 1 are configured to read the stored data associated with the control indicia 14 from the memory chip 19, either automatically upon insertion of the smart card 10A into the control template receptacle 4, or selectively in response to a signal from the remote reader 1. The signal can, for example, be transmitted to the smart card 10A via the exposed contacts 7 and data contacts 18.

Once the data associated with the control indicia 14 has been read, a user can press areas of the pressure sensitive touch panel 8 on or over the underlying control indicia 14. By sensing the pressure on the pressure sensitive touch panel 8 and referring to the stored data, the remote reader 1 can deduce which of the control indicia 14 the user has selected. For example, if the user places pressure on the pressure sensitive touch panel 8 adjacent the "kick button" 24, the remote reader 1 is configured to assess the position at which the pressure was applied, refer to the stored data, and determine that the "kick" button 24 was selected. This information can then be used to control an external device, for example, an associated video game console (of conventional construction and not shown). It will be appreciated from above that the control indicia 14 are not, in fact buttons. Rather, the control indicia 14 are user selectable features which, by virtue of their corresponding association with the mapping data and the function of the touch panel 8, operate to emulate buttons traditionally associated with remote control devices.

In one advantageous implementation, the remote reader 1 includes a transmitter (of conventional type and not shown), such as an infra-red (IR) transmitter or radio frequency (RF) transmitter, for transmitting information in relation to indicia selected by the user. As seen in FIG. 1, the remote reader 1 incorporates an IR transmitter having an IR light emitting diode (LED) 25. Upon selection of one of the control indicia 14, the remote reader 1 causes information related to the selection to be transmitted to a remote console (not shown in FIG. 1) where a corresponding IR or RF receiver can detect and decode the information for use in controlling some function, such as a game being played by a user of the reader 1.

Any suitable transmission method can be used to communicate information from the remote reader 1 to the remote console, including direct hard wiring. Moreover, the remote console itself can incorporate a transmitter, and the remote reader 1 a receiver, for communication in an opposite direction to that already described. The communication from the remote console to the remote reader 1 can include, for example, handshaking data, setup information, or any other form of information desired to be transferred from the remote console to the remote reader 1.

Figure 4:
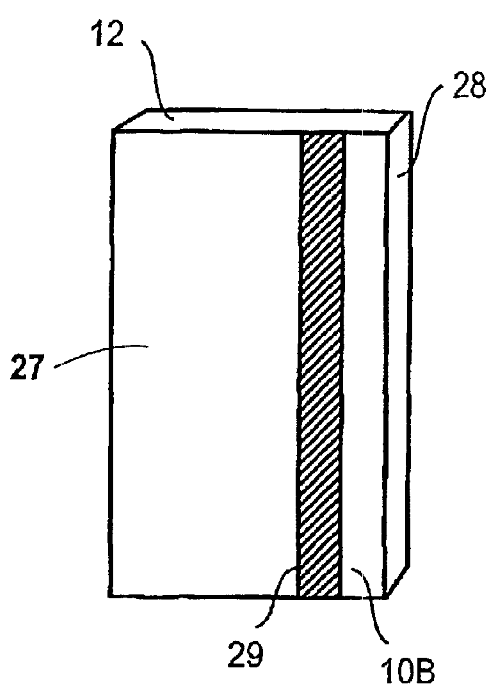
FIGS. 4 and 5 are perspective views of the rear face of alternative arrangements of cards to the card shown in FIG. 1.

Turning to FIG. 4, there is shown a control card 10B. The control card 10B includes a laminar substrate 12, which bears control indicia (not illustrated). In the control card 10B the storage means takes the form of a magnetic strip 29 formed along an edge 28 of the reverse face 27 of the control card 10B. The stored data associated with the control indicia may be stored on the magnetic strip 29 in a conventional manner. A corresponding reader (not shown) for this arrangement includes a magnetic read head positioned at or adjacent an entrance to the corresponding control template receptacle. As the control card 10B is slid into the card receptacle, the stored data is automatically read from the magnetic strip 29 by the magnetic read head. The reader 1 may then be operated in a manner corresponding to the card 10A of FIG. 1.

Figure 5:
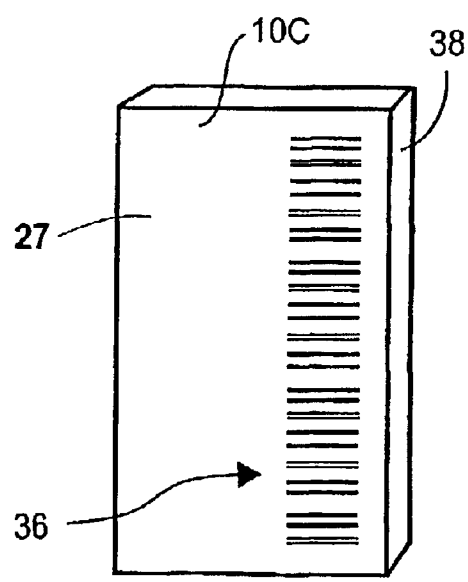

FIG. 5 shows another card in the form of a control card 10C, in which the storage means takes the form of machine-readable indicia. In the card 10C of FIG. 5, the machine readable indicia takes the form of a barcode 36 formed along an edge 38 of the reverse face 27 of the card 10C. The stored data is suitably encoded, and then printed in the position shown. A corresponding controller (not shown) for the card 10C of FIG. 5 includes an optical read head positioned at or adjacent an entrance to the associated control template receptacle. As the card 10C is slid into the control receptacle, the stored data is automatically read from the barcode 36 by the optical read head. Alternatively, the barcode can be scanned using a barcode reader associated with the reader immediately prior to inserting the card 10C, or scanned by an internal barcode reader scanner once the card 10C has completely been inserted. The card 10C may then be operated in a manner again corresponding to the card 10A of FIG. 1. It will be appreciated that the position, orientation and encoding of the barcode can be altered to suit a particular application. Moreover, any other form of machine readable indicia can be used, including embossed machine-readable figures, printed alpha-numeric characters, punched or otherwise formed cut outs, optical or magneto optical indicia, two dimensional bar codes. Further, the storage means can be situated on the same side of the card 10A or 10B or 10C as the control indicia.

FIG. 6(*a*) shows a hardware architecture of a card interface system 600A. In the system 600A, the remote reader 1 is hard wired to a personal computer system 100 via a communications cable 3. Alternatively, instead of being hardwired, a radio frequency or IR transceiver 106 can be used to communicate with the remote reader 1. The personal computer system 100 includes a screen 101 and a computer module 102. The computer system 100 will be explained in more detail below with reference to FIG. 7. A keyboard 104 and mouse 203 are also provided.

The system 600A includes a smart card 10D which is of similar configuration to the smart card 10A described above. The smart card 10D is programmable and can be created or customised by a third party, which in this case can be a party other than the manufacturer of the card 10D and/or card reader 1. The third party can be the ultimate user of the smart card 10D itself, or may be an intermediary between the manufacturer and user. In accordance with the system 600A of FIG. 6(*a*), the smart card 10D can be programmed and customised for one touch operation to communicate with the computer 100 and obtain a service over a network 220, such as the Internet. The computer 100 operates to interpret signals sent via the communications cable 3 from the remote reader 1, according to a specific protocol, which will be described in detail below. The computer 100 performs the selected function according to touched control indicia, and can be configured to communicate data over the network 220. In this manner the computer 100 can permit access to applications and/or data stored on remote server computers 150, 152 and appropriate reproduction on the display device 101.

FIG. 6(*b*) shows a hardware architecture of a card interface system 600B. In the system 600B, the remote reader 1 can be programmed for obtaining a service locally at a set top box 601, that couples to an output interface, which in this example takes the form of an audio-visual output device 116, such as a digital television set. The set-top box 601 operates to interpret signals 112 received from the remote reader 1, which may be electrical, radio frequency, or infra-red (IR), and according to a specific protocol which will be described in detail below. The set top box 601 can be configured to perform the selected function according to touched control indicia and permit appropriate reproduction on the output device 116. Alternatively, the set top box 601 can be configured to convert the signals 112 to a form suitable for communication and cause appropriate transmission to the computer 100. The computer 100 can then perform the selected function according to the control indicia, and provide data to the set-top box 601 to permit appropriate reproduction on the output device 116. The set top box 601 will be explained in more detail below with reference to FIG. 42.

In one application of the system 600B, the smart card 10D can be programmed for obtaining a service both remotely and locally. For instance, the smart card 10D can be programmed to retrieve an application and/or data stored on remote server computers 150, 152, via the network 220, and to load the application or data on to the set top box 601. The latter card can be alternatively programmed to obtain a service from the loaded application on the set top box 601.

Unless referred to specifically, the systems 600A and 600B will be hereinafter generically referred to as the system 600. Further, unless referred to specifically, the smart cards 10A, 10B, 10C and 10D will be hereinafter generically referred to as the smart card 10.

Figure 7:
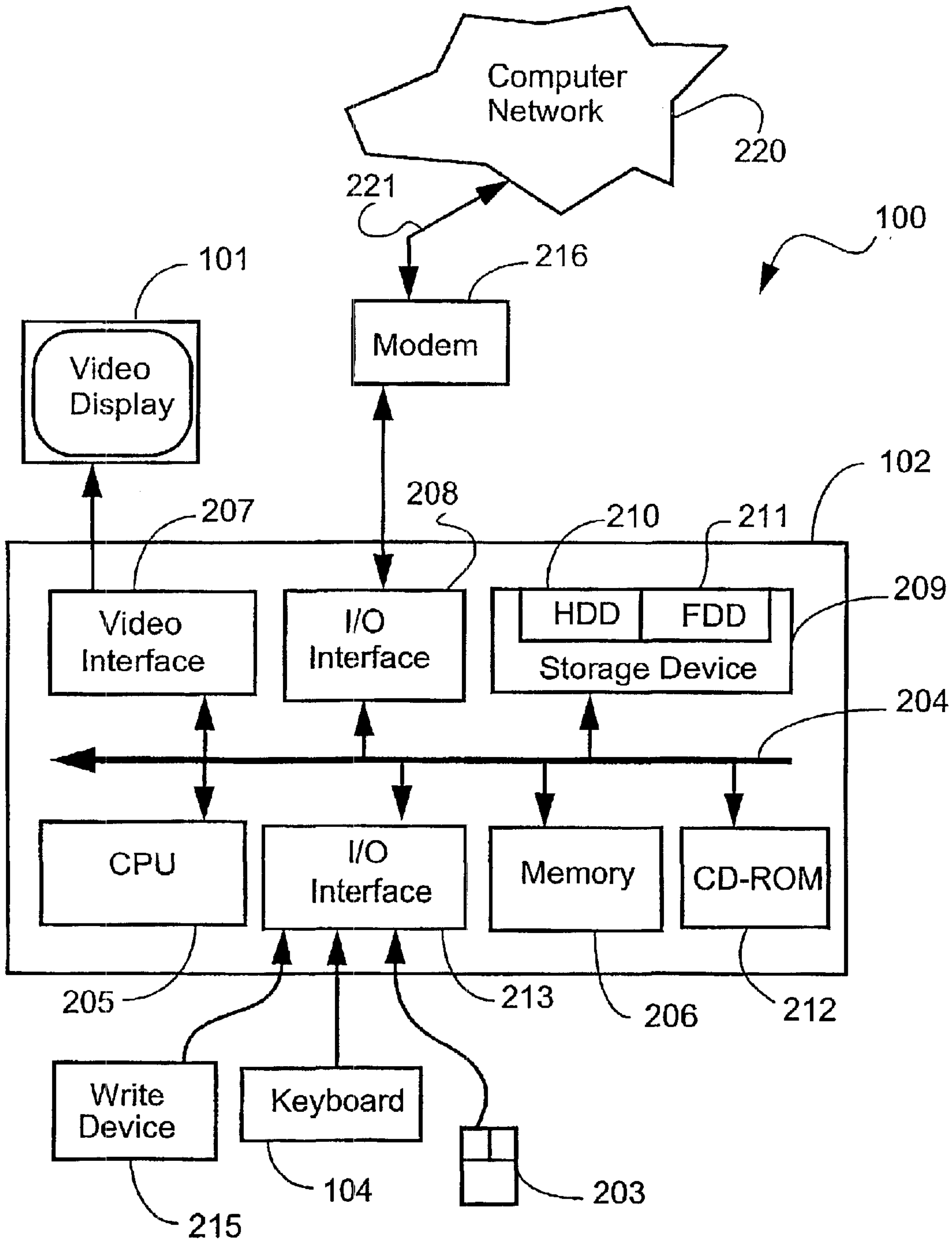
FIG. 7 is a schematic block diagram of the general-purpose computer of FIGS. 6(*a*) and 6(*b*)

FIG. 7 shows the general-purpose computer system 100 of the system 600, which can be used to run the card interface system and to run software applications for programming the smart card 10. The computer system 100 includes a computer module 102, input devices such as a keyboard 104 and mouse 203, output devices including the printer (not shown) and the display device 101. A Modulator-Demodulator (Modem) transceiver device 216 is used by the computer module 102 for communicating to and from the communications network 220, for example connectable via a telephone line 221 or other functional medium. The modem 216 can be used to obtain access to the Internet, and other network systems, such as a Local Area Network (LAN) or a Wide Area Network (WAN).

The computer module 102 typically includes at least one central processing unit (CPU) 205, a memory unit 206, for example formed from semiconductor random access memory (RAM) and read only memory (ROM), input/output (I/O) interfaces including a video interface 207, and an I/O interface 213 for the keyboard 104 and mouse 203, a write device 215, and an interface 208 for the modem 216. A storage device 209 is provided and typically includes a hard disk drive 210 and a floppy disk drive 211. A magnetic tape drive (not illustrated) is also able to be used. A CD-ROM drive 212 is typically provided as a non-volatile source of data. The components 205 to 213 of the computer module 201, typically communicate via an interconnected bus 204 and in a manner, which results in a conventional mode of operation of the computer system 102 known to those in the relevant art. Examples of computers on which the arrangement described herein can be practised include IBM-computers and compatibles, Sun Sparcstations or alike computer system evolved therefrom.

Typically, the software programs of the system 600 are resident on the hard disk drive 210 and read and controlled in their execution by the CPU 205. Intermediate storage of the software application programs and any data fetched from the network 220 may be accomplished using the semiconductor memory 206, possibly in concert with the hard disk drive 210. In some instances, the application programs can be supplied to the user encoded on a CD-ROM or floppy disk and read via the corresponding drive 212 or 211, or alternatively may be read by the user from the network 220 via the modem device 216. Still further, the software can also be loaded into the computer system 102 from other computer readable medium including magnetic tape, ROM or integrated circuits, a magneto-optical disk, a radio or infra-red transmission channel between the computer module 102 and another device, a computer readable card such as a smart card, a computer PCMCIA card, and the Internet and Intranets including email transmissions and information recorded on Websites and the like. The foregoing is merely exemplary of relevant computer readable media. Other computer readable media are able to be practised without departing from the scope of the invention defined by the appended claims.

The smart card 10 can be programmed by means of a write device 215 coupled to the I/O interface 213 of the computer module 102. The write device 215 can have the capability of writing data to the memory on the smart card 10. Preferably, the write device 215 also has the capability of printing graphics on the top surface of the smart card 10. The write device 215 can also have a function reading data from the memory on the smart card 10. Initially, the user inserts the smart card 10 into the write device 215. The user then enters the required data via the keyboard 104 of the general purpose computer 102 and a software application writes this data to the smart card memory via the write device 215. If the stored data is encoded for optical decoding such as using a barcode, the write device can print the encoded data onto the smart card 10.

Figure 42:
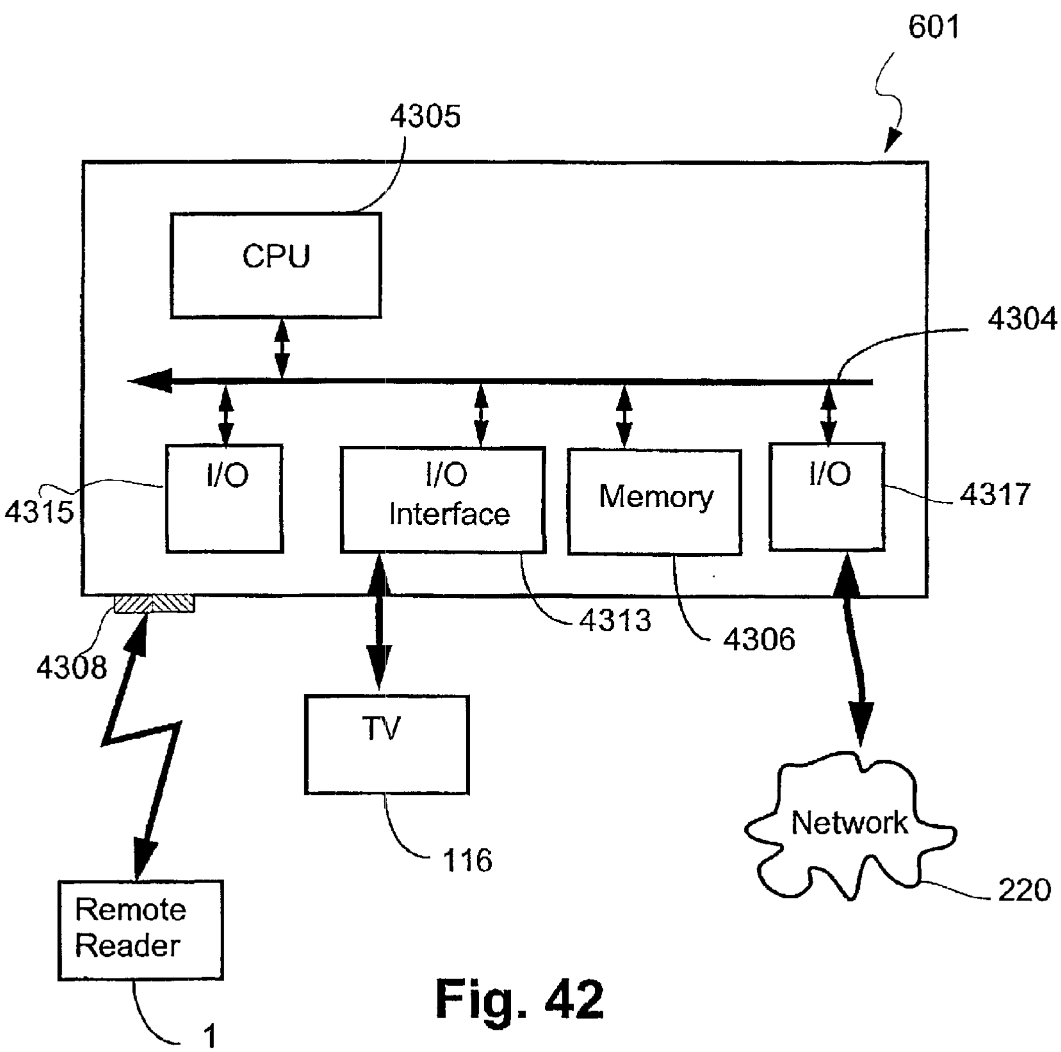
FIG. 42 is schematic block diagram showing the set top box of the system 600 in more detail.

FIG. 42 shows the set top box 601 of the system 600, which can be used to interpret signals 112 received from the remote reader 1. The set top box 601 in some implementations essentially is a scaled version of the computer module 102. The set top box 601 typically includes at least one CPU unit 4305, a memory unit 4306, for example formed from semiconductor random access memory (RAM) and read only memory (ROM), and input/output (I/O) interfaces including at least an I/O interface 4313 for the digital television 116, an I/O interface 4315 having an IR transceiver 4308 for receiving and transmitting the signals 112, and an interface 4317 for coupling to the network 220. The components 4305, 4306, 4313, 4315 and 4317 of the set top box 601, typically communicate via an interconnected bus 4304 and in a manner which results in a conventional mode of operation. Intermediate storage of any data received from the remote reader 1 or network 220 may be accomplished using the semiconductor memory 4306. Alternatively, the set top box can include a storage device (not shown) similar to the storage device 209.

The card interface system 600 will now be explained in more detail in the following paragraphs.

2.0 Card Interface System Software Architecture

2.1 Software Architecture Layout

Figure 8:
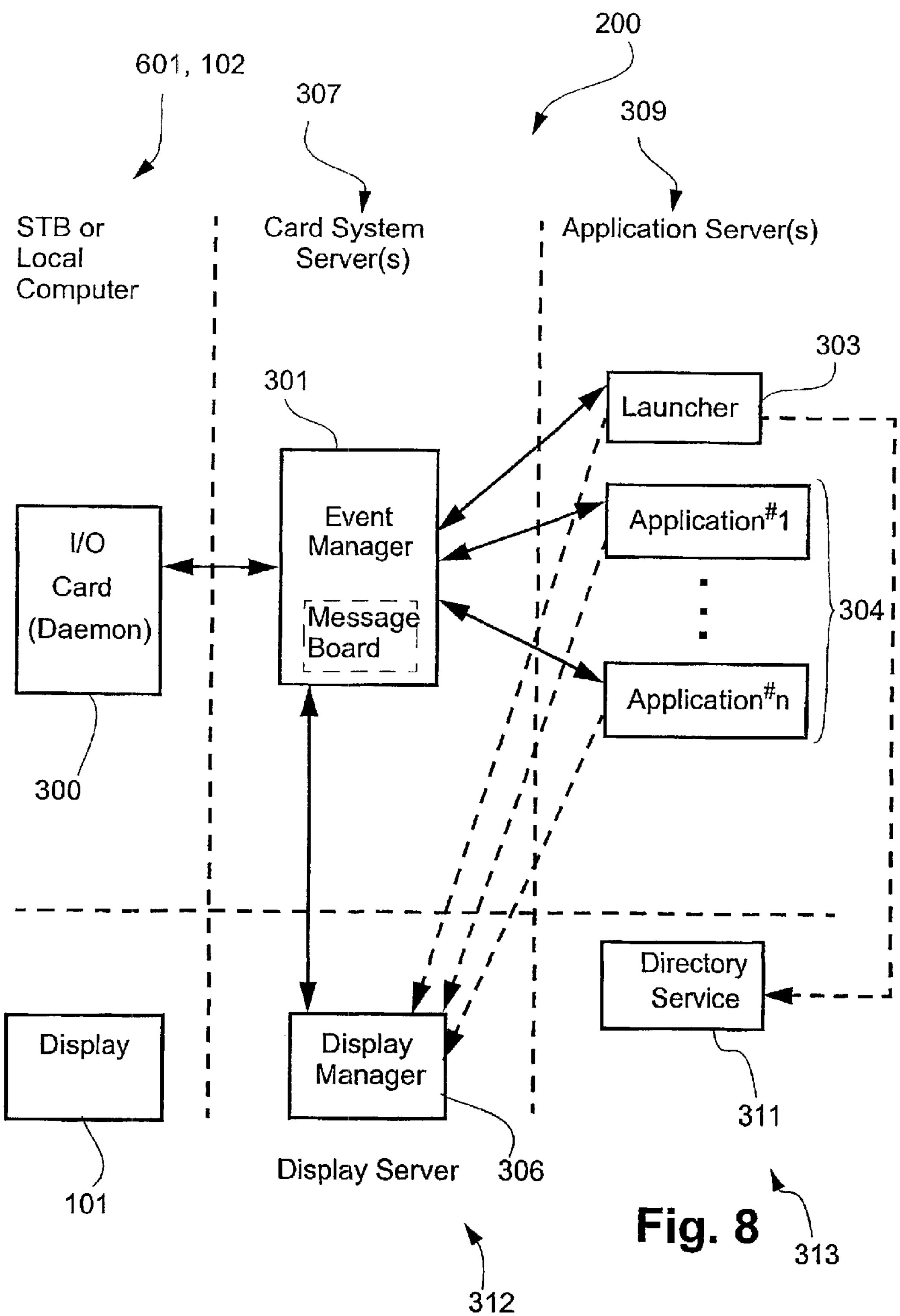
FIG. 8 is a schematic block diagram representation of a card interface system architecture.

A software architecture 200 for the hardware architectures depicted by the system 600, is generally illustrated in FIG. 8. The architecture 200 can be divided into several distinct process components and one class of process. The distinct processes include an I/O interface 300, which may be colloquially called an "I/O daemon" 300, an event manager 301, a display manager 306, an (application) launcher 303 and a directory service 311. The class of process is formed by one or more applications 304. In the architecture 200 described herein, there exists one I/O daemon 300, one event manager 301, one display manager 306 and one launcher 303 for every smart card remote connection, usually formed by the set-top box 601, and one master launcher (not shown) for each computer 100 (e.g. the server computers 150, 152) that is running the launchers 303, and at least one directory service 311 for all systems. The Directory service 311, is queried by the launcher 303 to translate service data into a Resource Locater (eg. URL) that indicates a name or location of a service or the location or name of an application 304 to be used for the service.

In this form, the architecture 200 can be physically separated into six distinct parts 101, 307, 309, 312, 313 and 601 as shown by the dashed lines in FIG. 8, each of which can be run on physically separate computing devices. Communication between each of the parts of the system 600 is performed using Transport Control Protocol/Internet Protocol (TCP/IP) streams. Alternatively, each of the parts 101, 307, 309, 312, 313 and 601 can be run on the same machine.

In the system 600A of FIG. 6(*a*), all of the process components 300, 301, 303, 304 and 306 can be run on the computer 100. The event manager 301, the launcher 303 and display manager 306 are preferably all integrated into one executable program which is stored in the hard disk 209 of the computer 100 and can be read and controlled in its execution by the CPU 205. The directory service 311 runs on the same computer 100 or on a different computer (e.g. server 150) connected to the computer 100 via the network 220.

In the system 600B of FIG. 6(*b*), all of components 300 to 304 and 306 can run from the set-top-box 601. In this instance, the components 300 to 304 and 306 can be stored in the memory 4306 of the set top box 601 and can be read and controlled in their execution by the CPU 4305. The directory service 311 can run on the computer 100 and can be stored in the memory 206 of the computer 100 and be read and controlled in its execution by the CPU 205. Alternatively, the directory service 311 can be run on the set top box 601 or its function performed by the launcher 303.

Alternatively, if the set-top-box 601 is not powerful enough to run the system 600 locally, only the I/O daemon 300 need run on the set-top-box 601 and the remainder of the architecture 200 (i.e. process components 301, 303, 304, 306 and 311) can run remotely on the other servers (150, 152) which can be accessed via the network 220. In this instance, the I/O daemon 300 can be stored in the memory 4306 of the set top box 601 and can be read and controlled in its execution by the CPU 4305. Again, the functional parts of such a system can be divided as shown in FIG. 8.

2.1.1 I/O Daemon

The I/O daemon 300 is a process component that converts datagrams received from the remote reader 1 into a TCP/IP stream that can be sent to the event manager 301 and vice versa (e.g. when using a two-way protocol). Any suitable data format can used by the remote reader 1. The I/O daemon 300 is preferably independent of any changes to the remote reader 1 data format, and can work with multiple arrangements of the remote reader 1. In one advantageous implementation of the system 600, the I/O daemon 300 is integrated into the event manager 301.

In the system 600A, the I/O daemon 300 is started when a user starts the smart card system 600 by powering up the computer 100 and the event manager 301 has been started. Alternatively, the I/O daemon 300 is started when a user starts the system 600 by turning on the set-top box 601.

The I/O daemon 300 will be explained in more detail below with reference to section 9.0.

2.1.2 Event Manager

The event manager 301 forms a central part of the architecture 200 in that all communications are routed through the event manager 301. The event manager 301 is configured to gather all events that are generated by the remote reader 1 and relayed by the I/O daemon 300. These events are then redistributed to the various process components 300 to 304, and 306 and running applications. The event manager 301 is also configured to check that an event has a valid header, correct data length, but is typically not configured to check that an event is in the correct format. An "event" in this regard represents a single data transaction from the I/O daemon 300 or the launcher 303 or applications 304.

Any changes in protocol between different systems can be dealt with by the event manager 301. Where possible, events can be rewritten to conform to the data format understood by any presently running application 304. If such is not possible, then the event manager 301 reports an error to the originating application 304. When different data formats are being used, for example with a system running multiple smart cards, the event manager 301 preferably ensures that the smallest disruption possible occurs.

The event manager 301 does not have any presence on the display screen or other output device 116. However, the event manager 301 can be configured to instruct the display manager 306 as to which application is presently required (i.e. the "front" application) and should currently be displayed on the display 101. The event manager 301 infers this information from messages passed to the applications 304 from the launcher 303 as will be explained in more detail below with reference to section 10.0.

The event manager 301 can be configured to always listen for incoming I/O daemon connections or alternatively, can start the system 600. The method used is dependent on the overall configuration of the system 600. In this connection, the event manager 301 can start the system 600 or the set top box 601 can use the incoming connection of the I/O daemon 300 to start the system 600. The event manager 301 will be described in more detail below with reference to section 7.0.

2.1.3 Master Launcher

Where a thin client computer is being utilised and multiple launchers 303 are running with each launcher 303 being responsible for one set top box, a master launcher (not shown) which communicates directly with the event manager 301 can be used. The master launcher is used to start the launcher 303 corresponding to each of the event managers 301 if more than one event manager is running on the system 600. Initially, when the I/O daemon 300 connects to the event manager 301, the event manager 301 requests that the master launcher start a first process for the event manager 301. This first process is generally the launcher 303 for any smart card application 304. The master launcher can also be configured to shut down the launcher 303 of an application 304 when the event manager 301 so requests, and for informing the event manager 301 that the launcher 303 has exited.

There is preferably one master launcher running for each physically separate server (e.g. 150, 152) that is running an associated smart card application 304. This one master launcher handles the requests for all event managers that request launchers on a particular server. When run on a computer 100, as seen in FIG. 7, the master launcher commences operation either before or no later than at the same time as the rest of the system 600. In this instance, the master launcher is started first.

The master launcher can be integrated into the event manager 301, for example, when an associated launcher is running on the same computer as the event manager 301.

2.1.4 Launcher/First Application

In one advantageous implementation of the system 600, the first process started by the insertion of a smart card 10 into the remote reader 1 is the launcher 303. In specific systems, specific applications may be commenced, for example an automatic teller machine can start a banking application. Another example includes the use of restricted launchers that only start a specified sub-set of applications. The launcher 303 is an application that starts other applications for a specific event manager 301. The launcher 303 starts and ends applications and can also start and end sessions. The launcher 303 also informs the event manager 301 when applications are starting and ending, and tells the applications 304 when they are receiving or losing focus, or when they need to exit. In this regard, where a number of applications 304 are operating simultaneously, the application 304 that is currently on-screen is the application having focus, also known as the "front application". When another application is about to take precedence, the launcher 303 tells the front application that it is losing focus, thereby enabling the current application to complete its immediate tasks. The launcher 303 also tells the new application 304 that it is gaining focus, and that the new application 304 shall soon be changing state. The launcher 303 is also configured to force an application to exit.

The launcher 303 may receive certain events such as "no-card", "low battery" and "bad card" events generated by the remote reader 1. The launcher 303 also receives events that are intended for applications that are not currently the front application, and the launcher 303 operates to correctly interpret these events.

The launcher 303 is preferably only started when a request is generated by the event manager 301 to request the launcher 303 to be started. The launcher 303 can also be told to exit and forced to exit by the event manager 301.

The launcher 303 is preferably the only process component that needs to communicate with the directory service 311. When the launcher 303 is required to start a new application 304, the launcher 303 queries the directory service 311 with service data, and the directory service 311 returns a location of the application 304 and service data associated with the new application 304. The service data is sent to the new application 304 as initialisation data in an event, referred to herein as the EM_GAINING_FOCUS event. The application location specifies the location of the application 304 to be run. This may be local, for implementations with a local computer, or networked. If the application location is empty, then the launcher 303 has to decide which application to start based on the service data.

The launcher 303 can also be configured to start any applications, for example browser controllers that will generally always be running while the system 600 is operating. Such applications are referred to as persistent applications. Applications can also be started by the launcher 303 either as a response to the first user selection on a corresponding smart card 10, or at the request of another one of the applications 304.

The launcher 303 can be integrated into the event manager 301 in some implementations of the system 600.

The launcher 303 will be explained in more detail below with reference to section 10.0.

2.1.5 Display Manager

The display manager 306 selects which smart card application 304 is currently able to display output on the display screen 101. The display manager 306 is told which application 304 can be displayed by an EM_GAINING_FOCUS event originating from the launcher 303. This event can be sent to the display manager 306 directly, or the event manager 301 can send copies of the event to the display manager 306 and the intended recipient.

Generally, the only application 304 that should be attempting to display output should be the front application. The display manager 306 can provide consistent output during the transfer between applications having control of the display. The display manager 306 may need to use extrapolated data during changeovers of applications as the front application.

The architecture 200 can be configured such that the display manager 306 is not needed or the role of the display manager 306 may be assumed by the other parts 301 or 303, of the architecture 200.

2.1.6 Directory Service

The directory service 311 is configured to translate service identifiers that are stored on smart cards 10, into resource locators (e.g. a URL) that indicate the location of the services or the location of an application associated with a service. The directory service 311 is also configured to translate optional service data. The directory service 311 allows the launcher 303 associated with a particular card 10 to decide what to do with a resource locator, for example, download and run the associated application 304 or load the resource locator into a browser application. The translation by the directory service can be performed using a distributed lookup system.

2.1.7 Applications

The applications 304 associated with a particular smart card 10 can be started by the launcher 303 associated with that smart card 10 in a response to a first button press on a corresponding card. Each application 304 can be a member of one or more service groups, described in detail later in this specification. An application 304 can be specified to not be part of any service group in which case the application will never be run with other applications. An application can become part of a service group once the application is running and can remove itself from a service group when the application is the currently front application.

Some applications can be started when the system 600 is started and these applications, for example a browser control application or a media playing application can be always running. These persistent applications can be system specific or more generally applicable.

Figure 9:
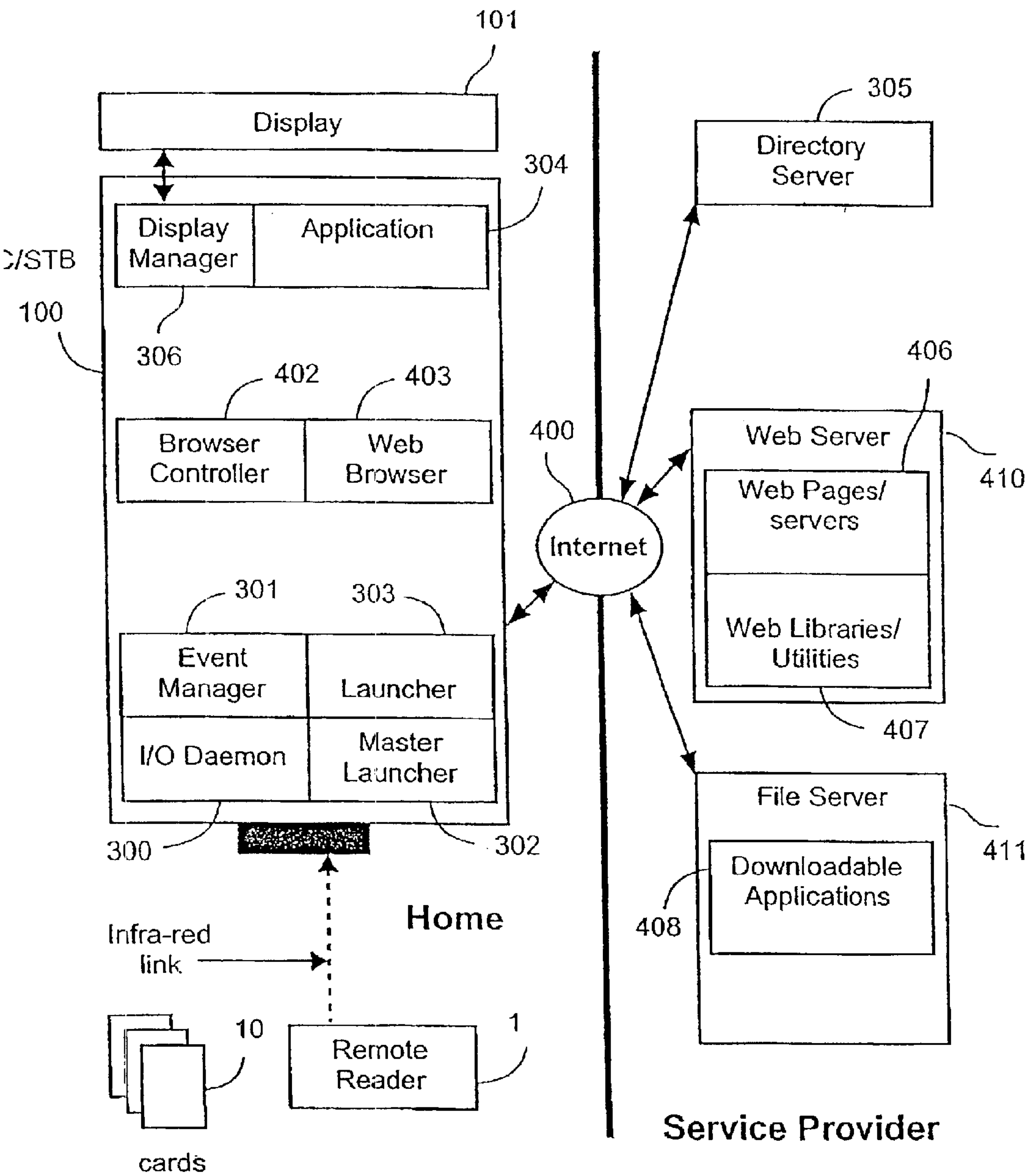
FIG. 9 is a schematic block diagram representation of a card interface system.

FIG. 9 is a schematic block diagram representation of a card interface system, including the process components 301 to 306 described above. In the system of FIG. 9, the remote reader 1 communicates with a computer 100 via an IR link in conjunction with an I/O daemon 300 for controlling the IR link. Further, the computer 100 is configured for communicating to and from a communications network in this case represented by the Internet 400 to a Web server 410. In this instance, some of the applications 304 accessible utilising the smart cards 10 and remote reader 1 can be Web pages 406 associated with different smart cards 10. The Web libraries 407 contain functions (e.g. JavaScript functions) and classes (e.g. Java classes) that can be included with web pages for use with the smart card 10. The Web pages 406 can be accessed with a running application called the Web browser 403. In the system of FIG. 9, the event manager 301 is configured to receive an event from the remote reader 1. The event is then sent to the launcher 303, which can be configured to send a message to the browser controller 402, which controls the Web browser 403. The process for starting an application or browser session will be explained in more detail below. The launcher 303 can also be configured to download applications 408 as well as running applications from a file server 411 which is also connected to the computer 100 via the Internet 400.

3.0 Reader

The remote reader 1 is preferably a hand-held, battery-powered unit that interfaces with a smart card 10 to provide a customisable user interface. As described above, the remote reader 1 is intended for use with a digital television, a set top box, computer, or cable television equipment to provide a simple, intuitive interface to on-line consumer services in the home environment.

Figure 43:
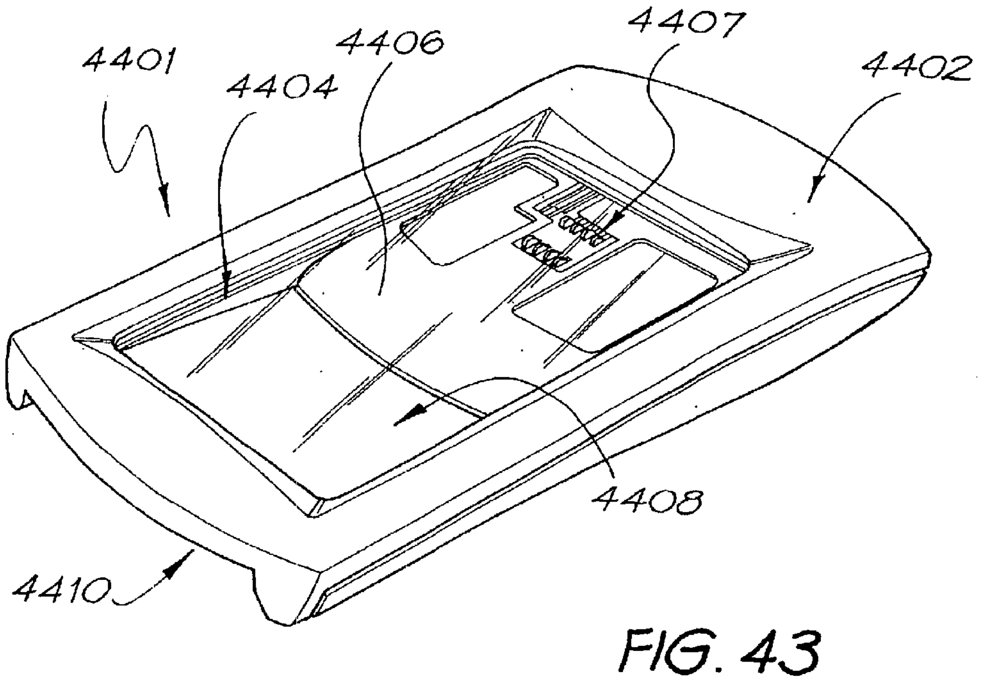
FIG. 43 is a perspective view of a "bottom-entry" reader.
Figure 44:
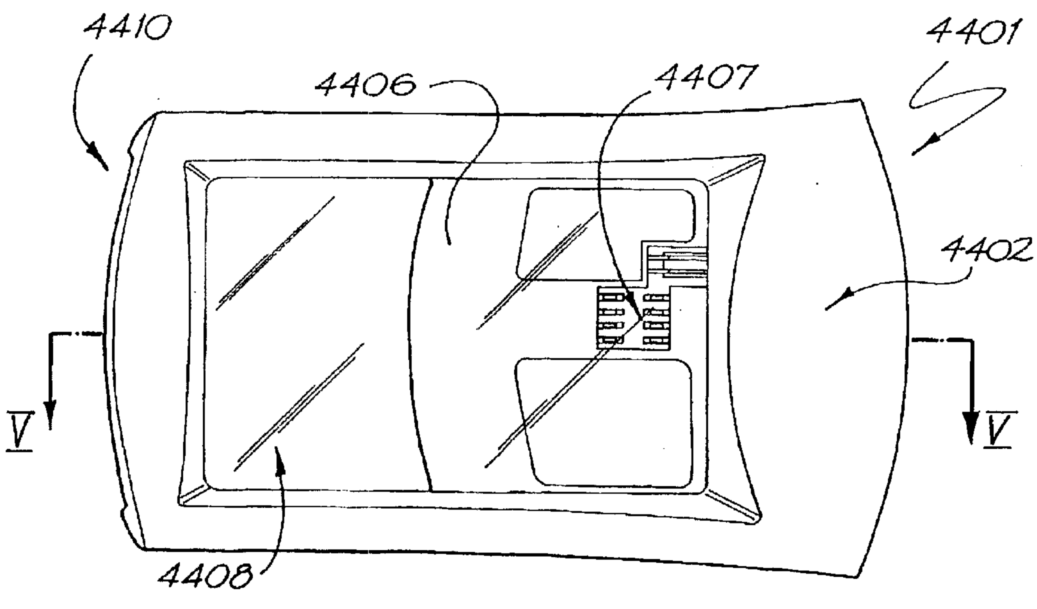
FIG. 44 is a plan view of the reader of FIG. 43.

FIGS. 43 and 44 show a reader 4401 similar to the reader 1 described above. The reader 4401 is configured for the reading of the card 10. The reader 4401 is formed of a housing 4402 incorporating a card receptacle 4404 and a viewing area 4406. The receptacle 4404 includes an access opening 4410 through which a smart card 10, seen in FIG. 1, is insertable.

An upper boundary of the viewing area 4406 is defined by sensor means in the form of a substantially transparent pressure sensitive membrane 4408 similar to the membrane 8 described above. Arranged beneath the membrane 4408 is data reading means provided in the form of an arrangement of exposed electrical contacts 4407 configured to contact complementary contacts of the smart card 10.

Figure 45:
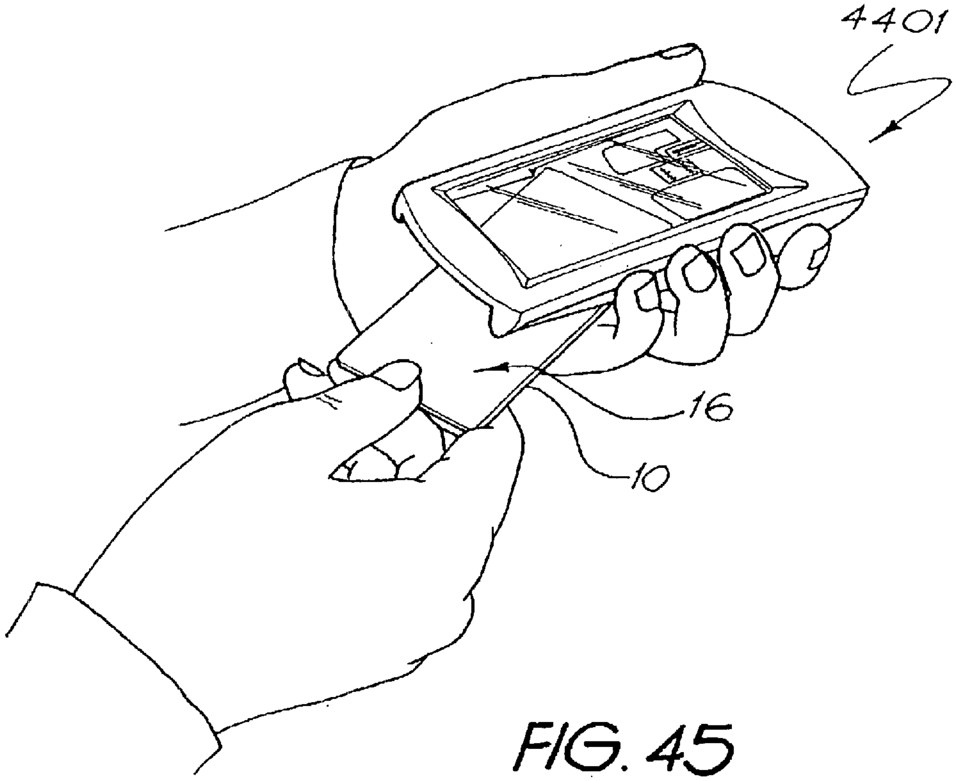
FIG. 45 shows a user inserting a card into the reader of FIG. 43.

The card 10 is inserted into the reader 4401 via the access opening 4410 as shown in FIG. 45. The configuration of the reader 4401 allows a user to hold the reader 4401 in one hand and easily insert the smart card 10 into the reader 4401 with the user's other hand. When the smart card 10 is fully inserted into the reader 4401, the pressure sensitive membrane 4408 fully covers the upper face 16 of the smart card 10. The viewing area 4406 preferably has substantially the same dimensions as the upper face 16 of the card 10 such that the upper face 16 is, for all intents and purposes, fully visible within the viewing area 4406 through the transparent pressure sensitive membrane 4408.

Figure 46:
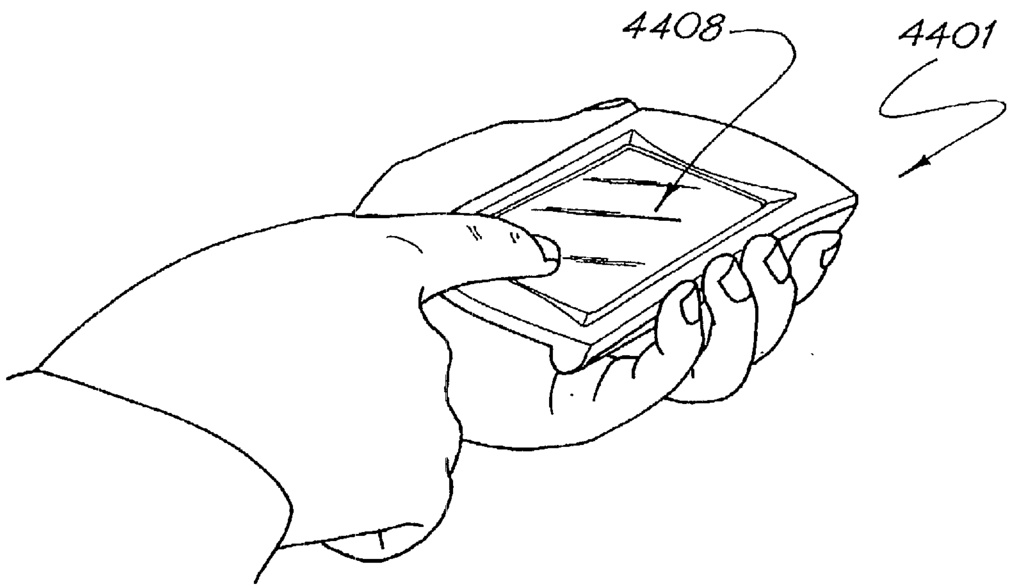
FIG. 46 shows a user operating the reader of FIG. 43 after a card has been fully inserted.

FIG. 46 shows a user operating the reader 4401 after a card has been fully inserted.

Figures 47A, 47B, 47C:
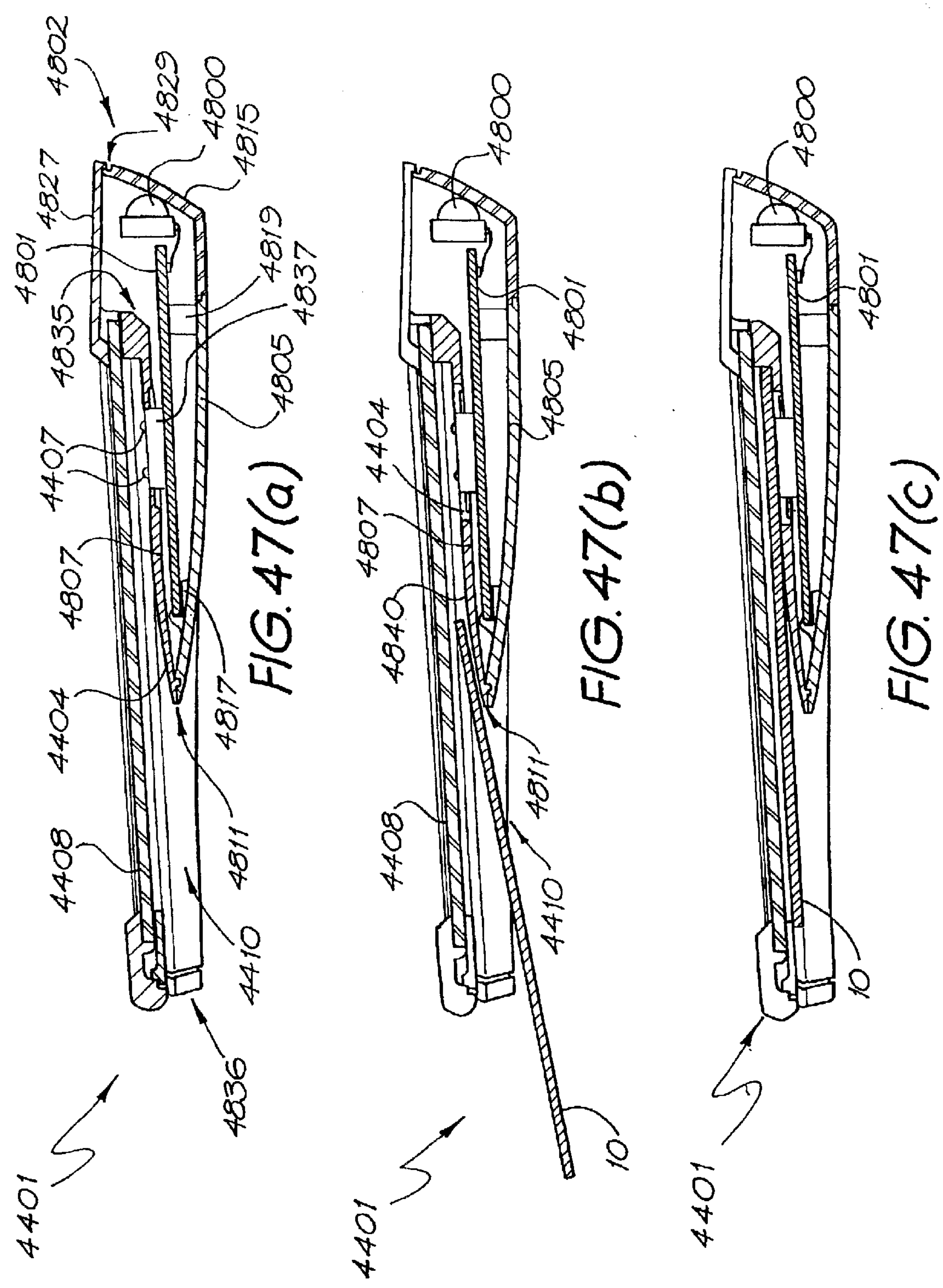
FIG. 47(*a*) is a longitudinal cross-sectional view along the line V—V of FIG. 44.

Referring to FIGS. 47(*a*) to 47(*c*), the housing 4402 is formed of a substantially two part outer shell defined by a top section 4827 that surrounds the membrane 4408, and a base section 4805 which extends from a connection 4829 with the top section 4827 to a location 4811 below and proximate the transverse centre of the membrane 4408. The base section 4805 incorporates a facing end 4815 formed from infrared (IR) transparent material thereby permitting IR communications being emitted by the reader 4401.

The location 4811 defines a point of connection between the base section 4805 a card support surface 4807 which extends through a plane in which the contacts 4407 lie to an interior join 4835 that sandwiches the membrane 4408 between the surface 4807 and the top section 4827. The access opening 4410 is substantially defined by the space between the location 4811 and a periphery 4836 of the housing 4402, seen in FIG. 47(*a*).

The contacts 4407 extend from a connector block 4837 mounted upon a printed circuit board (PCB) 4801, the PCB 4801 being positioned between the base section 4805 and the support surface 4807 by way of the two mountings 4817 and 4819. Arranged on an opposite side of the PCB 4801 to the connector block 4837 is electronic circuitry (not shown), electrically connected to the connectors 4407 and the touch sensitive membrane 4408 and configured for reading data from the card 10 according to depression of the membrane 4408. Also mounted from the PCB 4801 is an infrared light emitting diode (LED) 4800 positioned adjacent the end 4815 which acts as an IR window for communications with a device (e.g. the set top box 601) to be controlled.

FIG. 47(*b*) shows a similar view to FIG. 47(*a*), with the smart card 10 partially inserted through the access opening 4410 into the receptacle 4404. As can be seen in FIG. 47(*b*), the support surface 4807 has an integrally formed curve contour 4840 that leads downward from the plane of the contacts 4407 towards the join 4811. This configuration allows the reader 4401 to receive the smart card 10 such that the smart card 10 may be initially angled to the plane of the receptacle 4404, as seen in FIG. 47(*b*). The configuration of the curve contour portion 4840 of the support surface 4807 guides the smart card 10 into a fully inserted position under the force of the user's hand. Specifically, as the card 10 is further inserted, the curvature of the support surface 4807 guides the card 10 into the plane of the contacts 4407 and receptacle 4404.

FIG. 47(*c*) shows a similar view to FIG. 47(*a*), with the smart card 10 fully inserted into the receptacle 4404. In this position, the card 10 lies in the plane of the receptacle 4404 and the contacts 4407 which touch an associated one of the data contacts (not seen) of the smart card 10, and the smart card 10 is covered by the pressure sensitive membrane 4408. Further, the contacts 4407 are preferably spring contacts that act to provide a force against the card 10 and associated with the membrane 4408, sufficient for the card 10 to be held within the receptacle by a neat interference fit.

In the following description references to the reader 1 can be construed as references to a reader implemented as the reader 1 of FIG. 1 or the reader 4401 of FIGS. 43 to 47(*c*).

Figure 10:
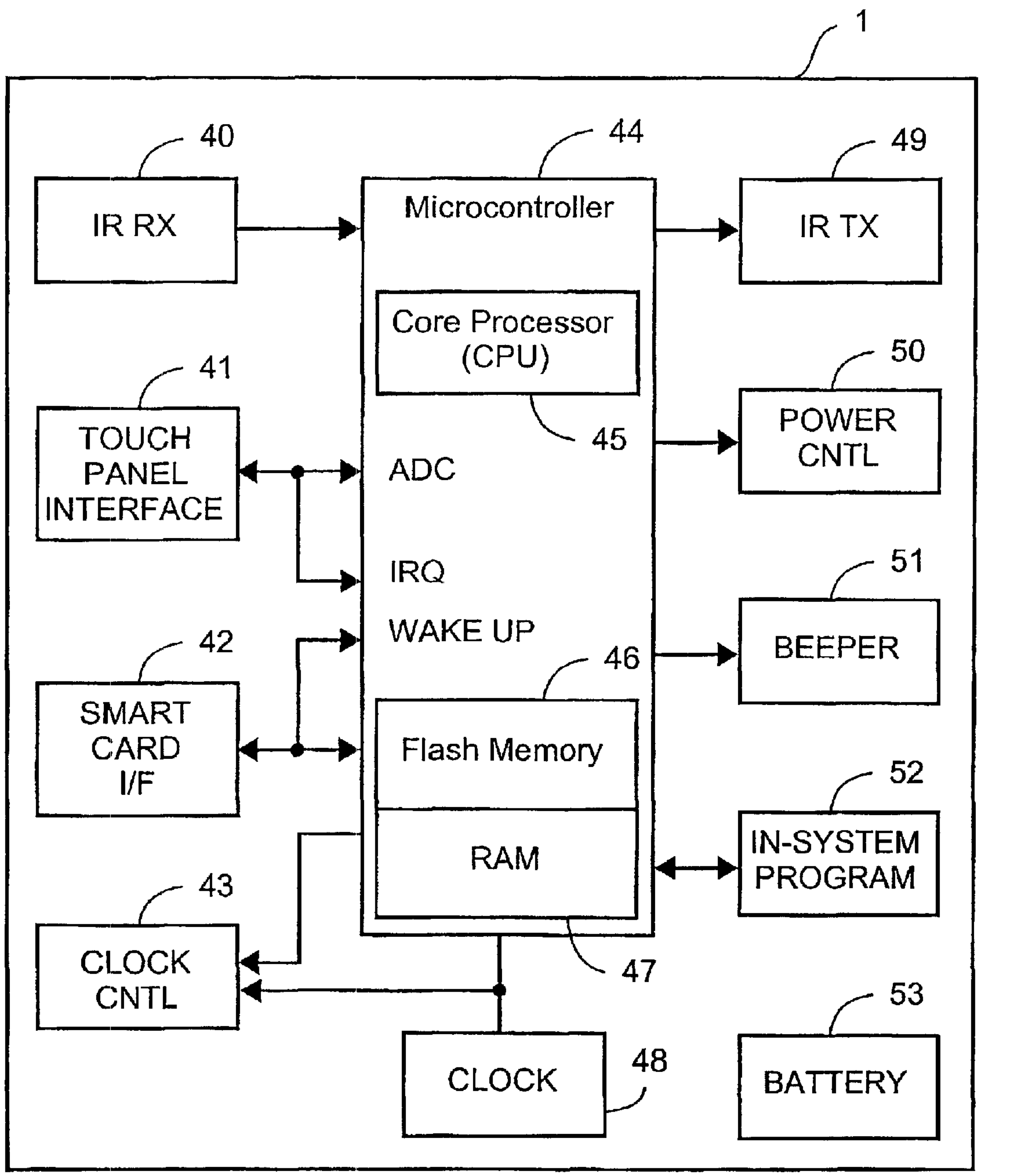
FIG. 10 is a schematic block diagram showing the internal configuration of the reader of FIG. 1.

FIG. 10 is a schematic block diagram showing the internal configuration of the remote reader 1 in more detail. The remote reader 1 includes a microcontroller 44 for controlling the remote reader 1, coordinating communications between the remote reader 1 and a set top box 601, for example, and for storing mapping information. The microcontroller 44 includes random access memory (RAM) 47 and flash (ROM) memory 46. The microcontroller 44 also includes a central processing unit (CPU) 45. The microcontroller 44 is connected to a clock source 48 and a clock controller 43 for coordinating the timing of events within the microcontroller 44. The CPU 45 is supplied with electrical power from a 5 volt battery 53, the operation of the former being controlled by a power controller 50. The microcontroller 44 is also connected to a beeper 51 for giving audible feedback about card entry status and for "button" presses.

Infra-red (IR) communications are preferably implemented using two circuits connected to the microcontroller 44, an IR transmitter (transmitter) 49 for IR transmission and an IR receiver (receiver) 40 for IR reception.

The pressure sensitive touch panel 8 of the remote reader 1 communicates with the microcontroller 44 via a touch panel interface 41. A smart card interface 42 connects to the electrical contacts 7.

An in-system programming interface 52 is also connected to the microcontroller 44, to enable programming of the microcontroller 44 by way of the microcontroller FLASH memory 46 with firmware. The firmware will be explained in further detail later in this document with reference to section 6.0.

The internal configuration of the remote reader 1 will now be described in further detail.

3.1 Low Power Mode Lifetime

The power controller 50 is operable to provide two power modes, one being a low-power "sleep" mode, and another being an active mode. The low power mode lifetime is the lifetime of the battery 53 expressed in years. When the remote reader 1 is not functioning and is in the low power mode, the lifetime can be between greater than 2 years.

If the reader 1 is in sleep mode and a user presses the touch panel 8, the remote reader 1 then comes out of sleep mode, and the CPU 45 calculates the touch co-ordinates and sends a serial message by infra-red transmission. The battery 53 should preferably remain serviceable for the current supply requirements of more than 100,000 button presses.

3.2 Service Life

The service life is defined as the period of time that the remote reader 1 can be expected to remain serviceable, not including battery replacement. The service life is related to the Mean Time Between Failures (MTBF) figure and is usually derived statistically using accelerated life testing. The service life of the remote reader 1 can thus be greater than 5 years.

3.3 Microcontroller

The microcontroller 44 of the remote reader 1 has an 8 bit central CPU with 4096 bytes of FLASH memory 46 and 128 bytes of random access memory 47. The microcontroller 44 preferably operates on a supply voltage from 3 to 5 Volts and has flexible on-board timers, interrupt sources, 8 bit analog to digital converters (ADC), clock watchdog and low voltage reset circuits. Preferably, the microcontroller 44 also has high current output pins and can be programmed in circuit with only a few external connections.

3.4 Clock Source

The main clock source 48 for the remote reader 1 is preferably a 3 pin 4.91 MHz ceramic resonator with integral balance capacitors. The frequency tolerance is 0.3%. While such tolerance is not as good as a crystal, such is however adequate for serial communications and is much smaller and cheaper than a crystal.

3.5 Beeper

The beeper 51 is included with the remote reader 1 to give audible feedback about card entry status and for button presses. The beeper 51 is preferably a piezo-ceramic disk type.

3.6 Infra-red Communications

As described above, infra-red (IR) communications are preferably implemented using two circuits, an IR transmitter 49 for IR transmission and an IR receiver 40 for reception. The two circuits 40 and 49 are preferably combined on a printed circuit board (e.g the PCB 4801 of FIG. 47) within the remote reader 1. The printed circuit board 4801 can be connected to the microcontroller 44 by a 4 way flat printed cable. Large bulk decoupling capacitors (not shown) are required on the PCB 4801 to provide surge currents, which are required when transmitting.

3.7.1 Infra-red Transmission

IR transmission is preferably by means of an infra-red Light Emitting Diode (LED) (e.g. the LED 4800 of FIG. 47(*a*)) forming part of the IR transmitter 49.

3.7.2 Infra-red Reception

The IR receiver 40 is preferably integrated with an infra-red filter, a PIN diode, an amplifier and discriminator circuitry into a single device. Received serial information passes directly from this device to an input port of the microcontroller 44. This port can be programmed to generate an interrupt on receiving data allowing speedy storage and processing of incoming signals.

3.8 CPU/Memory Card Interface

The remote reader 1 can preferably support smart cards 10 as defined by the International Standards Organisation (ISO) standards 7816-3 and ISO 7810. Three and five volt CPU cards (i.e. cards with an embedded microprocessor) with T=0 and T=1 protocols can also be supported as are 3 and 5V memory cards.

The electrical contacts 7 used to make contact between the card 10 and the microcontroller 44 are preferably a surface mount connector with 8 sliding contacts and a "card in" switch. In accordance with the ISO requirements the following signals must be provided:

Pin 1—VCC—Supply voltage;

Pin 2—RST—Reset signal. Binary output to card;

Pin 3—CLK—Clock signal, Binary output to card;

Pin 4—RFU—Reserved, leave unconnected;

Pin 5—GND—Ground;

Pin 6—VPP—Programming voltage, not required, link to GND, VCC or open;

Pin 7—I/O—Data I/O, bi-directional signal; and

Pin 8—RFU—Reserved, leave unconnected.

The RST and I/O pins are preferably connected directly to the microcontroller 44. All pins except the power supplies are equipped with series termination and transient voltage suppressor diodes to prevent electrostatic discharge problems.

3.9 CPU Card Power Supply

As described above, the microcontroller 44 requires a 3–5 Volt power supply for operation. The 5 Volt supply can be generated from a 3V Lithium coin cell operating as the battery 53 by means of the power controller 50 in the form of a regulated 5V charge-pump DC-DC converter chip.

3.10 Touch Sensitive Interface

As described above, the pressure sensitive touch panel 8 of the remote reader 1 communicates with the microcontroller 44 via a touch panel interface 41. The touch panel interface 41 provides an analog signal according to the position of the touch on the touch panel 8. This analog signal is then communicated to the microcontroller 44.

The calculation of touch co-ordinates requires bottom and left touch panel 8 contacts (not shown) to be connected to the inputs of an analog to digital converter on the microcontroller 44.

A touch on the touch panel 8 can preferably be used to wake up the remote reader 1 from sleep mode. A resistive connection from the left screen contact to a sleep WAKE UP port as illustrated provides this feature. Note that during in-system programming, up to 8 volts may be applied to a pin on the microcontroller 44 referred to as the Interrupt Request Pin (IRQ) so a clamping diode needs to be fitted to this pin to prevent device damage. In this instance, it is the internal pull up on the IRQ pin that actually provides the bias required to detect touch panel 8 presses.

3.11 Battery

As described above, the remote reader 1 uses a battery 53. A 5 Volt lithium coin cell can be used as the battery 53 to power all the circuitry of the remote reader 1.

3.12 In System Programming

The microcontroller supports in-system programming (ISP) options. The in-system programming interface 52 is used in the remote reader 1 to perform programming of the microcontroller 44 such as programming of the microcontroller FLASH ROM memory 46 with firmware.

3.13 Printed Circuit Boards and Interconnection

The remote reader 1 can include two printed circuit boards (PCB), instead of the one PCB 4801 of the reader 4401, as follows:

(i) an infra-red (IR) PCB which holds the infra-red diode, drive FET and receiver; and (ii) a main PCB (e.g. the PCB 4801 of FIG. 47(*a*)) which holds all the other components 40 to 53 mentioned above.

Both of the PCB boards described above are preferably double sided designs using standard grade FR4, 1.6 mm PCB material. The main PCB preferably utilises surface mount components since the thickness of the finished PCB is critical and preferably components are restricted to a height of approximately 3 mm max.

The IR PCB can use through hole parts but again there are preferably stringent component height restrictions imposed. The interconnection of the two PCBs is via a custom designed 4 way flat printed cable (FCA). This interfaces to the two PCBs via a surface mount FCA connector that is the same part used to interface to the touch panel 8.

3.14 Low Power Mode

When the remote reader 1 has not been used for a short period of time, pre-programmed firmware preferably puts the unit into the low-power mode to conserve battery life. In low-power mode, the supply voltage is switched off to all current consuming components, the ports of the microcontroller 44 are set into a safe sleep state and the clock 48 is stopped. In this state the current consumption of the remote reader 1 is less than 5 μA. A P-channel FET can be used to control the supply of power to the current consuming components.

There are three alternative preferred methods to wake the remote reader 1 up from low power mode as follows:

touch the touch panel 8;

insert a card into the card receptacle 4; and remove and re-insert the battery 53.

The card insert wake up enables the remote reader 1 to always beep when a card is inserted, regardless of whether the unit is in low power mode or not. The touch and card insert wake ups are handled by the IRQ pin as illustrated on the microcontroller 44. It is important that this pin is set to "edge trigger" only so that only a new touch or card insert wakes the microcontroller up. If IRQ sensitivity is set to "level" trigger then inadvertently leaving the touch panel 8 pressed, for example when the remote reader 1 is packed in luggage, would prevent the remote reader 1 from entering low power mode.

3.15 Interrupts and Resets

The microcontroller 44 firmware for the remote reader 1 uses two external and one internal interrupt sources. External interrupts come from the IRQ pin for low power mode wake up. The internal interrupt is triggered by a timer overflow and is used to time various external interfaces. These interrupts are serviced by pre-programmed firmware procedures.

There are four possible reset sources for the microcontroller as follows:

low supply voltage reset at 2.4 Volts;

illegal firmware op-code reset;

Computer Operating Properly (COP) reset if firmware gets stuck in a loop; and

ISP reset forced onto a RESET pin when in-system programming (ISP) starts.

4.0 Card Data Format

The format of data for the card 10 described above will be described in the following paragraphs. For memory cards such as the control card 10B as described in relation to FIG. 4, data conforming to the format to be described will be copied directly onto the card. For the CPU cards described above, data conforming to the format to be described can be loaded as a file into the file system of the CPU of the card.

The card 10 described above preferably stores a data structure that describes various card properties and any user-interface indicia printed on the card. The cards 10 can also include global properties that specify attributes such as information about the card, vendor and a service. User-interface objects, if present, specify data to associate with areas of the surface of the card 10.

The user-interface objects as described herein, represent mapping data, which relate predetermined areas, or iconic representations directly imprinted on a surface of the card 10, to commands or addresses (eg: Uniform Resource Locators (URLs)). The mapping data includes coordinates which typically define the size and location of user Interface Elements (eg: predetermined areas) on the card 10. In this connection, the term user interface element typically refers to indicia on the card 10, whilst the term user interface object typically refers to the data related to a particular indicia. However, these terms are used interchangeably throughout the following description.

The user-interface objects are preferably stored directly on the card 10. Alternatively, the user-interface objects can be stored not on the card 10 itself, but in the system 600. For example, the card 10 can store, via an on-card memory, a barcode or a magnetic strip, a unique identifier, which is unique to cards 10 having substantially similar user interface elements and layout. The unique identifier together with the coordinates determined from the touch panel 8, as a result of a user press, can be transmitted by the reader 1 to the computer 100 or to the set top box 601, of the system 600. The system 600 having the user-interface objects stored on the computer 100, set top box 601 or a server 150, can perform the mapping from the determined coordinates to a corresponding command, address or data relevant to a service associated with the card 10 and the user press, in order to provide a desired function represented by the user interface element on the card 10. In this instance, the data related to the user selected indicia as described above takes the form of coordinates determined by the reader 1 as a result of a user press on a portion of the touch panel 8 which overlays the desired indicia.

In the cards (e.g. 10) described above, data stored by the card 10 includes a card header followed by zero or more objects as described in the following sections.

4.1 Card Header

Figure 11:
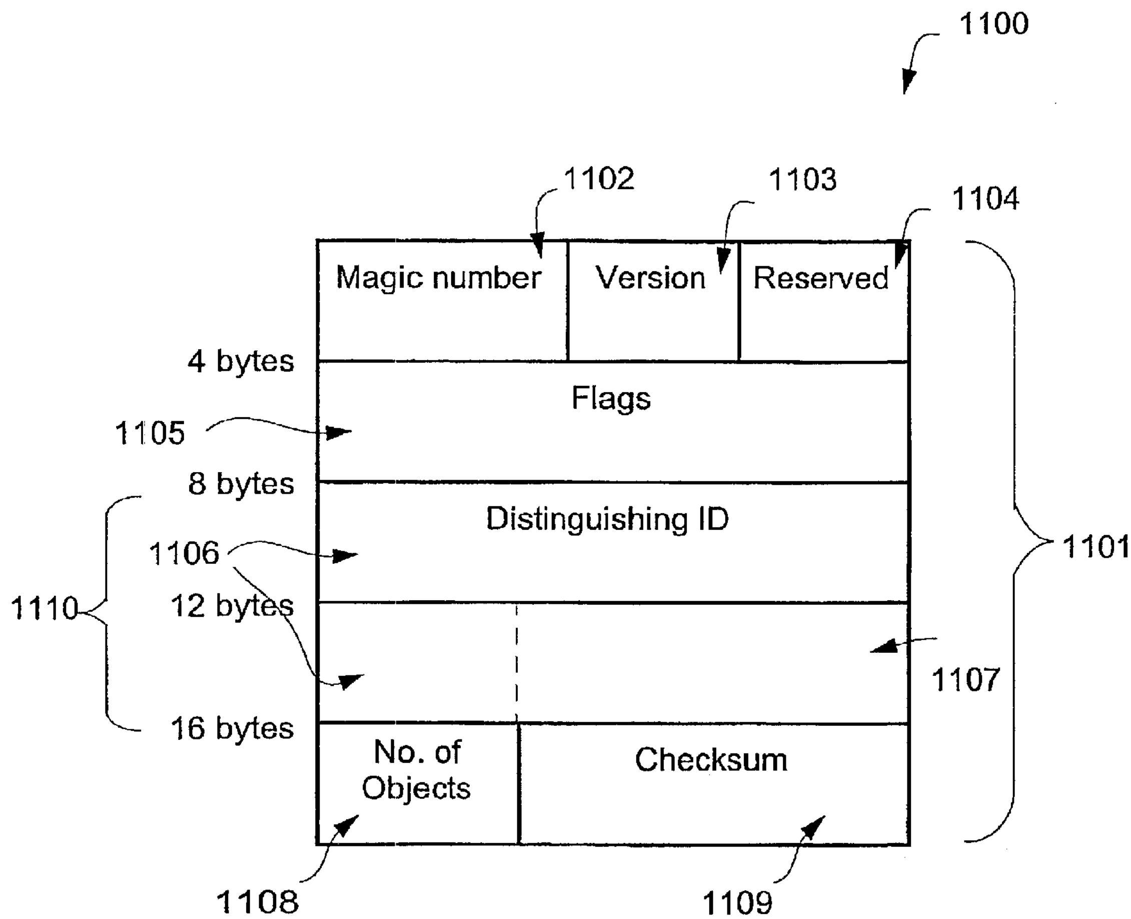
FIG. 11 shows the data structure of a card header as stored in the card of FIG. 1.

FIG. 11 shows the data structure of a card header 1100 as stored in the smart card 10. The header 1100 includes a number of rows 1101, each of which represent four bytes of data. The data is preferably in 'big endian' format. The complete header is 20 bytes long and includes the following fields (described in more detail in FIG. 12):

(i) magic number field 1102, which includes a constant specifying a card as being a valid memory card. For example, the magic number field 1102 can be used to check or verify that a propriety card belonging to a particular manufacture is being used.

(ii) versions field 1103, which includes each version increment that specifies a change in the card layout that can not be read by a reader which is compatible with lower versions of the layout;

(iii) reserved field 1104, this field is reserved for future use;

(iv) flags field 1105, which includes flags for a card (see FIG. 13);

(v) distinguishing identifier field 1110, which includes two fields—a service 1106 and a service specific field 1107. The service field 1106 identifies the service of a corresponding card and the service specific field 1107 optionally contains a service-specific value;

(vi) a number of objects field 1108, which includes a number value representing how many objects follow the header. This field can be set to zero; and (vii) a checksum field 1109, which includes a card checksum of all data on the card excluding the checksum itself.

FIG. 12 provides a description of the content of the various (number) fields described with reference to FIG. 11. In particular, the distinguishing ID number field 1110 comprises an eight byte distinguishing identifier. The distinguishing identifier includes two portions, unit pieces of data, namely, a service identifier and a service-specific identifier. Preferably, the distinguishing identifier is arranged so that the service identifier occupies five bytes and the service-specific identifier occupies three bytes of the total distinguishing identifier value.

The service identifier contained in the field 1106 distinguishes one service from another or distinguishes one vendor from another. That is, for example, a service can be associated with an application that provides the service to a card user as distinct from a vendor who can provide multiple services to the card user by providing multiple applications.

The service identifier can be an identifier to identify the application to be used or application location (e.g. URL). Also, generic cards may be added to the System 600A or 600B and they are a special use of the Service identifier. The Generic cards are cards with a special Service identifier that can be used to provide input to a current application already running. The special value for the service 0x0000000001 is known as "the generic service identifier" and is used on "generic cards". A generic card can be used to send data to the front application already running. These are used, for example, for keypads that can be used to send text input to any application or a card with personal details that also may be used to submit this information to any application.

The service—specific identifier contained in the field 1107 can be optionally used by the vendor of a particular service to provide predetermined functions associated with that particular service. The use of the service-specific identifier is substantially dependent upon the application 304 run on the system 600. For example, the service identifier together with the service-specific identifier can be used as a unique identifier for a card 10. This unique identifier can be used to gain or deny access to a specific feature associated with a particular service, to reproduce a specific-service identifier in a log file in order to confirm or verify that a particular card 10 having that value was used to access a service, and to provide a unique identifier that can be matched up with a corresponding value in a database in order to retrieve information about the user of the service (eg: name, address, credit card number etc).

Another example of a use for the service-specific identifier can include providing information about a mechanism or mode of distribution of the cards 10 (e.g. by mail, bus terminal kiosks, handed out on a train etc). Further, the service-specific identifier, can identify what data should be loaded into the system 600 when a service is accessed.

The foregoing is not intended to be an exhaustive list of possible uses or applications of the service-specific identifier but a small sample of possible applications and there are many other applications of the service-specific identifier of field 1107.

4.1.1 Card Flags

The flags field 1105 of the header 1100 of FIG. 11 may include three flags as follows:

(i) Don't beep;

(ii) No move events; and (iii) No event co-ordinates.

FIG. 13 shows a description of each of the above flags. The above flags affect the functions that a smart card 10 can perform in a remote reader 1, as is defined by the description of each flag. An example, of a user interface element as referred to in FIG. 13 is a "button" on the card 10. user interface elements will be explained in further detail later in this document.

4.2 Objects

Figure 57:
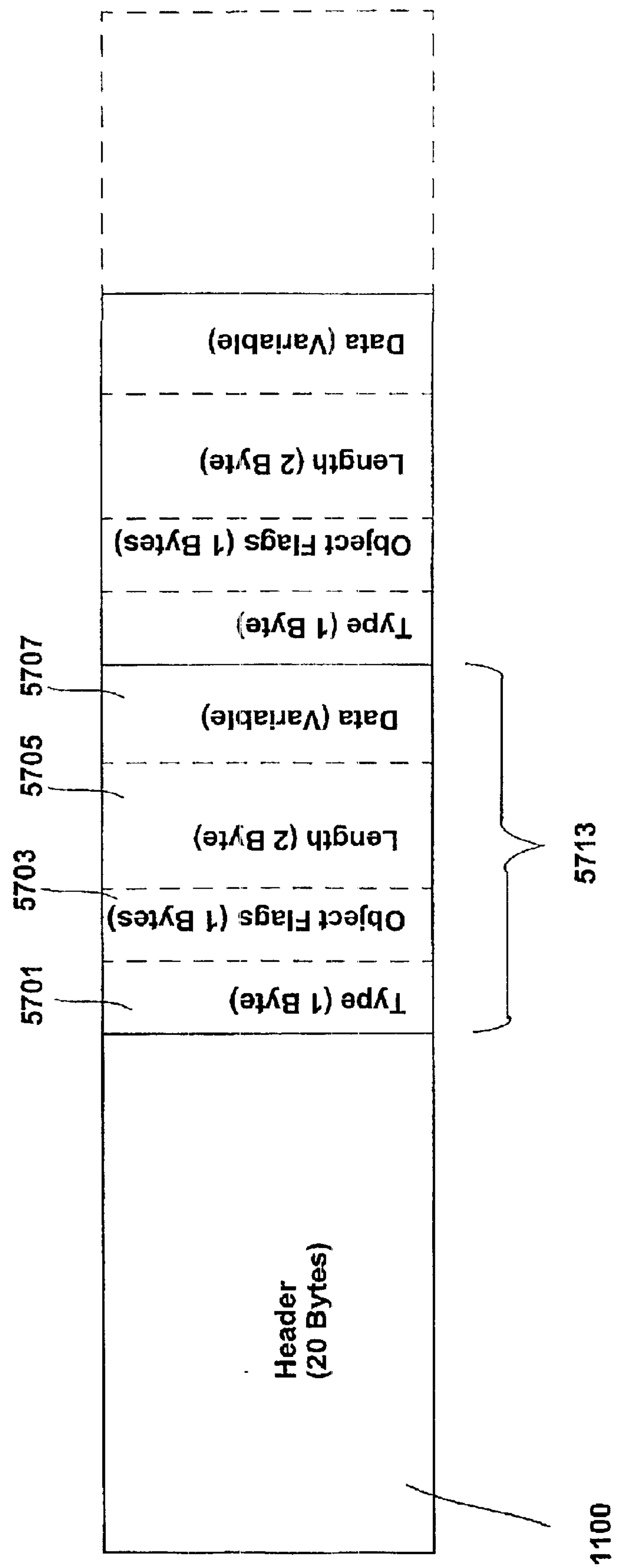
FIG. 57 shows one or more object structures following the card header of FIG. 11.

As shown in FIG. 57, immediately following the card header 1100 of FIG. 11 can be zero or more object structures 5713 defining the objects of a particular card 10 and forming part of the data stored on the card 10. Each object structure 5713 comprises four fields as follows:

(i) a type field 5701;

(ii) an object flags field 5703;

(iii) a length field 5705; and (iv) a data field 5707.

The structure of the data field 5707 depends on the object type as will be described below.

FIG. 14 shows a description of each of the fields 5701, 5703, 5705 and 5707 of the object structure 5713. The flags field 5703 of the object structure 5713, preferably includes an inactive flag. FIG. 15 shows a description of the inactive flag.

There are preferably five object types provided for the cards 10A, 10B, 10C and 10D described above, as follows:

(i) user Interface objects (i.e. data defining a button on the card 10);

(ii) Card Data;

(iii) Fixed Length Data;

(iv) Reader Insert;

(v) No operation; and (vi) No operation (single byte).

FIG. 16 shows a description of each of the above object types (i) to (vi).

4.2.1 User Interface Object

Each user interface object defines a rectangular area on the card 10 and some quantity of associated data that is transmitted when the user touches an area of the panel 8 over the corresponding rectangular area of the card 10. The origin for the co-ordinate mapping system is the top left of the smart card 10 as if it was an ISO standard memory smart card held in a portrait view with the chip contacts 18 facing away from the viewer and towards the bottom of the card 10. For any reader 1 that does not use this card orientation, the values of the comer points must be adjusted by the reader 1 so as to report a correct "button" press.

The user interface (element) object structure preferably has six fields as follows:

(i) a flags field;

(ii) an X1 field;

(iii) an Y1 field;

(iv) an X2 field;

(v) a Y2 field; and (vi) a data field which typically includes data associated with the user interface element for example, a URL, a command, a character or name.

FIG. 17 shows a description of each of the above fields for the described user interface object structure. A press on the pressure sensitive touch panel 8 is defined to be inside a particular user interface object if:

(i) the X value of the press location is greater than or equal to the X1 value of the associated user interface object and is strictly less than the X2 value for that particular user interface object; and (ii) the press Y value for the press location is greater than or equal to the Y1 value of the particular user interface element and strictly less than the Y2 value.

Overlapping user interface elements is allowed. If a press is within the bounds of more than one user interface element then the object sent is determined by a Z order. The order of the user interface elements on the card defines the Z ordering for all of the user interface elements on that particular card. The top user interface element is the first user interface element for a particular card 10. The bottom user interface element is the last user interface element for that particular card 10. This allows for non-rectangular areas to be defined. For example, to define an "L" shaped user interface element, a first user interface object would be defined with zero bytes in the data field, and a second user interface object would be defined to the left and below the first user interface object but overlapping the user interface object.

The location of a press is to be reported in "fingels", which represent finger elements (analogous to "pixels" which represent picture elements). The height of a fingel is defined to be 1/256th of the length of an ISO memory smart card and the width is defined to be 1/128th of the width of an ISO memory smart card. The behaviour associated with each element may be modified with one or more flags. Each user interface element preferably has four associated flags as follows:

(i) Invert Beep Enable;

(ii) Auto repeats;

(iii) Do Not Send Data on Press; and (iv) Do Not Send Data on Release.

FIG. 18 shows a description for each of the user interface element flags.

4.2.2 Card Data

The Card Data object is used to store data which is specific to a particular card. The data layout for this object has no fixed form. The contents of the Card Data object are sent from the reader 1 as part of the INSERT message when the card 10 is inserted into the reader 1.

4.2.3 Fixed Length Data

The fixed length data object is used to define a fixed length block on the card that can be written to by the computer 100, for example.

4.2.4 Reader Insert

The reader insert object is used to store instructions for the remote reader 1 when a particular card is inserted. This can be used, for example, to instruct the reader 1 to use a specific configuration of IR commands to allow communication with a specific set top box or TV.

4.2.5 No Operation

The No Operation object is used to fill in unused sections between other objects on a particular card. Any data stored in the no operation object is ignored by the remote reader 1. Any unused space at the end of the card 10 does not need to be filled in with a no operation object.

4.2.6 No Operation (One Byte)

The No Operation (One Byte) object is used to fill gaps between objects that are too small for a full object structure. These objects are only one byte long in total.

5.0 Reader Protocol

The remote reader 1 uses a datagram protocol that supports both uni-directional and bi-directional communication between the remote reader 1 and the set top box 601 or computer 100, for example. The format used for messages from the remote reader 1 as a result of user interactions with the remote reader 1 are of a different format than those that are sent to the remote reader 1.

5.1 Message Types

There are at least seven message event types that can be sent by the remote reader 1.

These events are as follows:

INSERT: When a card 10 is inserted into the remote reader 1, and the card 10 is validated, an INSERT event is generated by the remote reader 1 and an associated message is transmitted. This message announces the card 10 to a receiver (e.g. the set top box 601). The INSERT message preferably includes the particular distinguishing identifier and allows applications to be started or fetched immediately upon card 10 insertion rather than waiting until the first interaction takes place. The INSERT message preferably includes the contents of the card data object from the card 10 inserted into the reader 1 if an object of this type is present on the card 10.

REMOVE: When a card 10 is removed from the remote reader 1, a corresponding REMOVE event is generated and a REMOVE message is sent to the particular receiver associated with the remote reader 1. Like the INSERT message, the associated distinguishing identifier is transmitted along with the message. As the distinguishing identifier cannot be read from the now removed card 10, the distinguishing identifier is stored in the memory 47 of the remote reader 1. This is a useful optimisation as the distinguishing identifier is required for all other messages and reading the distinguishing identifier from the card 10 each time the distinguishing identifier is required can be too slow. INSERT and REMOVE messages are not relied upon by the system 600 to control processing. The system 600 is configured to infer missing messages if a message is received and is not immediately expected. For example, if an application detects two INSERT messages in a row, then an application can assume that it has missed the REMOVE message associated with the card of the first INSERT message as it is not possible to have two cards inserted at one time in present arrangement. The application can then take whatever action is required prior to processing the second INSERT message.

Another example of where a missing message can occur is where a hand-held, infrared connected reader 1, as compared with a wired reader, is being used. Often a user does not point the reader 1 directly at a receiver when inserting or removing cards. This problem can be corrected by the system 600 inferring the INSERT or REMOVE operations based on differing distinguishing identifiers in consecutive PRESS and RELEASE pairs.

BAD CARD: If an invalid card is inserted, then the remote reader 1 is preferably configured to generate a BAD CARD event and to send a BAD CARD message. This message allows an associated receiver to take some action to alert the user to the invalid card.

PRESS: When a touch is detected by the remote reader 1, a PRESS event is generated and a PRESS message is sent to an associated receiver. The PRESS message contains details of the associated card, the position of the press and the data associated with the user-interface element at that particular position. If there is no user interface element defined for that position (including if there is no user interface elements defined on the card 10 at all) a PRESS message is sent containing details of the associated card and the position of the press. If there is no card present in the remote reader 1 when a PRESS event is generated then a PRESS message is sent containing the special "NO_CARD" identifier (i.e. eight bytes of zero—0x00) and the position of the press.

RELEASE: A RELEASE event complements the PRESS event and a RELEASE message can be sent in order to inform the application program of the system 600 that a PRESS has been lifted. Every PRESS event preferably has a corresponding RELEASE event. Readers can allow multiple presses to be registered or provide other events that may occur between PRESS and RELEASE messages.

MOVE: If, after processing a PRESS event, the touch position changes by a certain amount then the finger (or whatever is being used to touch the card) is assumed to be moving. MOVE EVENTS are generated and MOVE messages are sent until the touch is lifted. MOVE events auto-repeat by re-sending the last MOVE messages when the touch position remains stationary. The repeated sending finishes when the touch is lifted and a corresponding RELEASE message is sent. Unlike PRESS and RELEASE events there is no user-interface object involved with MOVE events.

LOW BATT: A LOW BATT event is generated and a LOW BATT message is sent when the battery 53 in the remote reader 1 is getting low. This message is sent after user interactions to increase the chance that the message will be received by the rest of the system 600. The sending of the LOW BATT message does not prevent the remote reader 1 from entering a low power state.

5.2 Data Formats

The preferred data format of the reader protocol used in the system 600 is a fixed size header followed by a variable length data field which can be zero bytes or more in length, followed by an eight bit check-sum and complement.

5.2.1 Message Header

The message header is preferably of a fixed length and is prepended (i.e. appended to, but in front of) to all messages sent from the remote reader 1. It is necessary to keep the message header as small as possible due to any bandwidth restrictions that may be imposed. FIG. 19 shows the format of the message header that is sent from a remote reader 1.

Service and service-specific identifiers can be assigned, by a smart card identification authority, to a vendor when the vendor registers a particular service. The service and service-specific identifier are the same for every message from a given card. A service specific identifier is preferably set by a vendor for use with their application. The Reader identifier is also in the header of each message. This identifier can be used by an application 304 to distinguish different users, for example, in a multi-player game.

FIG. 20 shows a table listing the message event types that have been described above.

5.2.2 Simple Messages

A number of message types are considered simple in that they consist solely of the message header described above followed by the message checksum byte and its complement. For example, a BADCARD message, a LOW_BATT message and a REMOVE message are simple messages.

FIG. 21 shows the format of a simple message.

5.2.3 Move Messages

MOVE messages are formed of the message header described above followed by two fields defining the co-ordinates of the touch position on the touch panel 8 of the remote reader 1. FIG. 22 shows the format of a MOVE message.

5.2.4 Press and Release Messages

FIG. 23 shows the format of PRESS and RELEASE messages. PRESS and RELEASE messages, like MOVE messages contain the message header and touch co-ordinates. In addition, PRESS and RELEASE messages send data associated with the user-interface element if the touch position matches a user-interface element defined on the card. This data is of variable length, the actual size being defined by a corresponding card 10. If the touched position does not match a user-interface element defined on the card (including if no user-interface elements are defined on the card), zero bytes of data associated with user interface elements are sent. If there is no card 10 in the reader 1 then the service identifiers are all set to zero (ie 0x00) and zero bytes of data associated with the user-interface elements are sent. The data associated with the user interface element normally corresponds to the data associated with the user interface element defined on the card but may be modified or generated by processing on the card 10 or reader 1.

Figure 24:
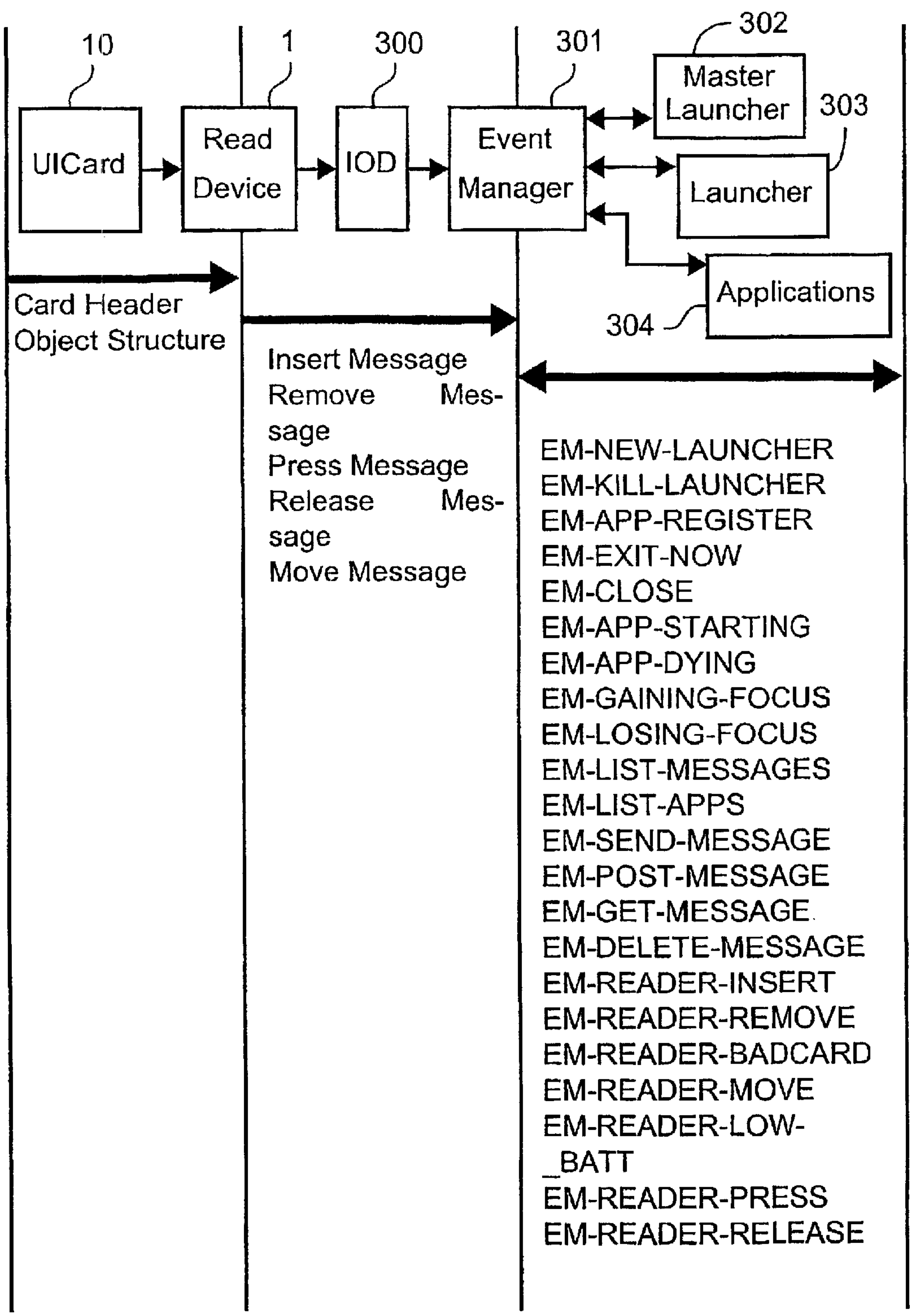
FIG. 24 is a data flow diagram showing the flow of messages within the system of FIG. 6.

FIG. 24 is a data flow diagram showing the flow of the above-described messages within the system 600. As seen in FIG. 24, the card header 1100 and object structure 5713 are read by the CPU 45 of the remote reader 1 which sends a corresponding INSERT, REMOVE, PRESS, RELEASE, MOVE, BADCARD or LOW BAT message to the event manager 301 via the I/O daemon 300. As will be described in more detail below, the event manager 301 has twenty-one core messages, which are sent to and received from the ML 302, launcher 303 and applications 304.

5.2.5 Insert Messages

INSERT messages are formed of the message header described above and the contents of the card data object from the inserted card 10. FIG. 21A shows the format of an INSERT message.

6.0 Reader Firmware 6.1 Overview

The microcontroller 44 has non-volatile memory 46 embedded within which can be programmed with the firmware to be described in detail below. The firmware working in concert with the microcontroller 44 and peripheral hardware (e.g. the computer 100) can thus dictate the functional requirements of the remote reader 1.

6.2 Code Type

In an attempt to minimise the cost of the remote reader 1 to a user, memory on the remote reader 1 is preferably minimised. As a result the application program written for the remote reader 1 (i.e. the firmware) must be as compact and fast as is possible.

6.3 Resource Constraints

The microcontroller 44 has the following characteristics:

6.3.1 Non-volatile Memory

The flash memory 46 is configured with 4096 bytes of FLASH ROM and can be utilised for firmware storage. The FLASH ROM is re-programmable but in the case of mass production a MASK ROM part can be utilised.

6.3.2 Random Access Memory (RAM)

The RAM 47 is configured as 128 bytes of RAM for use by the firmware.

6.4 Interrupts

The remote reader 1 uses two of the numerous interrupt sources supported by the microcontroller 44. These interrupts can be described as follows:

6.4.1 Received Data Interrupt

An infrared (R) serial data receiver generally generates a falling edge when incoming data is received. This data has to be sampled and buffered as quickly as possible. One port of the microcontroller 44 doubles as an input timing capture pin which can initiate an interrupt on the falling edge.

6.4.2 Timer Overflow Interrupt

The microcontroller 44 has a free-running 16-bit timer which can be programmed to generate an interrupt when it overflows. In conjunction with the 4.91 MHz clock source and pre-scale factor of 64, this equates to an interrupt every 3.41 seconds. An interrupt service routine increments a counter which triggers the suspension to low power mode preferably after about one minute of inactivity.

6.5 Resets

The microcontroller 44 supports five reset sources and the remote reader 1 is preferably configured to use all of reset sources. These reset sources can be described as follows:

6.5.1 Power On Reset (POR)

The POR reset is initiated when a new battery is fitted to the remote reader 1. The microcontroller 44 includes a circuit that detects the power on condition and generates a reset.

6.5.2 Low Voltage Inhibit (LVI) Reset

The LVI reset is initiated when a circuit (not shown) within the microcontroller 44 detects that the supply voltage has fallen below 2.4 Volts. When this kind of reset occurs a flag is set in a Reset Status Register (RSR) and an initialisation routine can deduce that the battery 53 is becoming depleted. For example, when infrared data is being transmitted, the infrared LED consumes high current as it is being pulsed. If the battery 53 is depleted, the supply voltage can dip under the 2.4 Volt threshold during transmission causing an LVI reset. After reset the battery 53 voltage recovers and the LVI reset does not occur until the next high current drain. This gives the remote reader 1 a chance to flag the falling of the battery 53 to an associated set-top box or remote equipment so that the user can be prompted to replace the battery 53.

6.5.3 Computer Operating Properly (COP) Reset

The COP reset is configured to reset the microcontroller 44 if the microcontroller 44 gets stuck doing a particular operation for an inordinate amount of time. The COP circuit takes the form of a counter that generates a reset if the counter is allowed to over-flow. The COP register must be written at predetermined time intervals to avoid a COP reset.

6.5.4 Illegal Address/Opcode Reset

An Illegal Address/Opcode Reset is generated by the microcontroller 44 if it encounters either an address out of a predetermined range or an opcode that does not conform to predefined conditions. This reset cannot be turned off but should only be in evidence during code debugging.

6.5.5 Hardware Reset

A hardware reset is generated by driving a 'Reset' pin on the microcontroller 44 low during normal operation. Additionally, if the microcontroller 44 is in low power mode, a falling edge on the Interrupt Request (IRQ) pin also generates a hardware reset. This reset is the mechanism used to wake the microcontroller 44 out of low power mode in the firmware. The IRQ pin is preferable for this function since it can be configured to be edge sensitive only, not level sensitive as the reset pin is.

6.6 Memory Card/CPU Card Interface

The firmware preferably supports only memory card peripherals using an Integrated Circuit Protocol (e.g. the $I^2C$ protocol). Alternatively, the firmware can support CPU card formats.

6.7 Power Consumption

The firmware plays a critical role in conserving the life of the battery 53. All operations performed by the microcontroller 44 are optimised so as to be performed as quickly as possible while wasting as little power as possible. As soon as the remote reader 1 has been inactive for a time (e.g. 1 minute) the microcontroller 44 suspends to low power mode to conserve battery life still further. Low power mode consumes about 1000 times less current than normal operating mode so efficient suspension to this mode is very desirable. The firmware controls the state of the microcontroller 44 ports during low power mode.

6.8 Device Programming

The microcontroller 44 is able to be programmed using an In-System program (ISP) function supported by an embedded monitor within the microcontroller 44. Monitor code is typically factory set by a manufacturer and can not be altered.

Programming of the microcontroller 44 for specific hardware can be performed using an In-Circuit Simulator (ICS) kit and a monitor-mode download cable. This cable uses the VCC, GND, RST, IRQ and PTBO pins on the microcontroller 44. Source code to be programmed can be delivered, for example, from a Windows™ 95 development environment via a computer serial port to the ICS hardware and from there via the download cable to the microcontroller 44 pins. This programming method is ideal for firmware development and testing, but may be altered for mass production. A monitor-mode programming model is preferred in the microcontroller and an embedded programming jig for production can be used. Test points for programming signals can be provided to allow for production ISP. If the firmware is mask programmed into the microcontroller 44 then device programming will not be required 6.9 Firmware Programming Sequence The programming of the firmware will be described with reference to the reader 1 being operative coupled to a local computer 100.

6.9.1 The Main Loop

Figure 25:
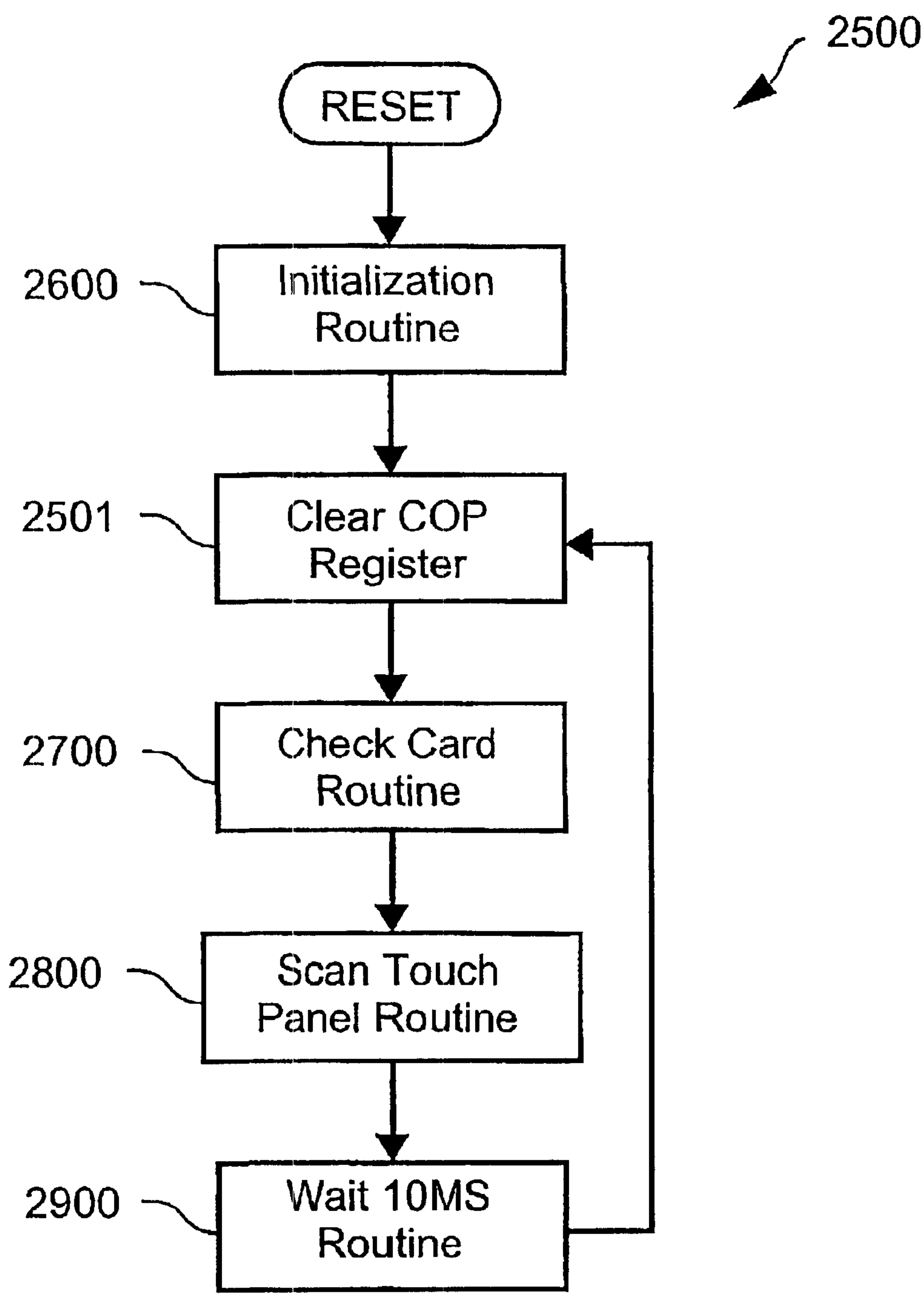
FIG. 25 is a flow diagram showing a read method performed by the reader of FIG. 1.

FIG. 25 is a flow diagram showing the read method 2500 performed by the remote reader 1 of the system 600 incorporating the software architecture 200. The method 2500 begins after a reset event, as described above, has been generated and the method 2500 is executed by the CPU 45. The method of FIG. 25 is configured in a "paced loop" manner. That is, the method 2500 is paced by a routine, which generates a 10 ms delay. This delay gives adequate service to the necessary routines while providing good latency for the handling of interrupts.

At the first step 2600, an initialisation routine is performed by the CPU 45. The initialisation routine is performed in order to initialise configuration registers and will be explained below with reference to the flow diagram of FIG. 26. The method 2500 continues at the next step 2501, where the computer operating properly (COP) register is cleared indicating that the firmware is not stuck in any recurring loops. At the next step 2700 a check card process is performed by the CPU 45, in order to check for any changes in the presence and validity of a particular smart card 10. The check card process will be explained in more detail below with reference to the flow diagram of FIG. 27. The method 2500 continues at the next step 2800, where a scan touch panel process is performed by the CPU 45 to check for any touches on the touch panel 8 by the user. At the next step 2900, a wait 10 ms routine is performed by the CPU 45, and the method 2500 then returns to step 2501.

6.9.1 The Initialisation Process

Figure 26:
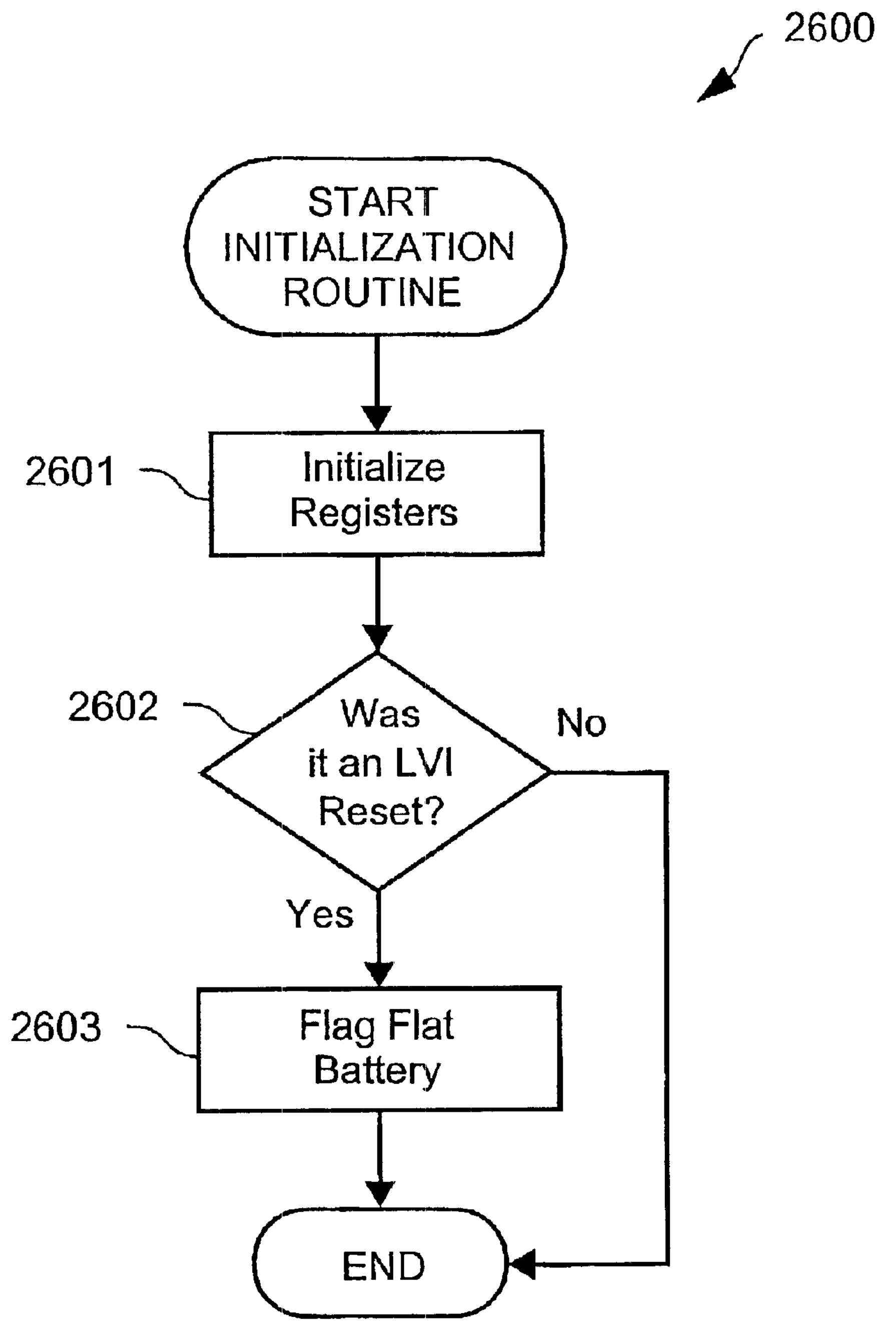
FIG. 26 is a flow diagram showing a method of initialising the system of FIG. 6, performed during the method of FIG. 25.

After a reset from any one of the five sources described above all configuration registers require correct initialisation. If an LVI reset was received then a "possibly depleted battery" flag is set. FIG. 26 is a flow diagram showing a method 2600 of initialising the system 600 incorporating the software architecture 200. The method 2600 is executed by the CPU 45 and begins at step 2601 where all registers are initialised to a predetermined default state. At the next step 2602, a check is performed by the CPU 45 to determine if the reset was an LVI reset. If the reset was not an LVI reset at step 2602, then the method 2600 concludes. Otherwise the method 2600 proceeds to step 2603 where the possibly depleted battery flag is set and then the method 2600 concludes.

6.9.2 The Check Card Process

Figure 27:
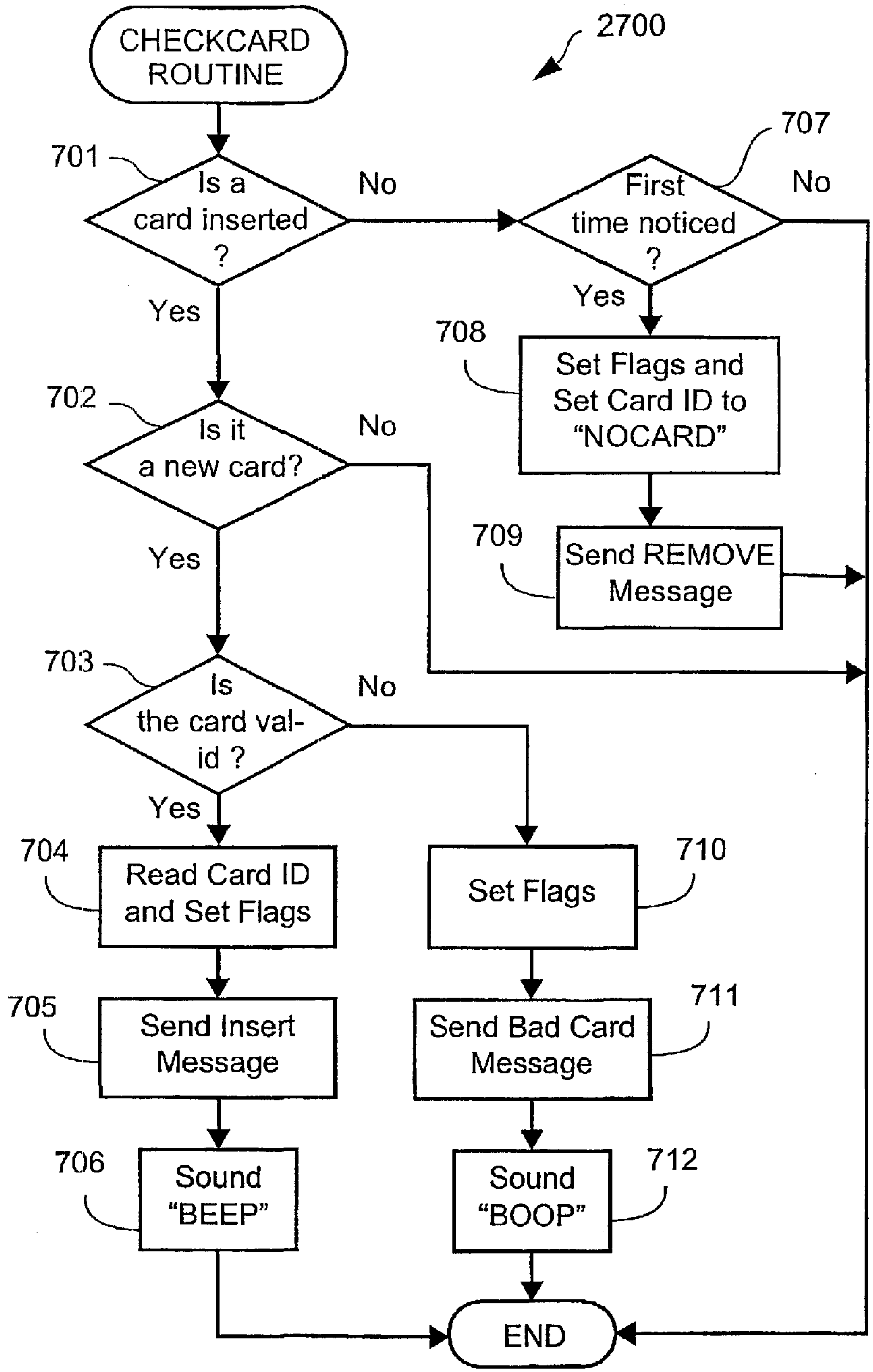
FIG. 27 is a flow diagram showing a method of checking the card of FIG. 1, performed during the method of FIG. 25.

FIG. 27 is a flow diagram showing a method 2700 of checking the card 10 of the system 600 incorporating the software architecture 200. As described above, the method 2700 checks for changes in the presence and validity of a smart card 10 in the remote reader 1 and responds accordingly. The method 2700 is performed by the CPU 45 and begins at step 701 where if a smart card 10 is inserted in the remote reader 1, then the method 2700 proceeds to step 702. At step 702, if the card 10 is a new card (i.e. in the previous state there was no card in the reader 1), then the method 2700 proceeds to step 703. Otherwise, the method 2700 concludes. At the next step 703, the "magic number" and "checksum" fields are read from the card header stored in the memory 19 of the card 10, and are checked for correctness. If the "magic number" and "checksum" are correct, then the method 2700 proceeds to step 704. The method 2700 continues at step 704, where the distinguishing identifier is read from the card header and the "No MOVE events" and "No Event Co-ordinates" flags are set. The Card Data, if present, is also read from the card at this step 704. At the next step 705, an INSERT message, including the Card Data if present, is sent to computer 100, and the INSERT message is processed by the CPU 205. Then at step 706, a "BEEP" is sounded and the method 2700 concludes.

If the "magic number" and "checksum" fields are not correct (ie: the card 10 is not valid) at step 703, then the method 2700 proceeds to step 710 where the don't beep, no move events and event co-ordinate flags are set. At the next step 711, a BAD CARD message is sent to the computer 100, and the BAD CARD message is processed by the CPU 205. Then at step 712, a "BOOP" is sounded and the method 2700 concludes.

If a smart card 10 is not inserted in the remote reader 1 at step 701, then the method 2700 proceeds to step 707. At step 707, if this is the first operation of the reader 1 after the reset then the method 2700 concludes. Otherwise, the method 2700 proceeds to step 708 where the "Don't beep", "No MOVE Events" and "No Event Co-ordinates" flags are set and the distinguishing identifier stored in memory 47 is set to "NO_CARD". At the next step 709, a REMOVE message is sent to the computer 100, and the REMOVE message is processed by the CPU 205. The method 2700 concludes after step 709.

6.9.3 The Scan Touch Panel Routine

Figure 28:
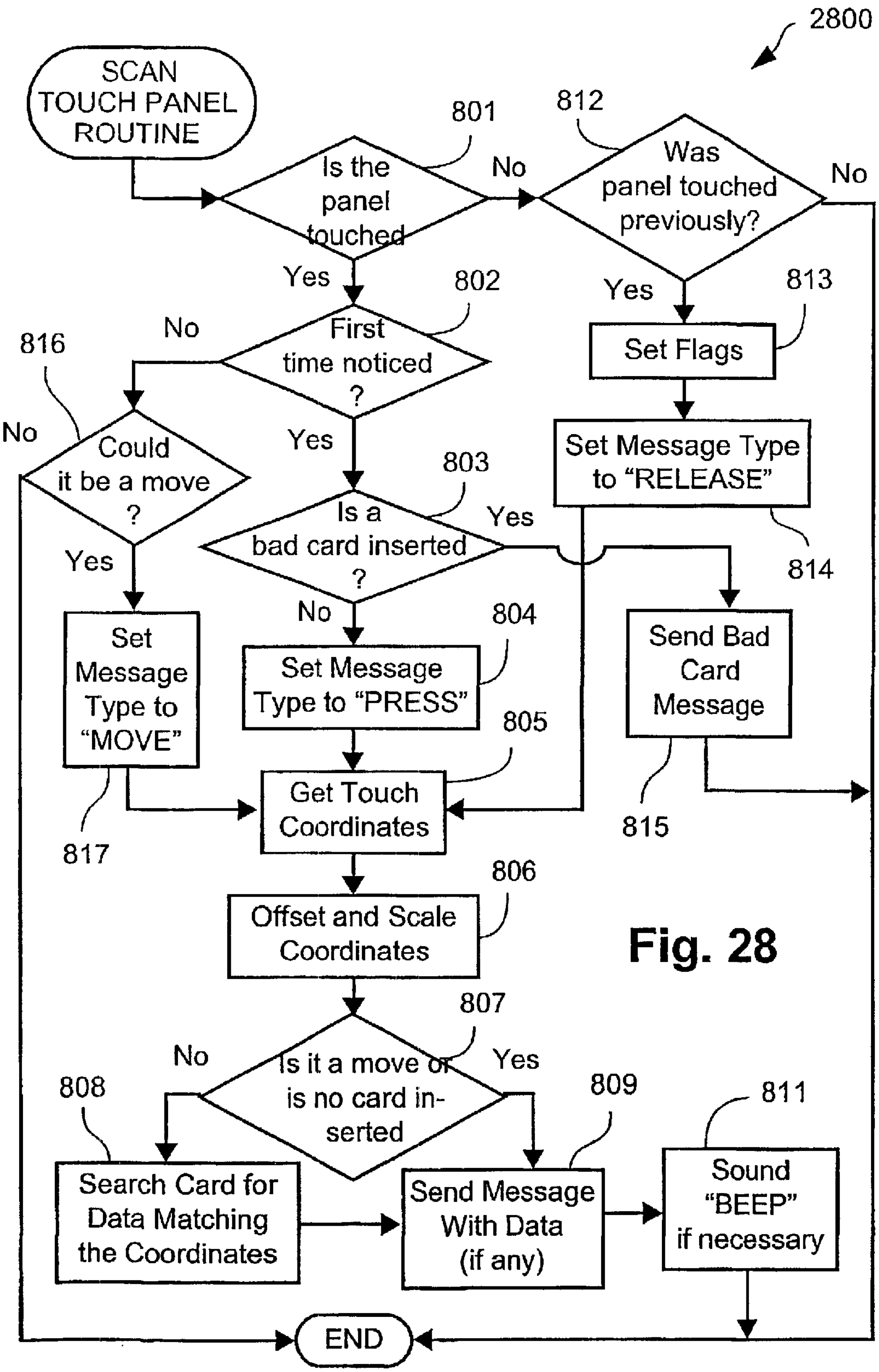
FIG. 28 is a flow diagram showing a method of scanning the touch panel of the reader of FIG. 1, performed during the method of FIG. 25.

FIG. 28 is a flow diagram showing a method 2800 of scanning the touch panel 8 of the reader 1 of the system 600 incorporating the software architecture 200. As described above, the scan touch panel routine checks for touch panel touches that equate with card button presses and responds accordingly. The method 2800 is executed by the CPU 45 and begins at step 801 where if the panel 8 is being touched, then the method 2800 proceeds to step 802. Otherwise, the method 2800 proceeds to step 812, where if the panel 8 has been touched previously then the method 2800 proceeds to step 813. Otherwise, the method 2800 concludes.

At step 813, the "don't beep", "no move events" and "event co-ordinate" flags are set. Then at step 814, the message type is set to RELEASE and the method 2800 proceeds to step 805.

The method 2800 continues at step 802, where if this is the first time that the touch has been noticed since there was no touch, then the method 2800 proceeds to step 803. At the next step 803, the CPU45 determines if a bad card has been inserted into the reader 1 by checking the result of step 703, then in the case that a bad card has been inserted into the reader 1, the method 2800 proceeds to step 815. Then at step 815, a BAD Card message is sent to the computer 100, the BAD CARD message is stored in memory 206, and the method 2800 concludes. If it was determined at step 803 that the card 10 was valid, by checking the result of step 703, or that no card was inserted into the reader 1, by the checking of step 701, then the method 2800 proceeds to step 804, where the type of message is set to PRESS in the message header of FIG. 19. At the next step 805, the CPU45 determines the touch coordinates (i.e. X, Y coordinates of user press location) via the touch panel interface 41. Then at the next step 807, the offset and scale functions are applied to the coordinates. The offset and scale functions map the coordinate space of the touch panel 8 to the coordinate space of the card 10. The method 2800 continues at the next step 807, where if the CPU45 determines that the sent message was a MOVE and/or no card was inserted into the reader 1, by checking step 701, then the method 2800 proceeds directly to step 809. Otherwise, the method 2800 proceeds to step 808 and the memory 19 of the card 10 is searched in order to find the first user interface element whose X1, Y1, X2, Y2 values form a range within which the touch coordinates fall and data associated with matched user interface element is read from the card 10. At the step 809, the message is sent along with any data to the associated computer 100, and the CPU 205 in the computer 100 processes the message. The method 2800 continues at the next step 811, where a BEEP sound is sounded and the method 2800 concludes.

If this is not the first time that a touch has been noticed since there was no touch, at step 802, then the method 2800 proceeds to step 816. At step 816, if the touch detected at step 801 was a move, then the method 2800 proceeds to step 817. Otherwise the method 2800 concludes. At step 817, the message type is set to MOVE and the method 2800 proceeds to step 805. For example, a MOVE message can be sent along with the X, Y coordinates of a touch position as defined by FIGS. 19 and 22, a PRESS and RELEASE message can be sent along with X, Y coordinates of a touch position and data associated with a user interface object (i.e. one of Indicia 14) as defined by FIGS. 19 and 23. If it was determined at step 807 that the message was a MOVE, at step 809, then the CPU 45 sends a MOVE message to the computer 100. The CPU205 processes X, Y coordinates as cursor information and moves a cursor that is displayed on the Video Display 101. In this case, the next RELEASE message can be interpreted as a command to select the displayed object at the cursor position (eg to execute a program, select an item or load a URL). Further, if NO Event Coordinates (see FIG. 13) have been set in the card 10, then the reader 1 may send the data associated with a user interface object to the event manager 301 in the computer 100 or STB 601 without sending the X, Y coordinates of the touch position.

In addition, if the application 304 has a user interface Object structure such as that shown in FIG. 17, and a matching function such as at step 808, then the reader 1 may send X, Y coordinates of a touch position to the application 304. As a result, the CPU 205 executes the same matching function to read data associated with the user interface object from the event manager 301 and provides the card user, a service (e.g. game) identified by a service identifier 1106 associated with the read data. For example, at step 4205 of FIG. 41, the CPU205 determines if data is in the data field of a message. If data is in the data field, then CPU205 reads the data and processes the data at the next steps in FIG. 41. If data is not in the data field, then the CPU205 reads the X, Y coordinates from the message and executes the matching function for the coordinates to get data associated with user pressed indicia. Alternatively, the event manager 301, using the user interface object structure available to the event manager 301, can perform this function.

Therefore, if a card user uses the reader 1 (without inserting a card 10) as a mouse by moving his or her finger on the touch pane 18, the user can select one of the STB services on a STB menu displayed on the TV display. Also, if the card user uses the reader 1 with an inserted card 10 and selects some indicia 14, the user receives a service (e.g. game) from the computer 100 or STB 601. In particular, if the user selects a START indicia, a desired game can be executed in the computer 100 or STB 601 and an object in the game kicks a ball according to the selection of a KICK indicia 14.

By defining per-card flag values in advance for the card 10, various types of cards 10 can be provided to a user. For example, if a flag (i.e. information) of "NO Move Events" has been set in a card 10 in advance, the reader 1 can be configured to not perform as a mouse based on the flag. On the other hand, if a flag of "NO Move Events" has not been set in the card 10 in advance, then the reader 1 can be configured to perform as a mouse based on the flag.

As shown in FIG. 13, the reader 1 has a default condition in which the reader 1 provides audio feedback, acts as a mouse and sends coordinates for press, release and more events. Alternatively, the reader 1 can provide a default condition in which the reader 1 does not provide audio feedback, act as a mouse and send coordinates.

If the reader 1 is configured to perform the 'beep function' using the per-card flag values, the reader 1 sounds a "beep" and executes a method in accordance with the flow diagrams shown in FIGS. 27 and 28. Further, if the reader 1 is configured to perform the 'mouse function' using the per-card flag values, then the reader 1 acts as a mouse and executes a method in accordance with the flow diagrams of FIGS. 27 and 28. Still further, if the reader 1 is configured to perform the 'matching function' using the per-card flag values, then the reader 1 sends coordinates for press, release and move events and executes a method in accordance with the flow diagrams of FIGS. 27 and 28.

The matching function is also executed in the EM301 as at step 808 of FIG. 28. The card 10 can also be configured as a card having only the mouse function and/or a basic function (e.g. sending the EM301 data associated with indicia selected by a user). Therefore, by combining each per-card flag value randomly, various types of cards 10 can be provided to a user.

As described herein, the service identifier 1106 is an indispensable identifier for the system 600. By sending at least a service identifier 1106 in the distinguishing identifier 1110, to the EM 301, a service can be provided to a user.

The service specific identifier 1107 described above is preferably set by a vendor for use with a particular application. Therefore, if the vendor defines a unique service specific identifier 1107 for each card 10, then the card 10 would be unique. If the service specific identifier 1107 is being used to provide information about a means by which particular cards have been distributed (e.g. by mail, handed out on a train), then the service specific identifier 1107 can be added to a file which gives a record of which cards have been used to access the service for later use in determining how effective different distribution means have been used.

6.9.4 The Wait 10 ms Process

Figure 29:
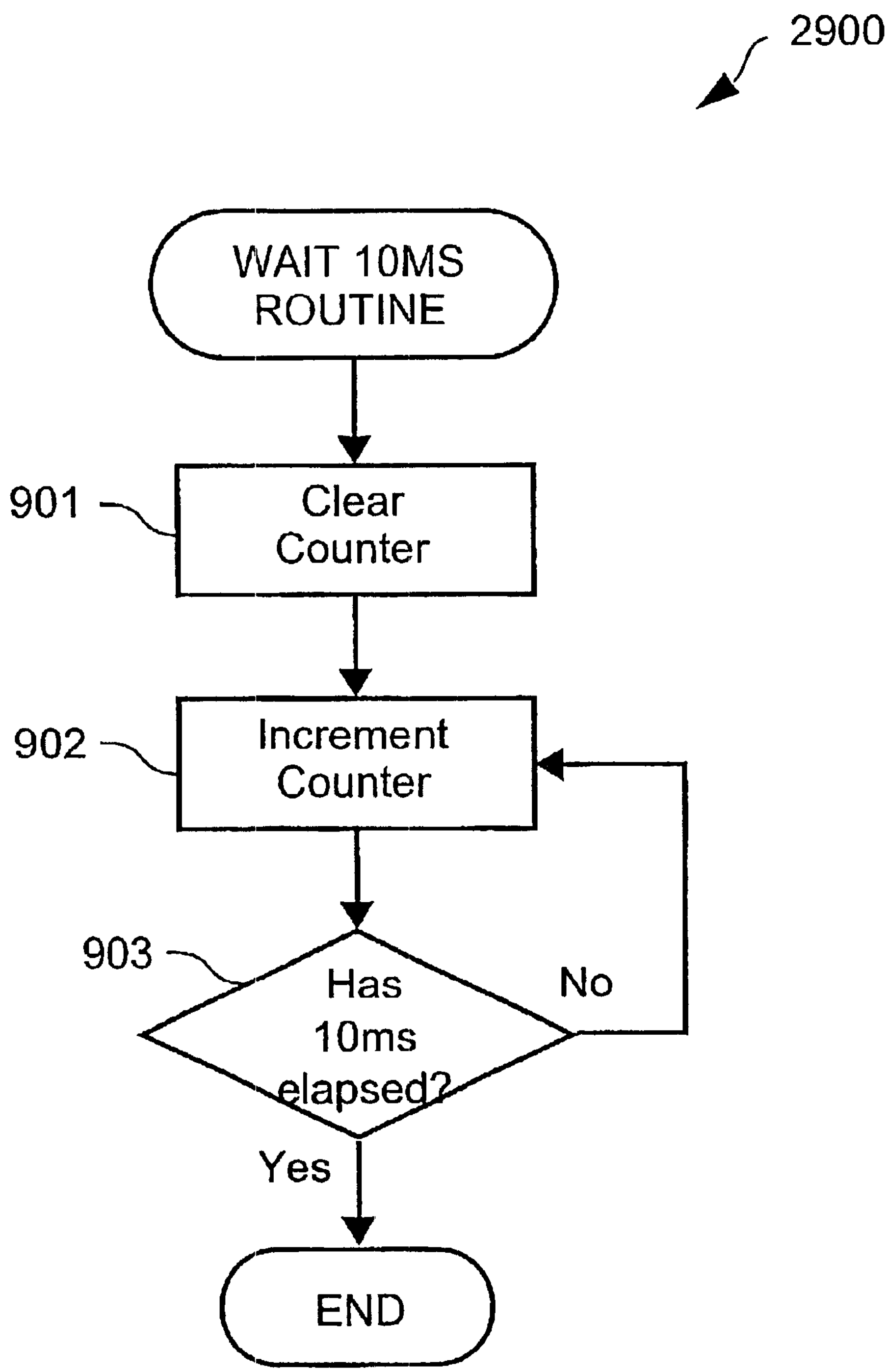
FIG. 29 is a flow diagram showing a wait 10 ms method, performed during the method of FIG. 25.

FIG. 29 is a flow diagram showing a wait 10 ms routine 2900. The wait 10 ms routine 2900 loops so as to consume CPU cycles until 10 ms has elapsed. The delay process 2900 is executed by the CPU 45 and begins at step 901 where a predefined process counter is cleared. At the next step 902, the counter is incremented. Then at the step 903, if 10 ms has not elapsed, then the method 2900 returns to step 902. Otherwise the delay process 2900 concludes.

7.0 Event Manager

The event manager 301 is one of the process components of the software architecture 200. The event manager 301 enforces the rules of the architecture 200 and ensures consistent behaviour between the other process components.

7.1 Role in the System

Most communications pass through the event manager 301 and the event manager 301 is the only component of the architecture 200 that all process components except the directory service 311 components need to be able to directly communicate with. The event manager 301 acts as the enforcer of the rules of the architecture 200, and the event manager 301 does not necessarily have to be configured as one distinct program. The event manager 301 can also be formed of trusted relays or other separate process components that perform part of the event manager role. This can be done for efficiency or security reasons for example.

The event manager 301 may incorporate various other parts of the software architecture 200 such as the I/O daemon 300 and the launcher 303. The event manager 310 may even incorporate an application such as a browser controller.

The event manager 301 can communicate with every process component of the system 600 except the directory service 311 either directly or through a trusted relay. These components include the I/O daemon 300, launcher 303 and any of the applications 304. The event manager 301 can use any suitable communications method to communicate with the other process components. The preferred communication method is Transmission Control Protocol/Internet Protocol (TCP/IP) due to it's nearly universal implementation but other OS specific methods, such as Unix™ sockets, etc can also be used. When the process components are integrated together the method used to communicate can be internal data passing between separate threads.

The event manager 301 is preferably configured to be immune to interference from other process components which includes other processes being able to kill the event manager 301 or being able to starve the event manager 301 of CPU time or network bandwidth. This ensures that the event manager 301 can remain in ultimate control of the system 600.

7.2 Internal Requirements

The event manager 301 performs non-blocking I/O to all the other process components 300, 303, 304 and 306 of the architecture 200 by methods such as polling (NB: polling is not recommended due to the CPU load), interrupt driven I/O, having a separate thread reading and writing from each component or any other suitable method that achieves the same goal. This ensures that one component is not starved out by another component and also reduces user wait time.

The event manager 301 is also configured to check all incoming data for validity and to repair the data if possible before output. This includes data from trusted components. The event manager 301 is preferably also fail safe. If the event manager 301 receives unexpected data from one of the components 300, 303, 304, or 306, then the event manager 301 is configured to deal with the data and not exit unless it is absolutely unavoidable.

The event manager 301 can be required to be running for a considerable length of time and it is configured so as to ensure that performance does not degrade over time. The event manager 301 is preferably configured to assume that the transmission mechanism is reliable for communication with any component that is using a predetermined event manager protocol (i.e. EM-protocol) but assumes that the transmission mechanism used to communicate with the remote reader 1, via the I/O daemon 300, is unreliable and parts of the incoming data may be incorrect or missing.

7.3 Procedures

The event manager 301 is a direct participant in some of the operations of the system 600 but also transparently takes part in many of the other operations of the architecture 200. The event manager 301 is transparent in that it uses data packets as they pass through it without modifying them. The procedures will be explained in more detail below particularly with reference to section 8.0.

Figure 30:
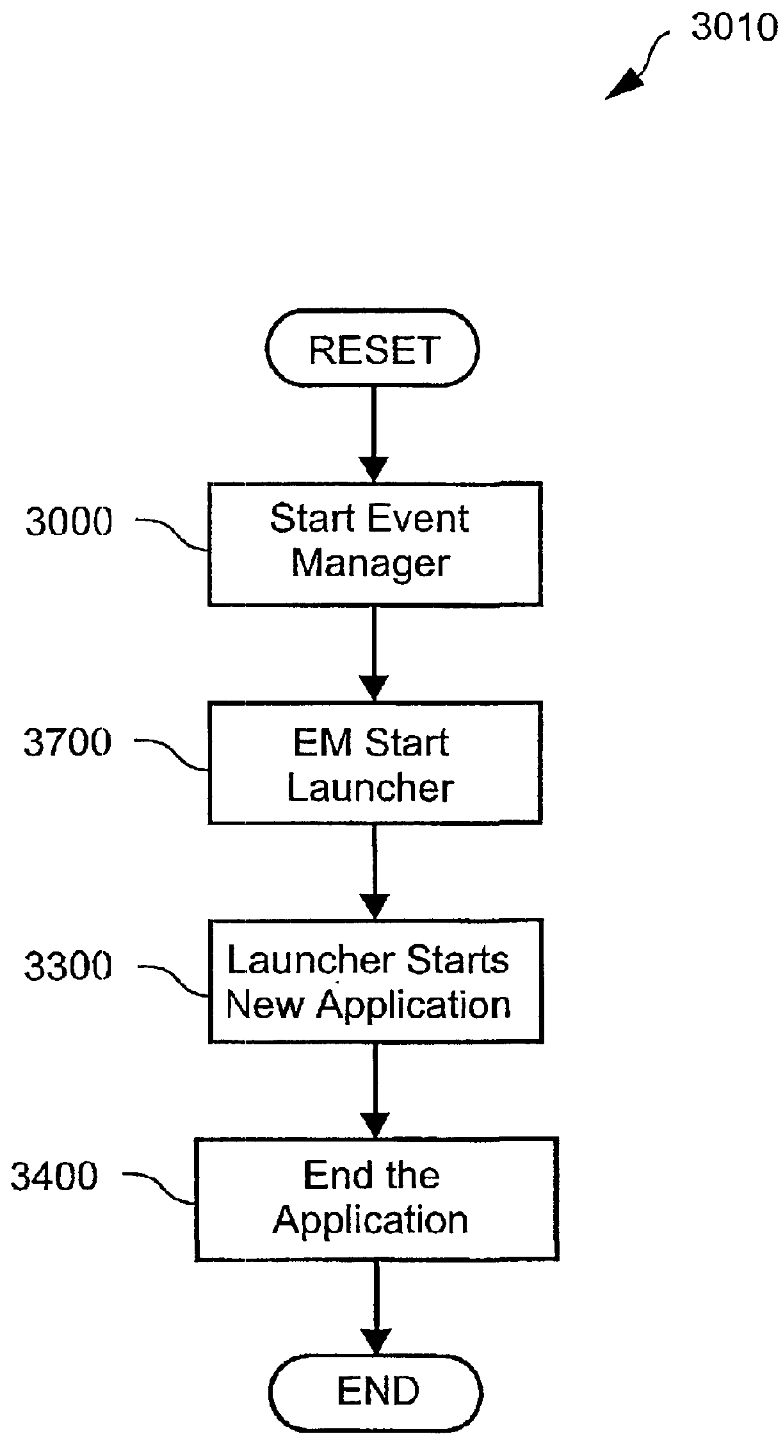
FIG. 30 is a flow diagram showing an overview of events of the system of FIG. 6.

FIG. 30 is a flow diagram showing an overview process 3010 of events performed by the system 600 incorporating the software architecture 200. The process 3010, is executed by the CPU 205 depending on the configuration of the system 600. The process 3010 begins at step 3000 where a system initialisation routine is performed, with the initialisation routine including starting the event manager 301. At step 3000 the I/O daemon is typically also started with the event manager 301.

At the next step 3700 the event manager 301 starts the launcher 303. Then at the step 3300, the event manager 301 passes a message to the launcher 303, enabling the launcher 303 to determine which application 304 to execute, and the launcher 303 then starts the corresponding application 304. The process 3010 continues at the next step 3400, where once the currently running application 304 is no longer needed, for instance, when a new card 10 is inserted into the reader 1, the launcher 303 provides an exit message to the running application in order to end the execution of the running application. All applications are terminated when the system 600 is powered down (or switched off).

Figure 31:
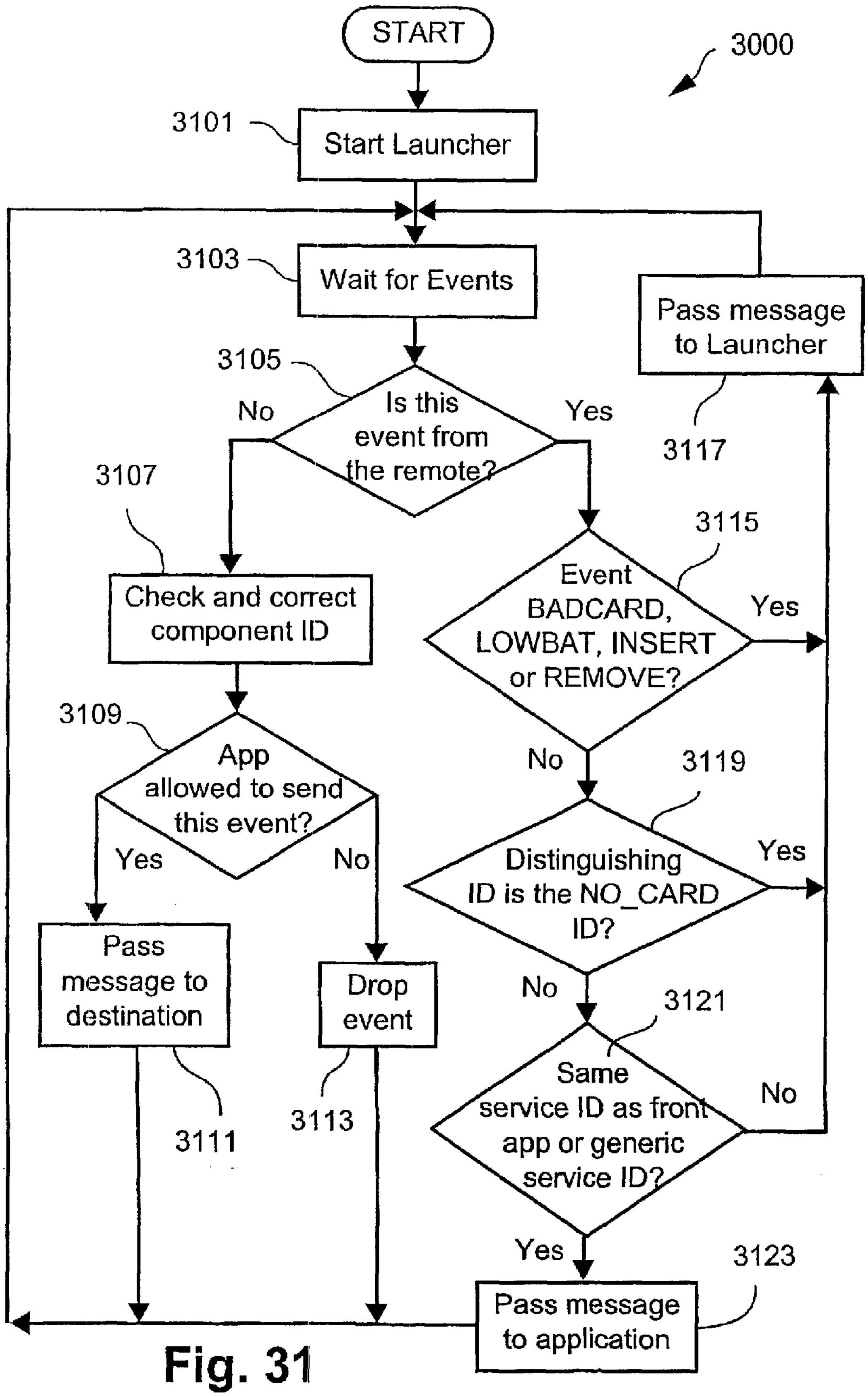
FIG. 31 is a flow diagram showing processes performed by the event manager during the process of FIG. 30.

FIG. 31 is a flow diagram showing a method 3000 of receiving an event performed by the event manager 301. The method 3000 can be executed by the CPU 205 for computer implementations. Alternatively, the method 3000 can be executed by the CPU 4305 in set top box implementations. The method 3000 begins at step 3101, where the launcher 303 is started. At the next step 3103, the event manager 301 receives an event. If the event received at step 3103 is not from the remote reader 1 at the next step 3105, then the method 3000 proceeds to step 3107 where the component identifier (XID) is checked and corrected if necessary. The method 3000 continues at the next step 3109, where if the new application sending an event is allowed to send the event, then the method 3000 proceeds to step 3111. At step 3111, the event is sent to a destination process component and the method 3000 returns to step 3103. If the sending application is not allowed to send the event at step 3109, then the method 3000 proceeds to step 3113, where the event is dropped and the method 3000 returns to step 3103.

If the event is from the remote reader 1 at step 3105, then the method 3000 proceeds to step 3115. If the event is a BADCARD, LOWBAT, INSERT or REMOVE event at step 3115 then the method 3000 proceeds to step 3117. Otherwise the method 3000 proceeds to step 3119. At step 3117, the event is passed to the launcher 303 and the method 3000 returns to step 3103. If the distinguishing identifier is the NO_CARD identifier at step 3119, then the corresponding message is passed to the launcher 303 at step 3117. Otherwise the method 3000 proceeds to step 3121, where the service identifier portion of the distinguishing identifier is compared with the service identifier used in determining the current front application. If the service identifier is not the same as that which has been used to determine the front application and the service identifier portion of the distinguishing identifier is not the special generic service identifier, then the method 3000 proceeds to step 3117 where this message is passed to launcher 303. Otherwise, the method 3000 proceeds to step 3123, where the event is sent to the front application and the method 3000 returns to step 3103.

7.4 Focus Change

The event manager 301 can safely ignore any EM_LOSING_FOCUS events that are not for the current front application. The event manager 301 needs to watch for EM_GAINING_FOCUS messages for which applications becoming the front application as well as the service identifiers that are associated with that application. The event manager 301 can safely ignore multiple EM_GAINING_FOCUS events that are to the same application with the same service identifier as well as any EM_LOSING_FOCUS events to applications that are not the currently front application. Messages that are ignored are passed on as normal.

7.5 Reader Messages

The event manager 301 is also responsible for distributing the messages to the correct component. The event manager 301 is configured to follow certain predetermined protocol rules, which will be described in detail below.

7.6 Restrictions on Sending Messages

A further role of the event manager 301 is to enforce predetermined restrictions on the transmitting of messages.

8.0 Event Manager Protocol

The event manager protocol (EM-protocol) is the protocol used to communicate between all components of the architecture 200 except for the directory service 311. Generally all messages are configured to go through the event manager 301 before being passed onto an intended recipient. The EM-protocol is a datagram based protocol that is implemented on top of a reliable communications protocol, for example, Transport Control Protocol/Internet Protocol (TCP/IP). The event manager 301 is configured to assume that all data being sent will arrive unchanged and in the correct order. The event manager 301 does not assume that there is a reliable method of synchronisation between the process components of the architecture 200.

All multi-byte values are sent in Internet byte order (i.e. big-endian). The exception to this is the 'distinguishing identifier' values representing services, which are sent as blocks of several single bytes and are always treated as such (i.e. the distinguishing identifier values are never stored as a number typically because of the byte ordering issues).

8.1 Communication Methods

The event manager protocol is preferably configured to assume a TCP/IP like method of communication between the components of the architecture 200 and the system 600 hardware components. Alternatively, any known method of communication that ensures reliable transport can be used. For example, an operating system specific method such as 'Unix sockets' can be used. The data can be passed between the process components 301, 303, 304 and 306 directly via internal data structures in a multi-threaded application, for example.

In the case of architectures where an alternative method of communication between the components is being used, the problem of byte-ordering must be taken into account. If it is possible that applications can run on a machine that has different byte orderings or is required to communicate with components that expect the data in network byte order, which all components assume by default, then all affected communications can be done in network byte order.

8.2 Data Format 8.2.1 Basic Data Types

Some abbreviations that are used in the following paragraphs to refer to data types are as follows:

| | |
|---|---|
| int8: | An eight bit signed value; |
| uint8: | An eight bit unsigned value; |
| int16: | A 16 bit signed value; |
| uint16: | A 16 bit unsigned value; |
| int32: | A 32 bit signed value; |
| uint32: | A 32 bit unsigned value; and |
| xid_t: | A 32 bit unsigned value. |

8.2.2 Component Addressing

Every addressable process component in the architecture 200 is assigned a 32 bit unsigned value referred to as an 'xid' (or component identifier). This number is unique within the boundaries of each individual system 600 instance. Some xids of the process components are always the same. These are:

Event Manager 301: EM_EVENT_MANGER_XID

Master Launcher: EM_MASTER_LAUNCHER_XID

Launcher 303: EM_FIRST_APP_XID

Display Manager 306: EM_DISPLAY_MANAGER_XID

The xid value is divided up into a one byte type field and a three byte identifier. The different types are shown in Table 1 below.

TABLE 1

| Value | Type |
|---|---|
| Internal xid's | These xid values are not routable and can be used internally by all components. They are dropped if seen by the EM |
| Core System xid's | These identify the core system components of a user interface Card system. These components include the EM, Launcher and Master Launcher. |
| Standard Application | These identify standard applications that are started and ended by the Launcher as needed. |
| Special application | These identify special applications that aren't controlled by the standard rules for starting and ending applications. They are applications that are written to provide the user interface card system with functionality that can be controlled by other applications such as a video on demand player or a browser controller. |
| Readers | Readers are assigned xids by the EM. These xids are unique to each reader that is used to access the system for the duration of the EM. If the event manager and therefore the system is restarted then the reader xids will change. |

8.3 Message Types

There are twenty-two core messages in the EM-protocol, which preferably have the following labels:

EM_NEW_LAUNCHER

EM_KILL_LAUNCHER

EM_APP_REGISTER

EM_EXIT_NOW

EM_CLOSE

EM_APP_STARTING

EM_APP_DYING

EM_GAINING_FOCUS

EM_LOSING_FOCUS

EM_LIST_MESSAGES

EM_LIST_APPS

EM_SEND_MESSAGE

EM_POST_MESSAGE

EM_GET_MESSAGE

EM_DELETE_MESSAGE

EM_READER_INSERT

EM_READER_REMOVE

EM_READER_BADCARD

EM_READER_MOVE

EM_READER_PRESS

EM_READER_RELEASE

EM_READER_LOW_BATT

These messages will be explained in more detail in the following paragraphs.

8.3.1 Message Header

The messages sent within the system 600 have a header portion preferably including the following information:

version: This represents the version number of the protocol being used by the component. This should always be set to EM_PROTOCOL_VERSION, which is defined in library headers to be the version used by the library.

type: This represents the type of message that a header proceeds and is set to one of the message types listed above and described below. The length of the messages is assigned the label dataLength.

reserved: This represents that the value in these two bytes is reserved and should be set to zero.

timestamp: This represents the timestamp of a data packet.

to_xid: This represents the destination xid of a particular packet. This is the final destination of the packet and should only be set to the event manager if that is the intended final recipient.

from_xid: This represents the source xid of the packet.

dataLength: This represents the length of the data that follows a header. This value can be zero. Different types of messages impose different requirements on the data following the message header. Components should not assume the length of a message from the type. The number of bytes in the dataLength field is always read even if this is different to the correct size of the message to insure that the stream can only be corrupted by an incorrect dataLength.

8.3.2 EM_NEW_LAUNCHER

The EM_NEW_LAUNCHER message is sent when the event manager 301 requires a new launcher 303. This message is only sent between the event manager 301 and the Master Launcher if the software architecture 200 includes such a Master Launcher. The packet containing this message also contains information that a new launcher needs to connect to the event manager 301. The EM_NEW_LAUNCHER message preferably includes the following information:

port: This represents the port number that the event manager 301 is listening for new connection on.

host: This represents the host name of the machine running the event manager 301.

8.3.3 EM_KILL_LAUNCHER

The EM_KILL_LAUNCHER message is sent when the event manager 301 wants the Master Launcher to kill the current launcher 303. The EM_KILL_LAUNCHER message has no data associated with it.

8.3.4 EM_APP_REGISTER

The EM_APP_REGISTER message is sent when an application is starting up to the launcher 303 and informs the rest of the components of the architecture 200 that it is now ready to receive messages. Any messages that an application 304 sends before it has registered will be discarded by the event manager 301.

The EM_APP_REGISTER message preferably includes the following information:

xid: This represents the component identifier that was assigned to the application by the associated launcher 303. The remainder of the information sent cannot be represented by the structure as the remaining fields are of variable length. The data following the xid is a series of null terminated strings with a maximum length of 256 characters not including the terminating null, consisting of the lower and upper case characters a–z, the numbers 0–9 and the characters (.,-_). If the strings are longer than 256 characters they will be truncated at 256 characters.

Application Name: this represents a name that is used to identify the present application to other applications.

Service Group: this represents one or more names of service groups that the application wishes to be a part of.

An application that is persistent, such as a browser controller, only needs to register once. Such a persistent application does not need to register every time it gets an EM_GAINING_FOCUS event.

8.3.5 EM_EXIT_NOW

The EM_EXIT_NOW message is sent by the launcher 303 to an application when the application is about to be forced to exit. The EM_EXIT_NOW message has no data associated with it.

8.3.6 EM_CLOSE

The EM_CLOSE message is sent to persistent applications to indicate that the current session is closed and to return the application to its startup state. Once this message is received by an application, the application is required to treat the next EM_GAINING_FOCUS event as the start of a new session rather than as a change in input/output focus. The EM_CLOSE message has no associated data.

8.3.7 EM_APP_STARTING

The EM_APP_STARTING message is sent by the launcher 303 to the event manager 301 when an application is about to start. The EM_APP_STARTING message preferably includes the following information:

xid: This represents the component identifier of the application that is about to start.

8.3.8 EM_APP_DYING

The EM_APP_DYING message is sent by the launcher 303 to the event manager 301 when an application has exited. The EM_APP_DYING message is sent only after the launcher 303 is certain that the application has finished. The EM_APP_DYING message preferably includes the following information:

xid: This represents the component identifier of the application that has exited.

8.3.9 EM_GAINING_FOCUS

The EM_GAINING_FOCUS message is sent to an application by the launcher 303 when the application 304 is about to start receiving input from the remote reader 1. The EM_GAINING_FOCUS message preferably includes the following information:

id: This represents the distinguishing identifier of the remote reader 1 messages that will be sent to an application.

Data: This represents extra data that is to be sent to the application when it is about to receive focus. This is specific to each service and it is up to the application to interpret the data. The extra data is not checked for byte ordering issues and this should be dealt with by the application. Any multi-byte data is sent by applications in network byte order and assumed to be in this order by the receiving application.

An example of this data, when the receiving application is a browser controller, is a URL which the browser controller is being instructed to load.

8.3.10 EM_LOSING_FOCUS

The EM_LOSING_FOCUS message is sent when an application 304 is about to lose input/output focus from the remote reader 1 and the display 101. The EM_LOSING_FOCUS message has no extra data.

8.3.11 EM_LIST_APPS

The EM_LIST_APPS message is sent when an application wishes to know what other applications are also running at a point in time. The EM_LIST_APPS message is returned to the application with the data field containing the application list. This message does not need to be addressed to any of the process components 301 to 306. The event manager 301 ensures that the EM_LIST_APPS message is sent to the correct component, which is usually the launcher 303, regardless of the to_xid field of the header. It is the role of the receiving component to decide which applications to list.

When used as a reply, the EM_LIST_APPS message has two formats. The first is the format used when the EM_LIST_APPS is sent as a request and the second is the format when it is sent as a reply. The request has no extra data associated with it.

The EM_LIST_APPS message preferably includes the following information:

app_xid: This represents the xid of the application being described.

app_desc: This represents the name string given to the launcher 303 when the application first registers.

8.3.12 EM_SEND_MESSAGE

The EM_SEND_MESSAGE message can be sent between any two concurrently running applications in the system 600. There is no structure imposed on this message by the architecture 200 but communicating applications need to agree on a common data structure.

8.3.13 EM_LIST_MESSAGES

The EM_LIST_MESSAGES message is used to get a list of all messages currently on a message board, which is used in the architecture 200. The message board will be described in more detail below with reference to section 8.4.7.1. The EM_LIST_MESSAGES message should be sent to the launcher 303. The EM_LIST_MESSAGES message has a request and reply format. The request format has no data associated with it. The reply preferably includes the following information:

message_count: This represents the number of messages currently on the message board and can be equal to zero.

Messages: This represents a variable number (i.e. equal to message_count) of variable sized structures that have the following structure:

Each message preferably includes the following information:

message_id: This represents the message identifier of this message.

poster_id: This represent the xid (component identifier) of the component that posted this message.

mime_type: This represents the Multipurpose Internet Mail Extention-type (MIME-type) of the data associated with this message and is a null terminated string which can be of zero length in which case the terminating zero is still present.

message_desc: This represents the description of this message that was assigned when the message was posted by the posting application. This is a null terminated string that is at most 255 characters long not including the terminating zero. The length of this string can be zero in which case the terminating zero is still present.

8.3.14 EM_POST_MESSAGE

The EM_POST_MESSAGE message is used to post some data to the message board used in the architecture 200. These messages last until there is a service group change and can be accessed by any application that is running. The EM_POST_MESSAGE messages can also be deleted by any currently running application and are not assumed to be totally reliable. Once the message has been posted it is returned to the application that posted it to inform the application of the message identifier of the message. These messages are sent to the launcher 303 by the application. The message from the application (i.e. the application that posted the message) includes the following information:

message_desc: This represents a description of the message and is a null terminated string that can be at most 255 characters long not including the terminating zero. The description can be zero bytes in length but must still have a terminating zero.

mime_type: This represents the MIME type of the message data that is being posted. The MIME type is not required but there must still be a terminating zero.

message_data: This represents the data to be posted to the message board.

The message returned to the application preferably includes the following information:

message_id: This represents the message identifier by which this message can be retrieved or deleted.

8.3.15 EM_GET_MESSAGE

The EM_GET_MESSAGE message is used to retrieve a message from the message board. It is sent containing the message identifier of the message that the component wishes to retrieve and it is returned to the component either containing the message or an error that there is no message with that identifier. These messages are sent to the launcher 303 by an application 304.

The information included when requesting the message is as follows:

message_id: This represents the message identifier of the message the application wishes to retrieve.

flags: This is a flags word. All unused bits should be set to zero. The flag description is shown in Table 2 below:

TABLE 2

| Flag | Description | Value |
|---|---|---|
| EM_GM_DELETE | Delete the message from the message board after it has been sent | 0x01 |

The reply has the following information:

error: If an error occurred then this will be set to one of the values in Table 3 below.

TABLE 3

| Value | Description |
|---|---|
| EM_GM_NO_ERROR | No error occurred. The message is in the message field. |
| EM_GM_NO_SUCH_MESSAGE | No message exists with that message identifier on the message board. |

message_id: This represents the message identifier of the message that was retrieved.

mime_type: This represents the MIME type of the message that was retrieved. This is a null terminated string. If this message has no MIME type associated with it then the string is zero length but the terminating zero is still present.

message: If no error occurred then this field will contain the data posted on the message board. The length is determined by the dataLength value in the header minus the size of the error field 8.3.16 EM_DELETE_MESSAGE The EM_DELETE_MESSAGE message is used to delete messages from the message board. It is not an error to delete a message that does not exist. These messages are sent to the launcher 303 by the front application. The EM_DELETE_MESSAGE preferably includes the following information:

message_id: This represents the message identifier of the message that is to be deleted.

8.3.17 User Interface Card Reader Messages

The user interface card reader messages are generated by the remote reader 1 and are encapsulated by the event manager 301 so that they conform with the event manager protocol. There are three types of messages that are generated by the remote reader 1. These messages are "simple" messages, "move" messages and "press/release" messages. Move messages are simple messages with co-ordinates added, and press/release messages are simple messages with data and coordinates added.

8.3.17.1 Simple Messages

The following messages are simple messages:

EM_READER_INSERT

EM_READER_REMOVE

EM_READER_BADCARD

EM_READER_LOW_BATT

These simple messages preferably include the following information:

id: This represents the distinguishing identifier that was sent by the remote reader 1 and has no meaning for BADCARD messages.

8.3.17.2 Move Messages

The EM_READER_MOVE messages preferably include the following information:

id: This represents the distinguishing identifier that was sent by the remote reader 1, and is set to all zeros for no card messages.

X: This represents the x value.

Y: This represents the y value.

8.3.17.3 Press/Release Messages

EM_READER_PRESS and EM_READER_RELEASE messages preferably includes the following information:

id: This represents the distinguishing identifier that was sent by the remote reader 1.

x: This represents the x value.

y: This represents the y value.

data: This represents any data that was associated with the press or release (associated with the user interface-element data).

8.4 Procedures

The following paragraphs describe the main procedures that each process component of the architecture 200 follow.

8.4.1 Starting a New Application

Figure 32:
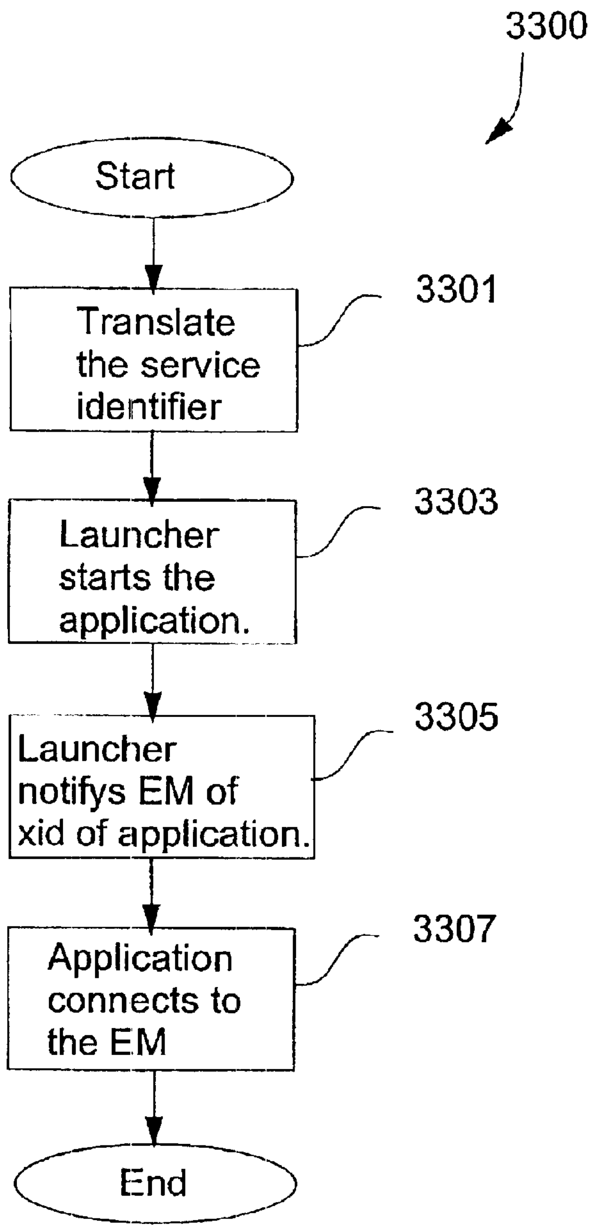
FIG. 32 is a flow diagram showing a method for starting a new application, performed during the process of FIG. 30.

FIG. 32 is a flow diagram showing detail of the method 3300 of starting a new application and performed whenever the launcher 303 starts a new application. The method 3300 can be executed by the CPU 205 for computer implementations. Alternatively, the method 3300 can be executed by the CPU 4305 in set top box implementations. The method 3300 begins at the first step 3301 where the launcher 303 performs a mapping to translate the service identifier into a URL. At the next step 3303, the launcher 303 fetches and starts the application informing it of an event manager host-name and port number. The method 3300 continues at the next step 3305, where the launcher 303 sends the event manager 301 an EM_APP_STARTING message informing the event manager 301 of the xid of the starting application. At the next step 3307, the new application connects to the event manager 301 and sends the launcher 303 an EM_APP_REGISTER message. Further, there is normally a focus change to the new application.

8.4.2 Ending an Application

Figure 33:
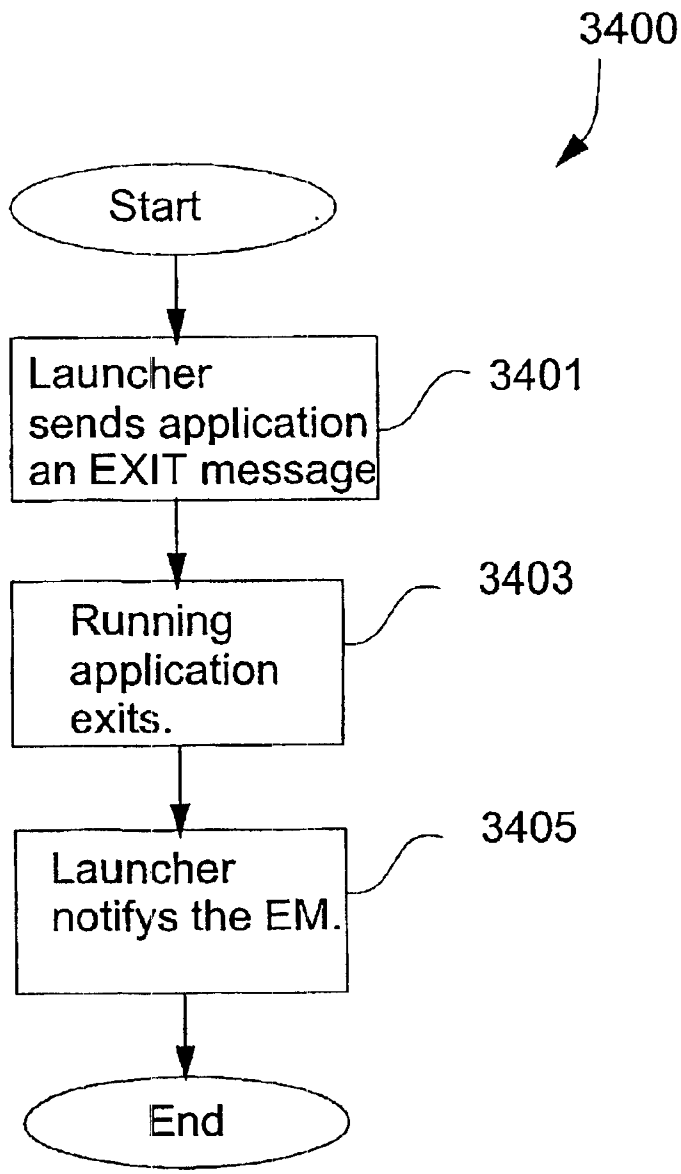
FIG. 33 is a flow diagram showing a method of ending an application performed during the process of FIG. 30.

FIG. 33 is a flow diagram showing a method 3400 of ending an application in the system 600 incorporating the software architecture 200. The method 3400 can be executed by the CPU 205 for computer implementations. Alternatively, the method 3400 can be executed by the CPU 4305 in set top box implementations. This method is used whenever the launcher 303 terminates a running application. The method 3400 begins at step 3401, where the launcher 303 sends the running application an EM_EXIT_NOW message. The launcher 303 sets a time out at this point to give the application a chance to exit cleanly. At the next step 3403, the running application cleans up and exits. Alternatively, the application ignores the EM_EXIT_NOW message and the launcher 303 times out and forces the application to quit. Then at step 3405, the launcher 303 sends the event manager 301 an EM_APP_DYING to tell it that the application has exited and that the launcher 303 should discard any waiting data and close the connection to the application if the connection is still open, and the method 3400 concludes.

8.4.3 Closing a Persistent Application's Session

Figure 34:
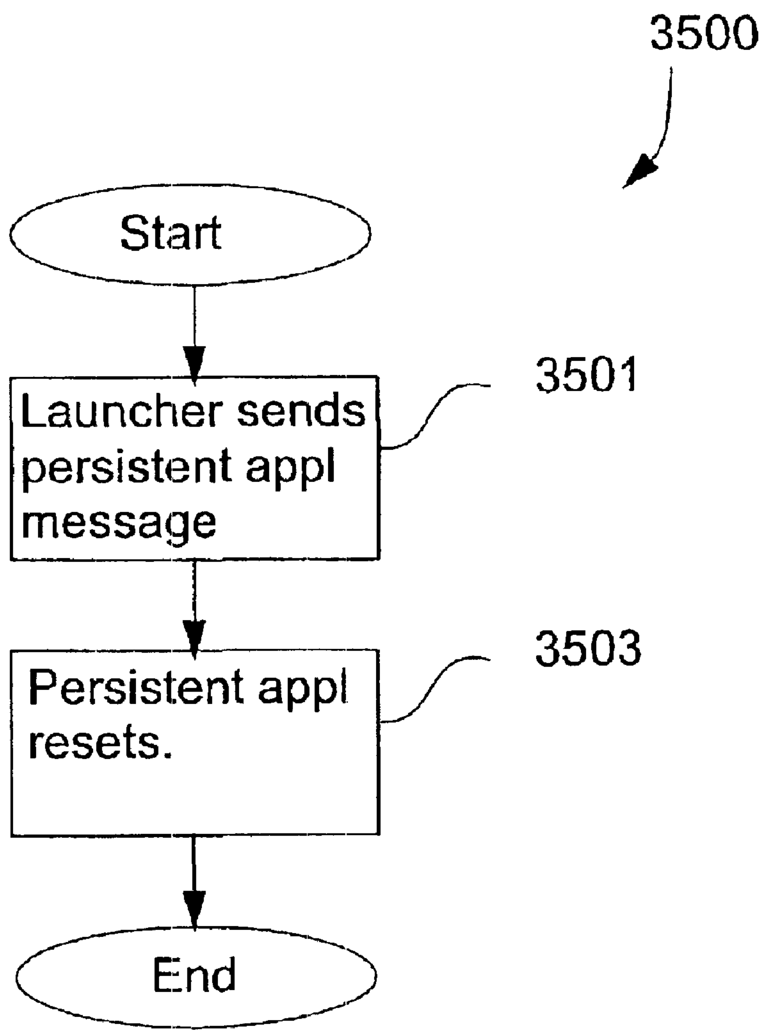
FIG. 34 is a flow diagram showing a method of closing a current session for a persistent application.

FIG. 34 is a flow diagram showing a method 3500 of closing the current session of a persistent application on the system 600 incorporating the software architecture 200. The method 3500 can be executed by the CPU 205 for computer implementations. Alternatively, the method 3500 can be executed by the CPU 4305 in set top box implementations. The method 3500 is analogous to the application ending but the application does not actually close. The method 3500 begins at step 3501, where the launcher 303 sends the persistent application an EM_CLOSE message. At the next step 3503, the persistent application resets to its initial state, and the method 3500 concludes. This may involve closing connections to outside servers, loading a default web page etc. The next EM_GAINING_FOCUS event that the persistent application receives is assumed to be the start of a new session.

8.4.4 Focus Change

Figure 35:
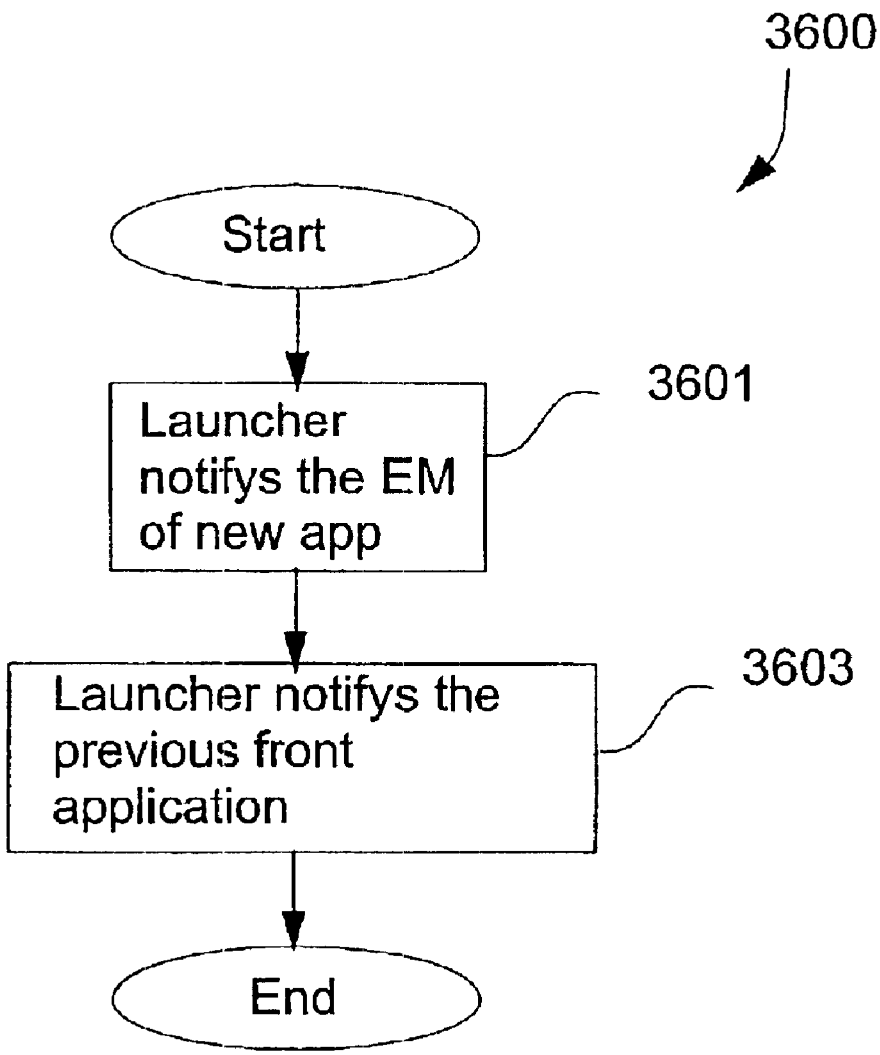
FIG. 35 is a flow diagram showing a method for performing a focus change.

FIG. 35 is a flow diagram showing a method 3600 of performing a focus change on the system 600 incorporating the software architecture 200. The method 3600 can be executed by the CPU 205 for computer implementations. Alternatively, the method 3600 can be executed by the CPU 4305 in set top box implementations. The method 3600 is used to tell an application that it is about to gain or lose input/output focus, which is not a signal for the application to exit. At the first step 3601, the launcher 303 makes the decision to change the application that currently has input/output focus and sends the application that is to receive input focus an EM_GAINING_FOCUS event typically based on a card change. The sending of this event is used by the event manager 301 to decide which application should receive input/output focus based on predetermined conditions. Then at the step 3603, the launcher 303 sends the previous front application an EM_LOSING_FOCUS event, and the method 3600 concludes. This message is less critical and is not sent when the current front application remains the same, but still needs the EM_GAINING_FOCUS (i.e. in the case of a browser controller where the EM_GAINING_FOCUS events are used to tell the browser controller 402 the base URL).

8.4.5 Message Passing

There are two distinct types of message passing between applications supported by the architecture 200. Through the message board that is as persistent as the current service group, and a direct message method where two components communicate with each other directly as described below.

8.4.5.1 Message Board

One component of the architecture 200, typically the launcher 303, maintains a message board and the event manager 301 knows which component does this. The message board is formed of a list of messages that are assigned a 32 bit unsigned number as an identifier by the process component managing the message board. The messages are formed of a text description, an optional MIME type for the message data and the message itself. An application can request a list of all messages currently on the message board by sending an EM_LIST_MESSAGES message. This will return with the text descriptions of all messages currently on the message board with their associated message identifiers. The application can then request a specific message by sending a EM_GET_MESSAGE with the message identifier of the message that it requires. It is possible that a message could be deleted between getting a listing of the message board and actually requesting a message. The error field of the EM_GET_MESSAGE message reply is configured to indicate this.

8.4.5.2 Direct Communication

Two applications can send each other arbitrary data directly, by using direct communication. This is performed by one application sending the other application the data by using an EM_SEND_MESSAGE message. The two applications need to agree on a data format for these messages and byte ordering issues need to be taken into account. To get the component identifier of the other application, an application can request to be sent a list of all running applications by sending a EM_LIST_APPS message. This message returns a list of all publicly visible applications that are currently running.

8.5 Reader Messages

This section outlines the rules used by the event manager 301 to route the EM_READER_* messages. The following messages are always sent to the launcher 303 regardless of which application currently has focus.

EM_READER_INSERT
EM_READER_REMOVE
EM_READER_BADCARD
EM_READER_LOW-BATT

The following messages are sent to the currently front application if the messages are from cards 10 that have the same service identifier in their corresponding fields 1106 as the currently front application. A service-specific identifier is not taken into account in this comparison. If the service identifier is different to the currently front application or the distinguishing identifier is the NO_CARD present value (i.e. all zeroes) then the message is sent to the launcher 303 as previously described.

EM_READER_PRESS
EM_READER_RELEASE
EM_READER_MOVE 8.6 Restrictions on Sending Messages To improve the security and stability of the system 600, there are preferably restrictions placed on the sending of messages. Any messages that breach these rules will be discarded by the event manager 301.

8.6.1 Restrictions for all Components

No component except the remote reader 1 will be allowed to send EM_READER_* messages.

8.6.2 Restrictions on the Event Manager

The event manager 301 is the enforcer of the rules and as such can send any messages necessary. The event manager 301 is configured to only need to generate EM_KILL_LAUNCHER and EM_NEW_LAUNCHER messages but it can copy messages and send the copies to process components that are not the target component. The event manager 301 also handles all transmissions between components.

8.6.3 Restrictions on the Launcher

The launcher 303 sends messages to all components 301 to 306 of the architecture 200. The messages that the launcher 303 can not send are as follows:

EM_KILL_LAUNCHER

EM_NEW_LAUNCHER 8.6.4 Restrictions on Applications

Applications only send the following messages to other applications (which includes the launcher 303):

EM_APP_REGISTER

EM_SEND_MESSAGE

EM_LIST_APPS

EM_POST_MESSAGE

EM_GET_MESSAGE

EM_DELETE_MESSAGE

EM_LIST_MESSAGES 8.7 Component Procedure Lists

This section lists the functions, which each component of architecture 200 is involved in.

8.7.1 Event Manager

The event manager 301 is a direct participant in the following procedures:

System Initialisation

System Startup

Starting a new Application

Ending an Application

Focus Change

Message Passing

Reader Messages 8.7.2 Launcher

The Launcher 303 is a participant in the following procedures:

System Initialisation

System Startup

Starting a new Application

Ending an Application

Focus Change

Message Passing (in some instances)

Reader Messages (in some instances)

8.7.3 Applications

The Applications 304 are participants in the following procedures:

Starting a new Application

Ending an Application

Closing a session if the application is persistent.

Focus Change

Message Passing

Reader Messages (in some instances)

9.0 I/O Daemon

The I/O daemon 300 is responsible for transporting the data being sent from the remote reader 1 to the event manager 301, and vice versa for a two-way protocol. The I/O daemon 300 is configured to be able to read from the hardware of the system 600 either directly or through operating system drivers that are interface with the remote reader 1, for example, an IR link or standard serial hardware connection. The I/O daemon 300 is also required to listen on a TCP/IP port to wait for the event manager 301 to connect, at which point the I/O daemon 300 sends data from the remote reader 1 to the event manager 301 encapsulated in a TCP/IP stream.

The I/O daemon 300 does not communicate with the rest of the system 600 except to send the remote reader 1 data to the event manager 301, and vice versa in optional two way protocol arrangements between the I/O daemon 300 and the remote reader 1.

While the functionality of the I/O daemon 300 must be present in the system 600, the I/O daemon 300 does not have to be a separate component. For example, the I/O daemon 300 can be integrated into the event manager 301 if the event manager 301 is running on the same machine as the hardware used to interface with the remote reader 1.

The I/O daemon 300 is configured to run on minimum hardware for the instance where the rest of the system 600 is running remotely.

9.1 Requirements 9.1.1 General Requirements

The platform upon which the I/O daemon 300 is implemented must be configured be able to receive signals from (and optionally transmit signals to) a remote reader 1. The platform also preferably has a TCP/IP stack or other reliable communications method implemented on it to communicate with the other parts of the system (i.e. the event manager (EM) 301). The I/O daemon 300 can be required to do multiplexed I/O, and the I/O system of the architecture 200 is preferably configured to support multiplexed I/O. The architecture 200 is preferably configured to assign a port that the I/O daemon 300 will be listening on, for example, as a command line argument.

9.1.2 Internal Requirements

The I/O daemon 300 is not required to understand the protocol used by the remote reader 1. The I/O daemon 300 is only required to forward all data that it receives to any listening EM (event manager). The I/O daemon 300 is not required to correct any errors of transmission from the remote reader 1 unless it is supported by the transport protocol of the communications link (i.e. through error correcting codes or similar). If the transport protocol being used supports error detection but not correction then any data that does not pass the error check can be passed onto the event manager 301.

9.1.3 External Interface Requirements

The I/O daemon 300 is preferably able to accept one or more TCP/IP connections. The data stream that is sent to the event manager 301 is the content of the data sent by the remote reader 1. All header and footer information that is transmitted as part of the communications protocol used is preferably stripped off and the byte ordering is big endian. If the communication method of the architecture 200 ever becomes unusable (e.g. due to an error arising) then the I/O daemon 300 closes all connections as soon as the error condition arises.

9.2 External Interface

The external interface (not shown) of the I/O daemon 300 is intentionally simplistic to allow it to be run on minimum hardware. The I/O daemon 300 is preferably configured in the following manner.

9.2.1 Start-up Procedure

The I/O daemon 300 listens on a TCP/IP port that is specified to it in some manner, for example, by command line arguments. The exact method of informing the I/O daemon 300 of the TCP/IP port is implementation specific. The communications hardware used to communicate with the remote reader 1 is initialised if required and the method to read data that is sent from the remote reader 1 is configured to be ready to receive data. While the I/O daemon 300 is waiting for a connection, the I/O daemon 300 consumes the data that is being sent by the remote reader 1 so that when a connection is made, only new data is being sent. This new data is not required to start on a message boundary.

9.2.2 Connection from an Event Manager

If a connection arrives on the TCP/IP port then the I/O daemon 300 is configured to accept the connection and begin transmitting any data received from the remote reader 1 down the connection. If the I/O daemon 300 is already connected to an event manager (EM) 301 then the I/O daemon 300 has two options. Firstly, the I/O daemon can accept the connection and send all data down all currently connected event managers. This option is provided for system debugging purposes. The second method is to reject the second connection and continue to send the data to the already connected EM. Any encryption of the stream can be handled externally by some other method, such as port tunnelling.

9.2.3 Connection from an Event Manager Closing

If at any time the connection to the event manager 301 is closed, then the I/O daemon 300 is configured to discard any data from the remote reader 1 that is waiting to be sent to that event manager 301. If this is the only event manager connected then the I/O daemon 300 is configured to return to an initial startup state whereby the I/O daemon 300 consumes data being sent by the remote reader 1 and waits for a connection.

9.2.4 Unrecoverable Error is Encountered

If the I/O daemon 300 detects an error that cannot be dealt with and will cause the I/O daemon 300 to exit, then the I/O daemon 300 is configured to close all connections to any EMs to inform the EMs that the I/O daemon 300 has detected an error. Examples of these errors include if the hardware that is being used to communicate with the remote reader 1 becomes unavailable or if the I/O daemon 300 receives a signal that would cause it to exit. The I/O daemon 300 is configured to close all connections as soon as an error is experienced.

10.0 Launcher

The launcher 303 is the process component that enforces site specific rules such as allowed applications and basic application configuration rules. The launcher 303 allows the other component processes 300, 301, 304, 305 and 306 of the system architecture 200 to be used in a wide range of applications from a general home set top box 601 to a very specific application (e.g. an automatic teller machine (ATM)). A launcher 303 can be specifically written for each network or installation.

The launcher 303 is configured with special privileges. For example, the launcher 303 can be configured to be the first component to connect to the event manager 301 as the system 600 starts up. Further, the launcher 303 receives all "LOW_BATT", "BADCARD", "INSERT", and "REMOVE" messages sent by the remote reader 1 and also receives all "PRESS", "RELEASE" and "MOVE" messages that originate from a card other than the smart card 10 that the front application is associated with at any one point in time. The launcher 303 also receives PRESS, RELEASE and MOVE messages with a special "NO_CARD" distinguishing identifier. The launcher 303 also has control over which application is the front application via the EM_GAINING_FOCUS and EM_LOSING_FOCUS events.

The launcher 303 is configured to decide when applications need to be started and made to exit. The launcher 303 is also used to start and stop applications although this is not always the case. This role can be undertaken by another application at the instruction of the launcher 303, for instance, in the case where the applications 304 are run on separate machines to the rest of the components of the architecture 200.

The events that are sent to the launcher 303 instead of being sent to the current front application allow the launcher 303 to make decisions on which application(s) are to be running at the any moment in time and being configured to force applications to exit means that the launcher 303 can enforce which applications are to be currently running. The launcher 303 is also required to inform the event manager 301 when it is starting and stopping applications.

Figure 36:
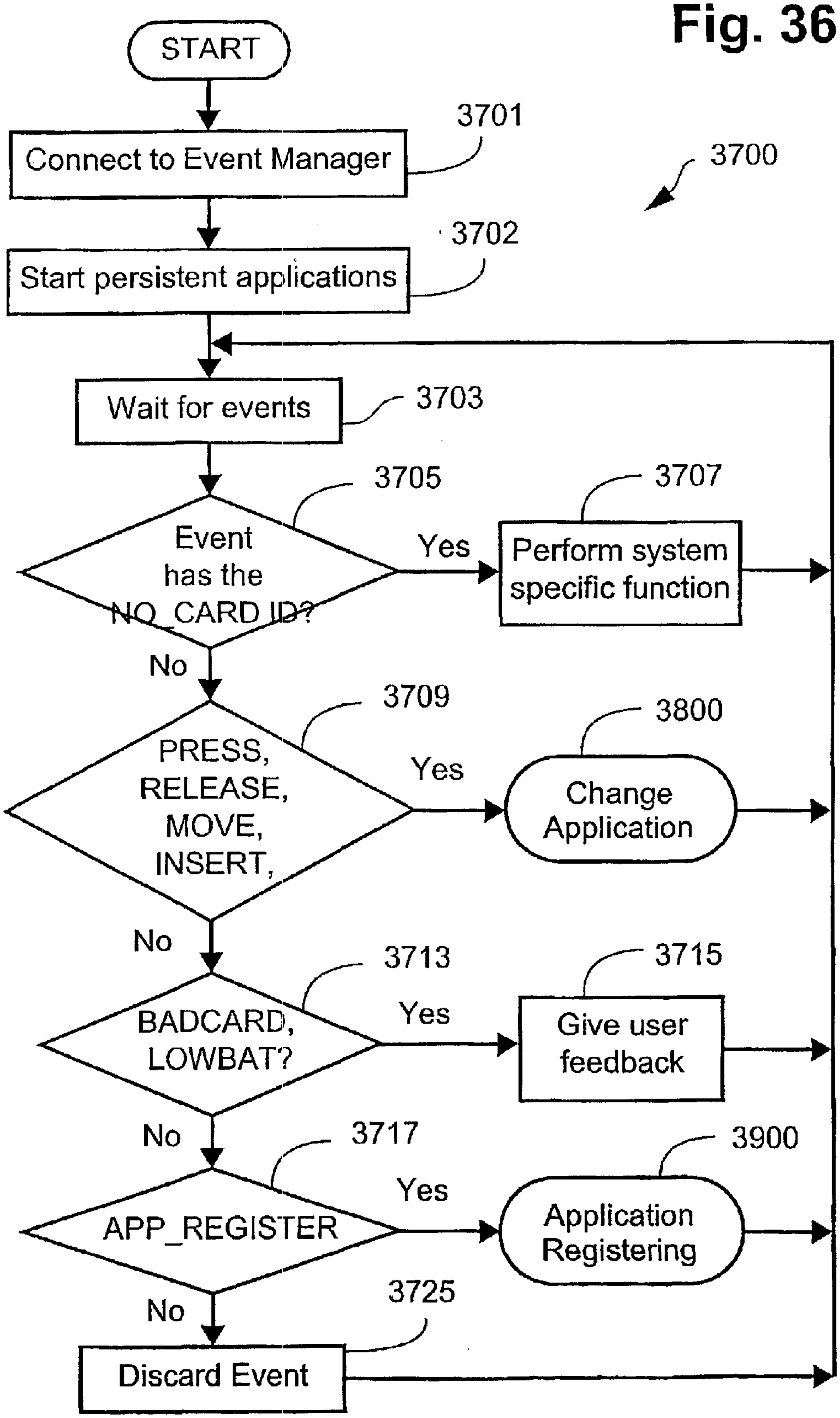
FIG. 36 is a flow diagram showing an overview of a method performed by the launcher.

FIG. 36 is a flow diagram, showing an overview of the method 3700 performed by the launcher 303. The method 3700 can be executed by the CPU 205 for computer implementations. Alternatively, the method 3700 can be executed by the CPU 4305 in set top box implementations or by the CPU of a remote server. The method 3700 begins at the first step 3701, where the launcher 303 connects to the event manager 301, and then continues to a next step 3702 where persistent applications are started. At the next step 3703, the launcher 303 waits for an event and when an event is received the launcher 303 proceeds to step 3705. If the event is the NO_CARD identifier at step 3705, then the process proceeds to step 3707. Otherwise the method 3700 proceeds to step 3709. At step 3707, the launcher 303 performs a predetermined system specific function (e.g. displays a message on the display 101) in response to the NO_CARD identifier and the method 3700 returns to step 3703.

If the event at decision step 3705 is determined not to be a NO_CARD identifier, another decision step 3709 is entered to determine whether or not the event is a PRESS, RELEASE, REMOVE or MOVE. If this decision step 3709 returns a "yes", that is, the event is one of the aforementioned events, then the method 3700 proceeds to step 3800. Otherwise the method 3700 proceeds to a further decision step 3713. At step 3800, the launcher 303 changes the application in accordance with the process steps described with reference to the flow diagram FIG. 37. The method 3700 returns to step 3703.

If the event at step 3709 is not one of the PRESS, RELEASE, REMOVE or MOVE events, then a decision step 3713 is entered. This decision step 3713 makes a determination on a BADCARD or LOW_BATT event. If the event is a BADCARD or LOW_BATT event at step 3713, then the method 3700 proceeds to step 3715, otherwise the method 3700 proceeds to step 3717. At step 3715, the launcher 303 gives the user feedback on the event that has occurred (e.g. displaying a "Low Battery" message on the display 101 if the LOW_BATT event is determined or a "Incorrect Card" upon determination of a BADCARD event) and the method 3700 returns to step 3703. If the event at decision step 3713 is neither a BADCARD or LOW_BATT event, then step 3717 is entered.

If the event is an APP_REGISTER event at step 3717, then the method 3700 proceeds to step 3900, "Application Registering". Otherwise the method 3700 proceeds to step 3725. At step 3900, the application is registered as described herein with reference to FIG. 38 (i.e. the application informs the other components 301, 302 and 306 that it is now ready to receive messages, as described above with reference to section 8.3.4) and the method 3700 returns to step 3703. A method of registering an application in accordance with step 3900, will be described in more detail below with reference to the flow diagram of FIG. 38. At step 3725, the event is discarded and the method 3700 returns to step 3703.

Figure 37:
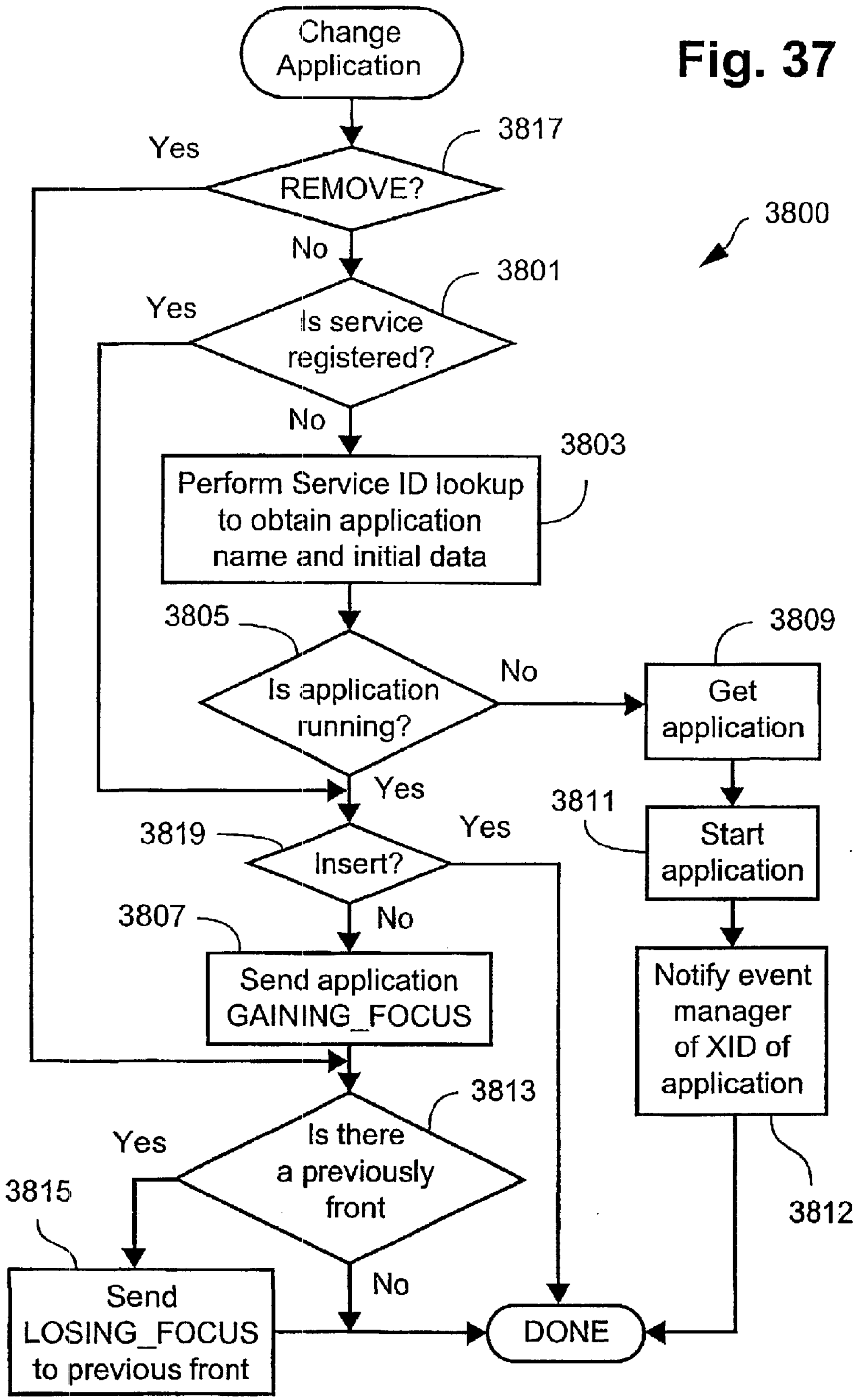
FIG. 37 is a flow diagram showing a method of changing an application, performed during the method of FIG. 36.

FIG. 37 is a flow diagram showing the method 3800 of changing an application, which is performed by the launcher 303. The method 3800 can be executed by the CPU 205 for computer implementations. Alternatively, the method 3800 can be executed by the CPU 4305 in set top box implementations or by the CPU of a remote server. The method 3800 begins at step 3817, where if a REMOVE message has been received by the launcher 303 then the process proceeds directly to step 3813. Otherwise, the method 3800 continues to decision step 3801. At decision step 3801, if the service represented by the event is associated with an application that is registered, then the method 3800 proceeds directly to step 3819. Otherwise, the method 3800 continues to step 3803, where a service identifier lookup is performed to determine the location and/or name of a new application and any initial data associated with the new application. For example, the initial data may be a URL to load into a browser 403 or a media file to be loaded into a media player application. At the next step 3805, if the application is already running the method 3800 proceeds to step 3819. Otherwise, the method 3800 proceeds to step 3809, where the new application is retrieved from applications 304. At the next step 3811, the new application is started as the front application, and at step 3812 the event manager 301 is notified of the component identifier (Xid) of this new front application.

Decision step 3819 is entered either from step 3801 if the service represented by the event is associated with an application that is registered or if the application is already running. At step 3819, if it is determined that an INSERT message is received by the launcher 303, then the method 3800 concludes. Otherwise, the method 3800 proceeds to step 3807, where the new application is sent a GAINING_FOCUS event indicating that the new application will soon be changing state. After the new application is sent a GAINING_FOCUS event, or as a result of a REMOVE event detected at decision step 3817, control is passed to decision step 3813. At step 3813 it is determined if there is an existing front application, if there is no previously front application, then method 3800 concludes. Otherwise, a LOSING_FOCUS event is sent to the previous front application enabling the previous front application to complete immediate tasks, before the method 3800 concludes.

Figure 38:
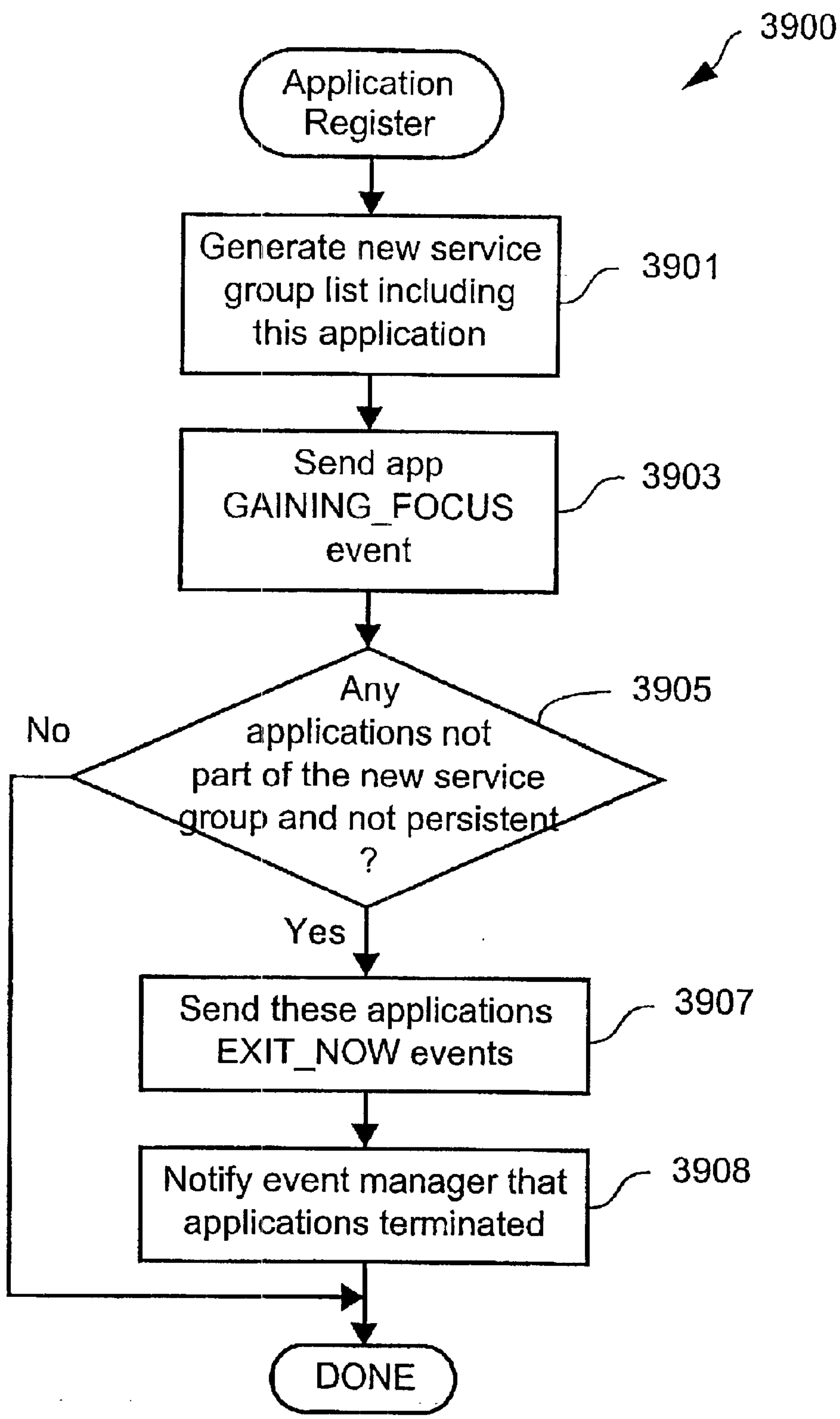
FIG. 38 is a flow diagram showing a method of registering a new application, performed during the method of FIG. 36.

FIG. 38 is a flow diagram showing the method or process 3900 of registering a new application, which is performed by the launcher 303. The method 3900 can be executed by the CPU 205 for computer implementations. Alternatively, the method 3900 can be executed by the CPU 4305 in set top box implementations, or by the CPU of a remote server. The process 3900 begins at step 3901, where a new service group list, including the application, referred to with reference to step 3900 of FIG. 36, is generated. At the next step 3903, a GAINING_FOCUS event is sent to this application. Then at the step 3905, if any applications are not part of the new service group and are not persistent, the method 3900 proceeds to step 3907. Otherwise the method 3900 concludes. At step 3907, any applications which are not part of the service group are sent an EXIT_NOW event, and the method 3900 proceeds to a next step 3908 where the event manager 301 is notified that the applications, which were not part of the new service group, have been terminated. The method 3900 then concludes.

Figure 39:
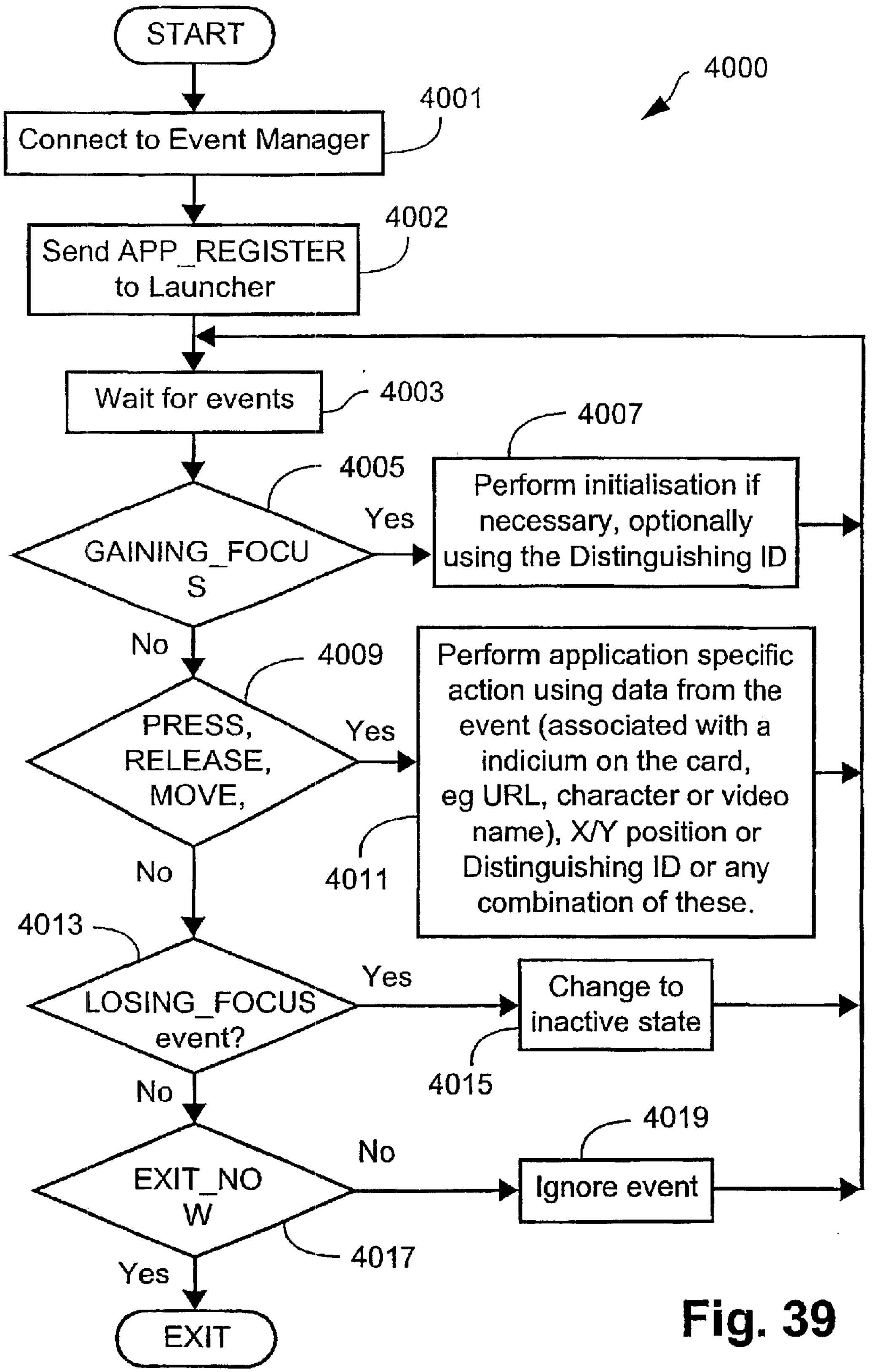
FIG. 39 is a flow diagram showing a method performed by an application when receiving events from the launcher.

FIG. 39 is a flow diagram showing the process steps 4000 performed by an application when receiving events from the launcher 303. The method 4000 can be executed by the CPU 205 for computer implementations. Alternatively, the method 4000 can be executed by the CPU 4305 in set top box implementations or by the CPU of a remote server. The method steps 4000 begins at step 4001, where the launcher 303 connects to the event manager 301 and then the method 4000 proceeds to step 4002. At step 4002, the application is registered by sending an APP_REGISTER message to the launcher 303. Following the flowchart shown in FIG. 39, to the next step 4003, the application waits for events and when an event is received the process proceeds to step 4005. If the event is a GAINING_FOCUS event at step 4005, then the method 4000 proceeds to step 4007. Otherwise the method 4000 proceeds to step 4009. At step 4007, the application is initialised if necessary, optionally using the distinguishing identifier and optionally using the data field of the GAINING_FOCUS event. This data field used for initialisation may include a URL to load, a filename to load, etc. Control returns to waiting for events at step 4003.

If the event is a PRESS, RELEASE or MOVE event at step 4009, then the method 4000 proceeds to step 4011. Otherwise the method 4000 proceeds to step 4013. At step 4011, an application specific action is performed in response to the event. The application specific action is performed using data from the event (i.e. data associated with an indicium on the card 10, (eg URL, character or video name)), the X/Y position or distinguishing identifier or any combination of these.

The application specific action is typically associated with an indicium on the card 10. For example, an indicium can be associated with a particular URL and when the indicium is pressed the URL may be accessed. Therefore, for example, the computer 100 or STB 601 can download desired programs from a Web Page that was designated by the URL, and a card user can receive the service (i.e program download) from the system 600. Further, an indicium can be associated with a particular memory address and when the indicium is pressed the memory address can be used to data store at the memory address. Therefore, for example, the computer 100 or STB 601 can download desired image data from memory or from a file server on a network, which was designated by the memory address, and a card 10 user can receive the service (e.g. image data download) from the system 600. After step 4011, the method 4000 returns to step 4003 as shown in FIG. 39.

The process steps 4000, according to the flowchart of FIG. 39 as described above, filters through to step 4013 if an event is not determined to be any one of a GAINING_FOCUS, PRESS, RELEASE or MOVE event at the corresponding decision steps 4005 or 4009. If the event is a LOSING_FOCUS event then at step 4013 the method 4000 proceeds to step 4015. Otherwise the method 4000 proceeds to decision step 4017. At step 4015, the application reverts to an inactive state and the method 4000 returns to step 4003. If the event is an EXIT_NOW event at step 4017, then the method 4000 concludes. Otherwise the method 4000 proceeds to step 4019, where the event is ignored and the method 4000 returns to step 4003.

Figure 40:
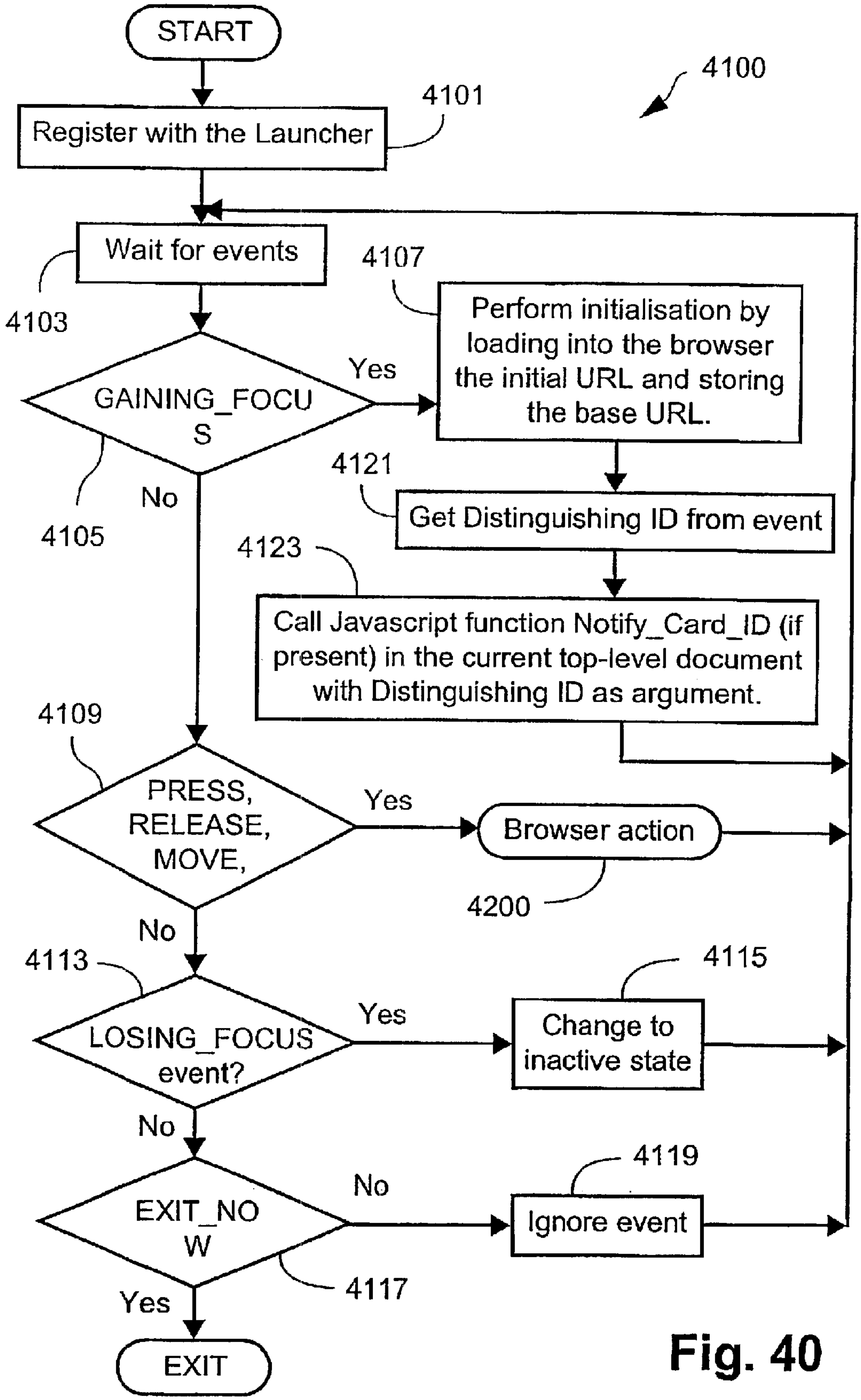
FIG. 40 is a flow diagram showing a method performed by the browser controller application when receiving events from the launcher.

FIG. 40 is a flow diagram showing the method 4100 performed by the browser controller 402 application when receiving events from the launcher 303. The method 4100 can be executed by the CPU 205 for computer implementations. Alternatively, the method 4100 can be executed by the CPU 4305 in set top box implementations, or by the CPU of a remote server. The method 4100 begins at step 4101, where the browser application sends an APP_REGISTER message to the launcher 303. At the next step 4103, the browser application waits for events and when an event is received the method 4100 proceeds to step 4105. If the event is a GAINING_FOCUS event at step 4105, then the method 4100 proceeds to step 4107. Otherwise the method 4100 proceeds to step 4109. At step 4107, the application is initialised if necessary. For example, the application reads the data field of the GAINING_FOCUS message and, if the data field represents a URL, the application loads that URL. Initialisation is performed on the browser controller 402, by loading an initial URL into the browser application 403 and storing the base of the URL. The method 4100 continues at the next step 4121, where the distinguishing identifier is determined from the event. At the next step 4123, a JavaScript call back function (preferably known as the Notify_Card_ID) is called in the current top-level document with the distinguishing identifier 1110 as the argument, and then the method 4100 returns to step 4103.

If the event is a PRESS, RELEASE or MOVE event at step 4109, then the method 4100 proceeds to step 4200. Otherwise the method 4100 proceeds to step 4113. At step 4200, a browser application specific action is performed in response to the event. The browser application specific action will be described in more detail below with reference to the flow diagram of FIG. 41. After step 4200, the method 4100 returns to step 4103.

If the event is a LOSING_FOCUS event at step 4113, then the method 4100 proceeds to step 4115. Otherwise the method 4100 proceeds to step 4117. At step 4115, the browser application reverts to an inactive state and the method 4100 returns to step 4103.

If the event is an EXIT_NOW event at step 4117, then the method 4100 concludes. Otherwise the method 4100 proceeds to step 4119. At step 4119, the event is ignored and the method 4100 returns to step 4103.

Figure 41:
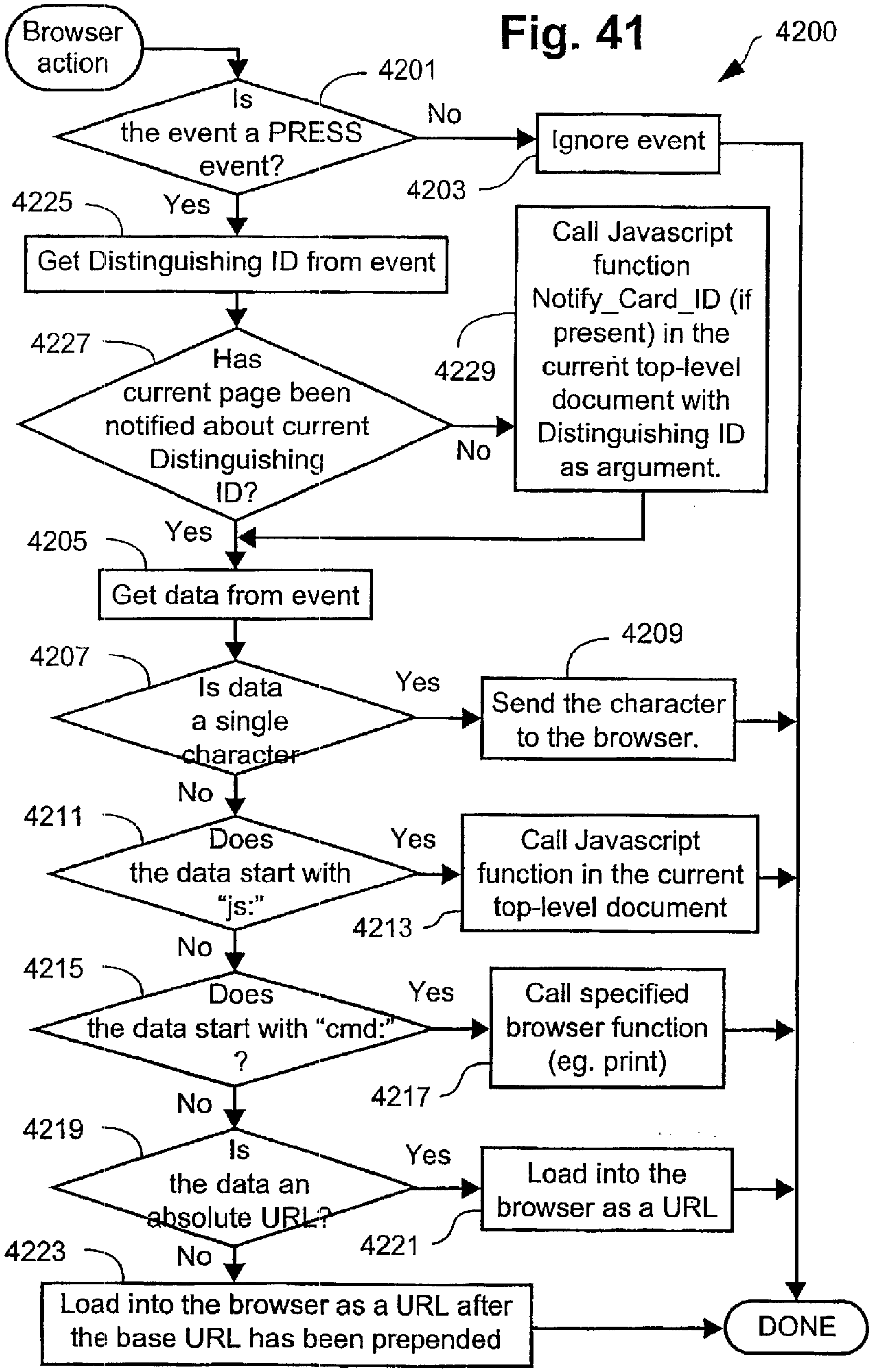
FIG. 41 is a flow diagram showing a browser application method.

FIG. 41 is a flow diagram showing a browser application method 4200 executing on the system 600 incorporating the software architecture 200. The method 4200 can be executed by the CPU 205 for computer implementations. Alternatively, the method 4200 can be executed by the CPU 4305 in set top box implementations or by the CPU of a remote server. The method 4200 begins at step 4201, where if the event is a PRESS event then the method 4200 proceeds to step 4225. Otherwise the method 4200 proceeds to step 4203, where the event is ignored and the method 4200 concludes. At step 4225, the distinguishing identifier is determined from the event. At the next step 4227, if the current page has been notified about the current distinguishing identifier then the method 4200 proceeds to step 4205. Otherwise, the method 4200 proceeds to step 4229, where the JavaScript call back function known as the Notify_Card_ID is called in the current top-level document with the distinguishing identifier as the argument, and then the method 4200 proceeds to step 4205.

At step 4205, data is retrieved from the event. At the next step 4207, if the data is a single character then the method 4200 proceeds to step 4209. Otherwise the method 4200 proceeds to step 4211. At step 4209, the character is sent to the browser application 403, and the method 4200 concludes. This may be used to provide the same effect as a user pressing a key on a keyboard or a button on a conventional remote control. The current page may provide an action which is performed on receipt of a given keypress using existing methods such as those provided by Hyper Text Mark-up Language (HTML).

If the data starts with "js:" at step 4211, then the method 4200 proceeds to step 4213. Otherwise the method 4200 proceeds to step 4215. At step 4213, a JavaScript function in the current top-level document is called and the method 4200 concludes. The specified data may optionally include an argument for the JavaScript function. For example, the data "js:hello" would indicate that the browser controller is to call the JavaScript function "hello", and the data "js:hello (world)" would indicate that the browser controller is to call the JavaScript function "hello" with the argument "world".

If the data starts with "cmd:" at step 4215, then the method 4200 proceeds to step 4217. Otherwise the method 4200 proceeds to step 4219. At step 4217, a specified browser function is called and the method 4200 concludes. For example, the data "print" would result in the browser controller instructing the data "back" would result in the browser controller instructing the browser to return to the previously displayed page.

If the data is an absolute URL at step 4219, then the method 4200 proceeds to step 4221. Otherwise the method 4200 proceeds to step 4223. At step 4221, the data is loaded into the browser application 403 as a URL and the method 4200 concludes.

At step 4223, the data is loaded into the browser application 403 as a URL after the base URL has been appended, and the method 4200 concludes.

A variation on the browser controller application described above with reference to FIG. 40, is a program controller, which provides control of a software program. The software program can include any program, which is normally controlled with one or more keypress events (e.g. like a keyboard keypress event or the equivalent on a game controller). The program controller can be used to provide card-based control of an existing software program such as an interactive game. The program controller process behaves substantially as described with reference to FIG. 40 with the following exceptions. If the event at step 4105 is a GAINING_FOCUS event, then the program controller process proceeds to a step of getting a Resource Locator, for the software program to be controlled, from the GAINING_FOCUS message. The process then proceeds to a step of getting and starting the software program specified by the resource locator. The program controller process then proceeds to step 4103. Further, at step 4109, instead of testing for a PRESS, RELEASE or MOVE event, this particular variation in the method 4100 would substantially check for a PRESS event. If the event is a PRESS event, the process proceeds to the steps of getting the data from the event, taking the first character from that data, and effecting a keypress of that character resulting in the same effect as if a user had typed that character on a keyboard.

10.1 Special Routing Rules for the Launcher

The launcher 303 has a special set of routing rules and the launcher 303 always receives the following events:

EM_REMOTE_INSERT

EM_REMOTE_REMOVE

EM_REMOTE_BADCARD

The launcher also receives EM_REMOTE_PRESS, EM_REMOTE_RELEASE and EM_REMOTE_MOVE messages if a service identifier does not match a currently front application or if the distinguishing identifier represents the NO_CARD present identifier (i.e. all zeroes). For the purposes of determining whether or not messages match, the service-specific identifier is ignored.

The launcher 303 can be configured to explicitly make itself the front application by sending itself a EM_GAINING_FOCUS event. In this instance, all messages will be sent to the launcher 303 regardless of the service identifier of the message. The launcher 303 is not required by the protocol to respond to any of these messages.

10.2 Sample Implementations

This section outlines several examples of launcher configuration.

10.2.1 Generic Launcher

A generic launcher can be used in an open set-top-box or computer environment with broad-band Internet connectivity. In accordance with this configuration, the launcher 303 assumes that there are applications that can be downloaded to a local machine or designated remote machine and run. A generic launcher can also be configured to accommodate the use of applications that use the browser 403 via the browser controller 402.

The generic launcher can be configured to download applications as well as support persistent applications. The computer 100 running the system 600 preferably has a reasonably fast Internet connection available. In this instance, some of the applications 304 can be web pages with JavaScript that is handled by a persistent application called the browser controller 402, as described above. Further some of the applications 304 can be designed to work together. The generic launcher preferably also assumes that the communications link used by the remote reader 1 is unreliable (i.e. an IR link) so messages can be lost.

10.2.2 Rules for the Generic Launcher

The following rules are the rules that are preferably used by the launcher 303 to define the system 600.

EM_REMOTE_PRESS and EM_REMOTE_RELEASE events that have the NO_CARD present identifier (i.e. all zeroes) are used as a cue that the user wishes to exit from the front application. This could result in the system 600 either generating a "Please insert a card" message on the display 101 or returning to an earlier application, depending on the configuration of the system 600.

EM_REMOTE_BADCARD events cause the launcher 303 to provide the users with feedback indicating that the card is faulty.

EM_REMOTE_INSERT, EM_REMOTE_REMOVE are not relied upon to provide the bounds of the session because of the assumed unreliable communications method from the remote reader 1 to the event manager 301.

If the launcher 303 receives an EM_REMOTE_PRESS, EM_REMOTE_RELEASE or an EM_REMOTE_MOVE message then the launcher 303 does a service mapping, and if the service identifier resolves to a downloadable application then the corresponding application is downloaded and run. The mapping is done by querying the Directory Server 305 with the service information from cards. The values returned from the Directory Server 305 are an application location and associated service data. The application location specifies the location of the application or a value the launcher recognises as a local application. The service data is the initialisation data that is sent to the application in the EM_GAINING_FOCUS message. If the application location is empty the launcher 303 is configured to decide which application to use based upon the service data which will be a URL.

When a new application registers with an EM_APP_REGISTER message the specified service groups are compared with a currently running set of applications and if there is no overlap then all other currently running applications are told to exit. The new application is made the current front application (using an EM_GAINING_FOCUS event) and the previously front application is sent an EM_LOSING_FOCUS event. If this occurs and the service identifier resolves to a web page then the focus is changed, using an EM_GAINING_FOCUS message, to the browser controller 402 with the address (location) of the web page in the data field. The data field is returned in the query that told the launcher 303 that the service identifier resolved to that web page. In this situation, an EM_LOSING_FOCUS event is also sent to the current front application. All other applications are told to exit.

10.3 An Example Single Use System

The architecture 200 can be configured for use with a single specialised application. In this instance, the launcher 303 can be used where it is advantageous to have a physical token (e.g. a bank card) where part or all of the user interface can be printed onto the token. The example described below is in the form of an automatic teller machine, and whilst this example is described in terms of a specific specialised application it should not be read as being limited to automatic teller machines. Such a system can be configured to be able to use a single or at least very limited number of cards. In this system no other applications 304 are started regardless of the card that is entered. The launcher 303 takes the role of a single application 304 as well as that of a system controller. No modifications are made to the event manager 301.

A single use system can be used in an automatic teller machine for example. A bank can produce personalised bank cards with commonly used options on the cards that are used as the sole or supplementary interface for an automatic teller machine. In this instance, the automatic teller machine preferably contains an event manager 301 and other core process components of the architecture 200. In this specific example the communications link between the remote reader 1 and the event manager 301 must also be reliable.

10.3.1 Rules

The following rules can be used by a launcher 303 to define a single use system bank teller machine example:

Any events that do not come from cards associated with a participating bank could cause the launcher to display an incompatible card screen on the terminal.

EM_REMOTE_BADCARD events are ignored.

EM_REMOTE_INSERT events are used to start the transaction.

EM_REMOTE_REMOVE events are used to end the transaction.

EM_REMOTE_PRESS, EM_REMOTE_RELEASE and EM_REMOTE_MOVE events are treated as a user interaction. These are preferably handled directly by a launcher as that is the one application that is running.

Service mappings to an external Directory Server are never done. If the card is not one that a particular automatic teller machine (ATM) knows about then the card should be rejected.

These rules are examples of how a single use system can be configured to provide a specific application in the form of an ATM.

10.4 Directory Service Operation

Figure 58:
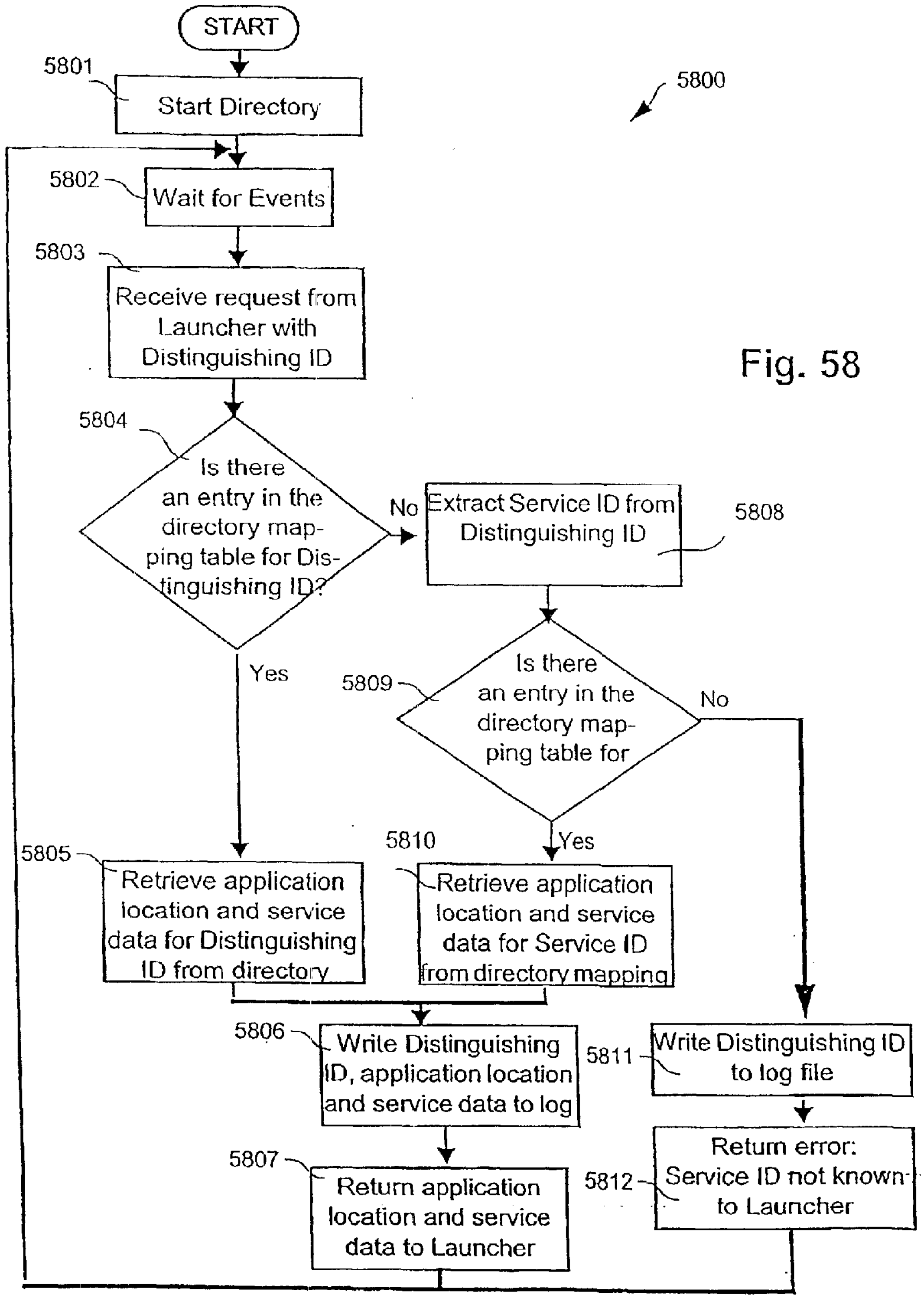
FIG. 58 is a flow diagram, showing an overview of the process performed by the directory service of FIG. 8.

FIG. 58 is a flow diagram, showing an overview of the process 5800 performed by the Directory Service 311. The process 5800 is executed by the CPU 205 of a computer 100, which performs the role of a Directory Service 311. The software program as shown in FIG. 58 is stored in a memory medium such as Memory 206 or CD-ROM212 in the system 600A or Memory 4306 in the system 600B. The process 5800 begins at the first step 5801, where the Directory Service 311 is started. At the next step 5802, the CPU waits for incoming events from a Launcher 303. The events are sent from Read Device 1 to Launcher 303 via Event Manager 301. At the next step 5803, the CPU receives a request from a Launcher 303, which contains a Distinguishing identifier, which is to be mapped by the Directory Service 311. The connection between the Launcher 303 and the Directory Service 311 is shown in FIG. 8.

At the next step 5804, the CPU searches a directory-mapping table to check if the table has an entry corresponding to the Distinguishing identifier. The directory-mapping table typically contains relations between Service identifiers and corresponding application location (e.g. URL) and service data and additionally contains relations between Distinguishing identifiers and the corresponding application location and service data. Typically, the relation involving the Service identifier is used with respect to cards 10 for which the Directory Service 311 is intended to maintain service-level information for all cards 10 which can be used for that service (for example, the location of the application 304 which is to be executed to provide the service for the card 10). Typically, the relation involving the Distinguishing identifier is used with respect to cards 10 for which the Directory Service 311 is intended to maintain information specific to the actual cards 10 or groups of cards 10 which have identical service-specific identifiers (for example, the location of a media file which is to be played to provide the service for the card 10). The directory-mapping table is typically stored in hard disk 210 or in memory 206. At step 5804, if there is an entry for the Distinguishing identifier in the directory mapping table, at the next step 5805, the CPU retrieves the application location and service data from this entry and moves to step 5806. At step 5804, if there is not an entry for the Distinguishing identifier in the table, the CPU at step 5808 extracts the Service identifier from the Distinguishing identifier by taking the relevant portion of this value (typically the first 5 bytes as is indicated in FIG. 11). At the next step 5809, the CPU searches the directory-mapping table for an entry corresponding to the Service identifier. If one is found, the CPU retrieves the application location and service data from this entry at the next step 5810 and moves to step 5806. If one is not found, at step 5811, an entry is placed in a log file indicating that a request had been made for the specific Distinguishing identifier and, at step 5812, an error is returned to the Launcher 303 indicating that the Service identifier part of the Distinguishing identifier supplied is not known by this Directory Service 311. The flow then continues to step 5802.

At step 5806, where a Distinguishing identifier or a Service identifier has been successfully found, the Distinguishing identifier and corresponding application location and service data is written to a log file and the CPU returns the application location and service data to the Launcher 303 which made the request. Flow then continues to step 5802 to wait for another event.

11. General

Typically, applications 304 are resident on the hard disk drive 210 and read and controlled in their execution by the CPU 205. Intermediate storage of programs and any data fetched from the network 220 can be accomplished using the semiconductor memory 206, possibly in concert with the hard disk drive 210. In some instances, the applications 304 will be supplied to the user encoded on a CD-ROM or floppy disk and read via the corresponding drive 212 or 211, or alternatively may be read from the network 220 via the modem device 216. Other mechanisms for loading software application into a computer system 100 from other computer readable medium include magnetic tape, a ROM or integrated circuit, a magneto-optical disk, a radio or infra-red transmission channel between the computer module 102 and another device, a computer readable card such as a smart card, a computer PCMCIA card, and the Internet and/or Intranets including email transmissions and information recorded on Websites and the like. The foregoing is merely exemplary of relevant computer readable media. Other computer readable media are also possible including combinations of those described above.

Alternatively, the process components 301 to 306 described above can be implemented in dedicated hardware as one or more integrated circuits performing the described functions or sub-functions. Such dedicated hardware may include graphic CPUs, digital signal CPUs, or one or more microCPUs and associated memories. An examples of dedicated hardware is the set top box 601 for a television described with reference to FIG. 6(*b*) above.

12. Other Variations

12.1 A Session Identifier

As described above, the distinguishing identifier is included in every INSERT, REMOVE, PRESS, RELEASE and MOVE message sent from the reader 1 to the computer 100 or set-top box 601. As an alternatively, the distinguishing identifier can be sent in connection with an INSERT message only. In this instance, upon insertion of a new card 10, the reader 1 generates a session identifier (not illustrated). The session identifier identifies a current session of a card insertion. The session identifier, for example, can be a pseudo-random number (which can be represented with 2 bytes of data) or the session identifier can be a number that is incremented each time a card is inserted (and reset to zero when a predetermined value is reached). The reader 1 sends an INSERT message to the computer 100 or the set-top box 601, which includes a distinguishing identifier as previously described above and a session identifier which is generated for each new insertion. All subsequent PRESS, RELEASE and MOVE messages need not include the distinguishing identifier but will include the session identifier and user interface object data or press coordinates previously described.

When using a session identifier, the system 600 performs as described above with reference to FIGS. 6(*a*) and 6(*b*), except that the event manager 301, upon receiving an INSERT message from a reader 1, stores the session identifier as the current session identifier and a distinguishing identifier as the current distinguishing identifier. When the event manager 301 receives a PRESS, RELEASE or MOVE message, the event manager 301 checks that the session identifier is equal to the current session identifier. If so, the event manager 301 sets a distinguishing identifier used in all messages to the current distinguishing identifier. Otherwise, if the session identifier is not equal to the current session identifier, the event manager 301 informs the user, via the display manager 306, and the display device 101, that a message has been received without a corresponding INSERT message. The user, for example, is then requested to remove and reinsert the card 10.

12.2 Other Characteristics of a User Press

As described above, the sending of information relates to the pressing, moving and releasing of an object (typically with a finger or stylus) on the touch panel 8 of the reader 1. However, the reader 1 can send additional information pertaining to an interaction from the touch panel 8 to the computer 100 or set-top box 601 for use by the system 600. For example, the additional information can represent a length of time or an amount of pressure exerted upon the touch panel 8 as a result of a press. This additional information can be incorporated in the PRESS messages sent from the reader 1 to the system 600 and with the EM_READER_PRESS messages sent within the system 600. In this instance, the information is passed to an application 304 corresponding to the card inserted in the reader 1. An application can make use of the additional information to provide, for example, an added effect on a particular action. For example, the application can use pressure information, when associated with a press on an indicium indicating an increase in (audio) volume, to determine an amount of increase in volume. That is, the harder the press on the selected indicium, the higher the rate of increase in the volume and conversely, the softer the press on the selected indicia the lower the rate of increase.

Another example of the use of additional information in relation to a length of time (or duration) of an interaction with a touch panel 8 is described below. If a press is of very short duration, the press can to be considered to be a "tap". On the other hand, a press of very long duration can be considered as a persistent "holding down" of a keypress. In this instance, additional information can add an extra dimension to a mode of interacting with an instant software application. For instance, a "tap" on the touch panel 8 can be an instruction to the software application to select an item displayed at a current (on-screen) cursor position.

12.3 No Coordinates

A PRESS and RELEASE message can be configured not to include coordinate data of a user's interaction with the touch panel 8. In this instance, coordinate data is only sent from the reader 1 to the system 600 in conjunction with a MOVE message. The advantage of not including coordinate data in a PRESS and RELEASE message is a size reduction of messages sent by a reader 1 to the system 600, where an applications 304 does not require coordinate information for mapping from coordinates to user interface element data.

12.4 Two-way Protocol

A one-way or a two-way protocol can be used for communication between a reader 1 and a computer 100 or set-top box 601. The description of the reader 1 hardware with reference to FIG. 10, and the I/O Daemon described with reference to FIGS. 8 and 9 included a sending of information from a reader 1 to computer 100 or set-top box 601 and vice versa. The sending of information back to a reader 1 from a computer 100 or set top box 601 can be used to change the data stored on a card 10. For example, changing user interface object data stored on the memory chip of a smart card 10.

A two-way protocol can also be used to enable handshaking in the protocol. For example, a two-way protocol between a reader 1 and a set-top box 601 or computer 100 can be used so that the system 600 can acknowledge the receipt of an INSERT message sent when a card is inserted in the reader 1. A system 600 which supports a two-way protocol should also provide an additional message in the event manager protocol, in order to allow an application to send a request in order to modify a portion of the stored data on a card 10, sent to the I/O daemon 300 via the event manager 301. The I/O daemon 300 can then send a message to the reader 1 to bring about a requested action. For example, if the system 600 uses a two-way protocol then the system 600 can provide a security mechanism to ensure that applications can not modify cards without the permission of a user or without a system-defined privilege. In one example of such a system, the event manager 301 can present a displayed message to a user asking if it is OK for the application to modify a currently inserted card. The user can assent to the proposal by pressing a first region of the touch panel 8 and dissent to the proposal by pressing a second region of the touch panel 8. If the user assents to the modification of the card 10 then the event manager 301 can allow the request from the application 304 to be passed onto the I/O daemon 300 and then on to the reader 1. On the other hand, if the user dissents from the modification, the event manager 301 drops the message and the information is not sent to the reader 1.

12.5 Alternative Read Device

In the above system 600A and 600B, the Read device 1 has a substantially transparent touch sensitive membrane arranged to overlay the card 10. To reduce a cost of the Read Device 1, instead of the touch sensitive membrane, the Read Device 1 may has a plurality of user operable switches positioned around the receptacle into which the smart card 10 is insertable for reading the data, the distinguishing identifier and relation information to associate the data with each switch. Therefore the user can select at least one of the switches that correspond to at least one indicia on the card, since the operable ones of the switches are associated with indicia on the smart card visually. In this case CPU45 reads the data corresponding to a switch pressed by the user based on the relation information and the distinguishing identifier from the card 10 and sends them to Event Manager 301.

13.0 Alternative Software Architecture

Figure 48:
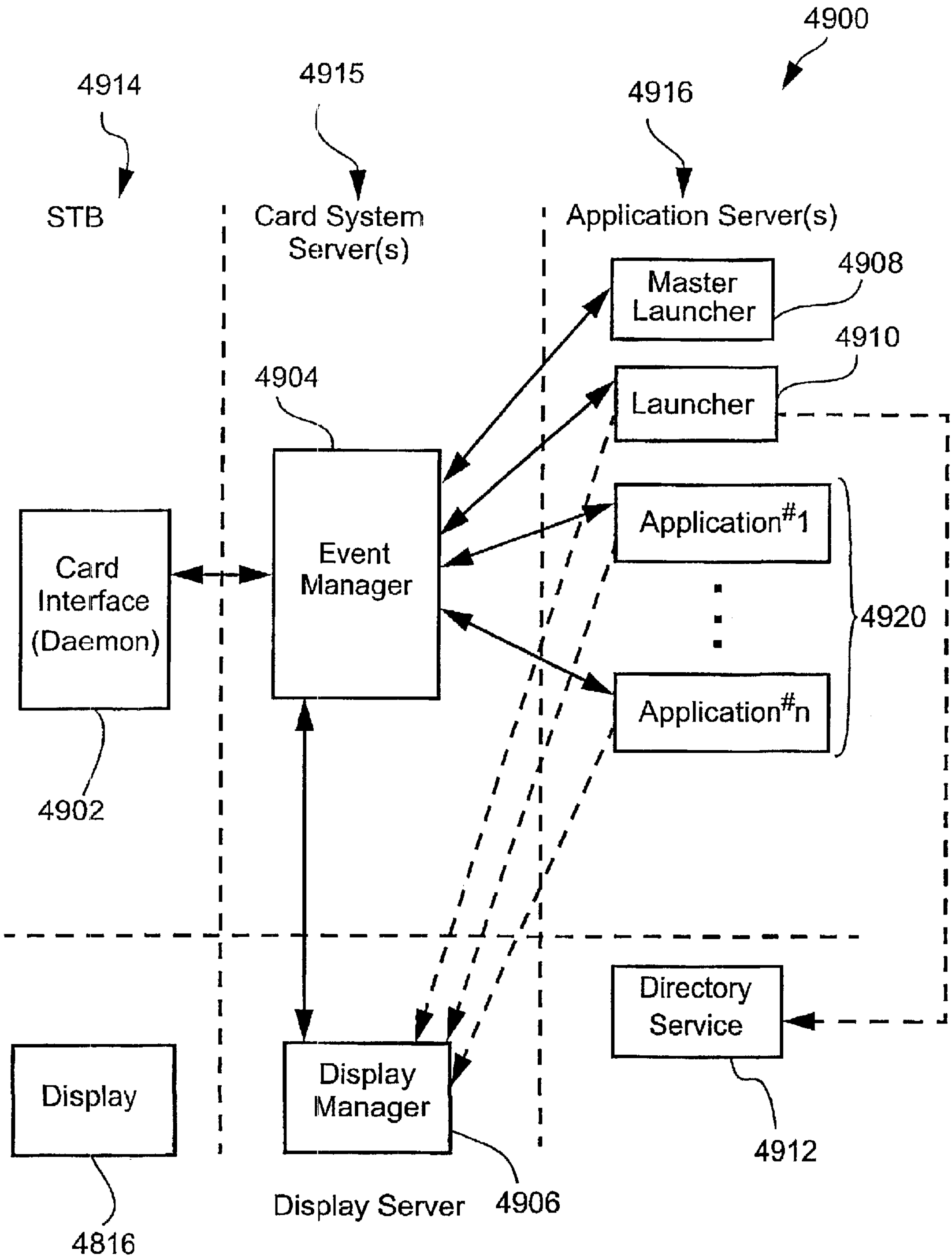
FIG. 48 is a schematic block diagram representation of a further card interface system architecture.

A further software architecture 4900 for the hardware architecture depicted by the system 600, is generally illustrated in FIG. 48 and represents an alternate software architecture to that described in previous sections. The alternative architecture 4900 is configured to be scaled from very low hardware requirements at the users home (ie. a simple set-top box), up to a powerful home system, where for example the set-top box 601 functionality is implemented on personal computing system. Further, the alternative architecture 4900 is preferably implemented within the hardware system 600.

13.1 Structure

The architecture 4900 is divided into six distinct processes and one class of process. The distinct processes include a smart card interface 4902, referred to as an I/O daemon as in the architecture 200, an event manager 4904, a display manager 4906, a master launcher 4908, an (application) launcher 4910 and a directory service 4912. The class of process is formed by one or more smart card applications 4920. In the architecture 4900 there exists one card daemon 4902, one event manager 4904, one display manager 4906 and one launcher 4910 for every smart card remote connection, usually formed by the set-top box 601, but only one master launcher 4908 for each computer that is running the launchers 4910, and at least one directory service 4912 for all systems.

In this form, the architecture 4900 can be physically separated into three distinct parts 4914, 4915 and 4916, as shown by the dashed lines in FIG. 48, each of which can be run on physically separate computing devices. Communication between each of the parts of the system is performed using TCP/IP streams as with the architecture 200.

The I/O daemon 4902 is a process that converts datagrams received from the smart card remote reader 1 into a TCP/IP stream. The I/O daemon 4902 is not intended to understand the data format used by the reader 1, but to operate independent of any changes in the smart card remote data format, and thus provides the capability to work with multiple versions of the reader 1.

The I/O daemon 4902 is started when the user starts the system 600 which, in the case of the set-top box system 600B, is when the set-top box 601 is turned on. For the computer system 600A, the I/O daemon 4902 may be started when the user starts the smart card system after the event manager 4904 and master launcher 4908 have been started.

The event manager 4904 forms a central part of the architecture 4900 in that all communications are routed through the event manager 4904. The event manager 4904 is responsible for gathering all events that are generated by the smart card remote reader 1 and relayed by the I/O daemon 4902. These events are then redistributed to the various processes and running applications.

A further role of the event manager 4904 is to isolate misbehaving applications from other well-behaved applications. In this regard, any events passed through the event manager 4904 are guaranteed to be correct to the extent that the event manager 4904 can check the event. The event manager 4904 is required to check that an event has a valid header and the correct data length, but is typically not configured to check if the data is in the correct format.

Any changes to the protocol between different versions are also to be dealt with by the event manager 4904. If possible, the events are to be rewritten to conform with the version of the data format that the operating application 4920 understands. If such is not possible, then the event manager 4904 reports an error to the originating application 4920. When different data format versions are being used, the event manager 4904 ensures that the smallest disruption possible occurs.

The display manager 4906 operates in concert with those applications 4920 operating to control which operating application 4920 has priority with respect to the particular output device 116, typically a display (e.g. 116). It is the role of the display manager 4906 to select which video stream is sent to the display 116, this information being obtained from the respective launcher 4910 of the application 4920, via the event manager 4904. Generally only the front (ie. foreground) application will produce a video display stream. Further, the display manager 4906 may operate to maintain a constant output stream from the inconsistent input streams and may fill-in some parts of the output stream with extrapolated data.

The event manager 4904 is not responsible for deciding when an application 4920 needs to be started/ended or for actually starting or terminating an application 4920. These operations are both the responsibility of the launchers 4908 and 4910, to be discussed below. Moreover, the event manager 4904 does not have any presence on the users screen or other output device 116. Any system related feedback, such as the display of the initial insert of a smart card, is performed by the launcher 4910.

For the system 600B of FIG. 6(*b*) incorporating the alternative architecture 4900, there will typically be an event manager 4904 running for every set-top box 601 that is allowed to connect to the system 600B. For the system 600A incorporating the architecture 4900, the event manager 4904 will be started when the smart card system 600A, is started after the master launcher 4908 has been started.

The role of the master launcher 4908 is to start the launchers 4910 at the request of any of the event managers 4904. When the I/O daemon 4902 connects to the event manager 4904, the event manager 4904 requests the master launcher 4908 to start a first process for the event manager 4904. This first process will generally be a launcher 4910 for any smart card application 4920. The master launcher 4908 is also responsible for shutting down the launcher 4910 of an application 4920 when the event manager 4904 so requests, and for informing the event manager 4904 that the correct launcher 4910 has exited.

For the system 600B of FIG. 6(*b*) incorporating the alternative architecture 4900, there will always be one master launcher 4908 running for each physically separate server 150, 152 running smart card applications 4920. This one master launcher 4908 handles the requests for all event managers 4904 that request launchers 4910 on that server. For the system 600A, the master launcher 4908 commences operation either before or no later than at the same time as the rest of the smart card system.

The card directory service 4912 is provided to translate vendor-application value (Service identifier value) stored within smart cards 10 into an application location such as Uniform Resource Locators (URLs) that each point to the application 4920 associated with a vendor-application pair (Service identifier) which will be described. The directory service 4912 can be split into a number of parts by changing the launcher 4910 so that applications 4920 can run on separate systems to the launcher 4910. The directory service 4912 performs this function using a distributed look-up system where the query is passed on to another directory server if the directory service currently in possession of the query does not know the answer. Such a distributed system allows each directory server to have a limited knowledge of the transition from vendor-application ID pairs to URL's, but to still be able to translate all ID's to URL's. This provides a number of advantages including a simpler database at each directory, is more robust and permits servers to become inoperable (i.e. crash or be removed from service) whilst still permitting queries.

Figure 52:
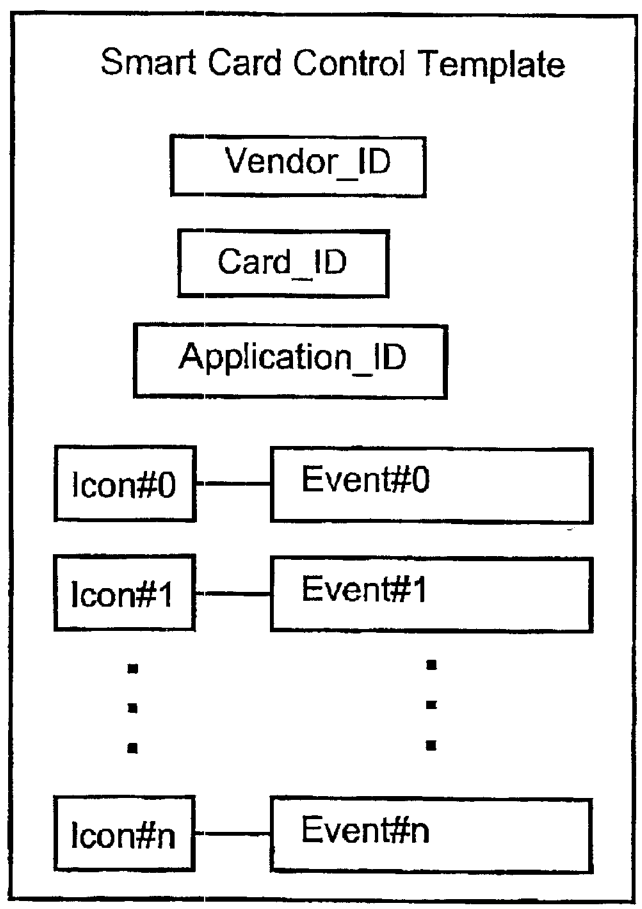
FIG. 52 illustrates the control template data stored in the smart card for the architecture of FIG. 48.

Referring to FIG. 52, the control template customisation information that distinguishes the smart card 10 from traditional smart cards includes a tuple of data from by a vendor identifier, a card identifier and an application identifier. The vendor identifier and the application identifier pair are equivalent to the service identifier described above for the architecture 200. Also, the card identifier is equivalent to the service-specific identifier described above for the architecture 200. Further, associated with each of the icons 4804 is corresponding data that, when a user presses on the touch panel over the icon 4804, is sent as event data that, when passed to the particular application 4920, implements a particular operation within that application. Further detection of user actions may be incorporated, for example to detect the release of an icon, as distinct from a depression of that icon, and also to detect moving depression, where the user may scribe a finger across the touch panel 8 to perform a particular function. On each such action, event data stored on the card can be sent, which may be read from a different location of memory on the card in each case. The service identifier implemented in this alternative architecture 4900 as a vendor-application identifier pair allows the vendor, of an application associated with a smart card, to be distinguished from other. For deployments of the architecture 4900 where there is no need to distinguish a vendor of the application associated with the smart card, the vendor identifier and the application identifier can be treated as a single value: a service identifier.

The first process started by the insertion of a smart card 10 into a reader 1 will be, in a generalised system (e.g. home), a launcher 4910. In specific systems, specific applications may be commenced. For example a banking teller would start a banking application. Another example includes the use of restricted launchers that only start a specified sub-set of applications. The launcher 4910 is a smart card application that starts other applications 4920 for a specific one event manager 4904. It is the decision of the launcher 4910 to start and end applications 4920 and to actually start and terminate applications 4920. The launcher 4910 informs the event manager 4904 when applications 4920 are starting and ending, and tells applications 4920 that they are receiving or losing focus, or when they need to exit. In this regard, where a number of applications 4920 are operating simultaneously, the application that is currently on-screen is the application having focus. When another application is about to take precedence, the launcher 4910 tells the current application that it is losing focus, thereby enabling the current application to complete its immediate tasks, and tells the new application it is gaining focus, and that the new application shall soon be changing state. The launcher 4910 must be able to force a program to exit.

The first application 4920 started (ie. usually the launcher 4910) is given special privileges, and receives "NO_CARD", "Bad_CARD" and "POWER_OFF" events generated from the remote reader 1. The first application 4920 also receives events that are intended for applications 4920 that are not the current front application, and the launcher 4910 operates to correctly interpret these events. Such is related to the specific applications mentioned above, so that the launcher correctly interprets any changes. The launcher 4910 is an application 4920 but having special rights, including the right to start and shut down other applications.

The launcher 4910 is preferably only started when the event manager 4904 requests the launcher 4910 to be started. The launcher 4910 can also be told to exit by the event manager 4904.

Applications are started by the launcher 4910 either as a response to the first user selection on a corresponding smart card 10, or at the request of another one of the application 4920. In this regard, the architecture 4900 provides a substantial enhancement over conventional arrangements through each application 4920 being organised during its programming, as a member of one or more application service groups.

13.2 Application Service Groups

An application service group is comprised of a number of smart card applications 4920 that act co-operatively, as opposed to merely simultaneously, to provide a particular set of functions. Applications 4920 that form part of a service group are permitted to run simultaneously, and also share a communication means (ie. the event manager 4904) by which data may be exchanged. Each such application 4920 is a process or sub-process that provides a set of functions corresponding to a particular user interface or set of user interfaces. Such an application 4920 may or may not have a visible display.

Figure 49:
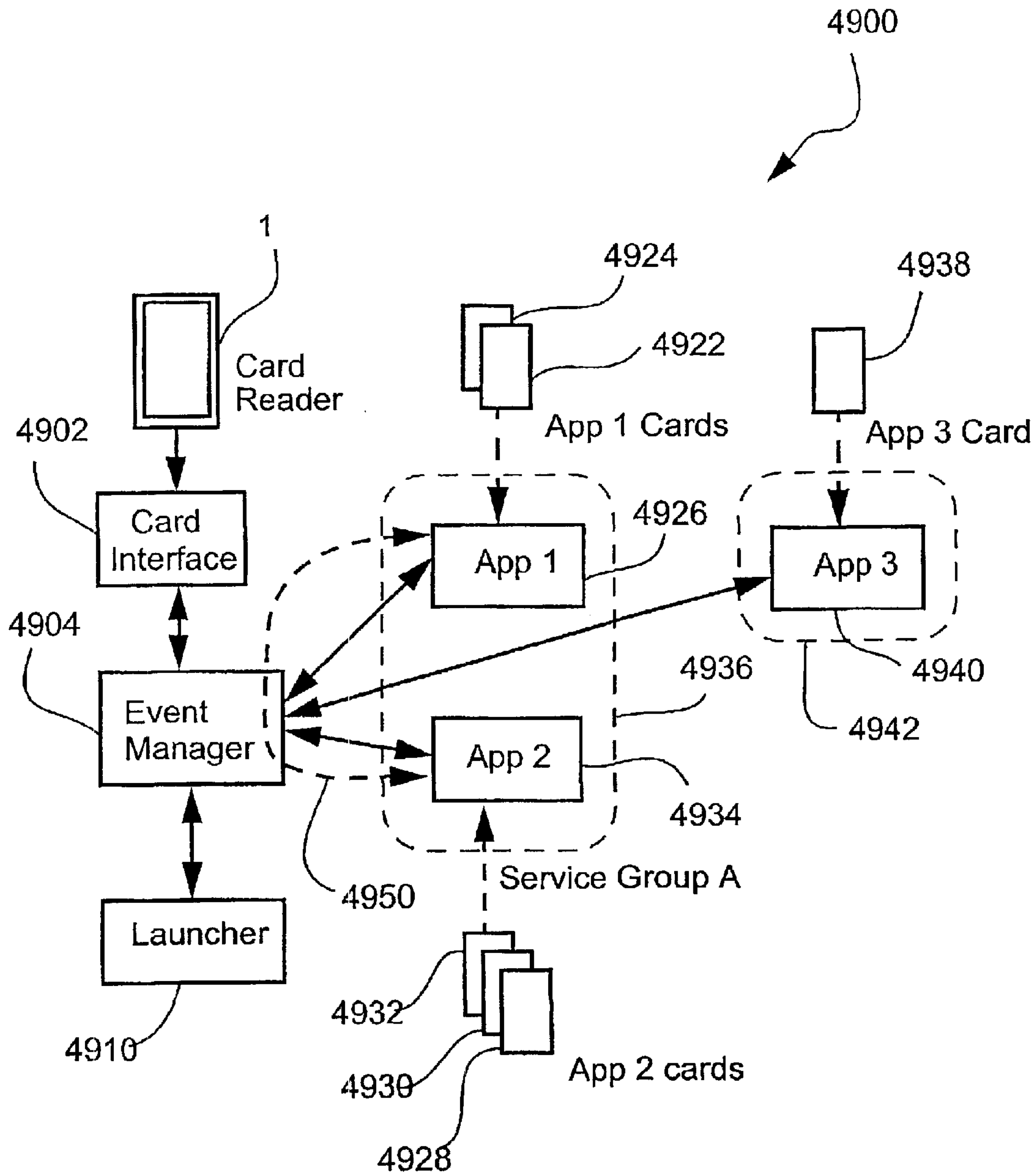
FIG. 49 is a schematic block diagram representation showing the relationships between cards and applications.

With reference to the example represented in FIG. 49, a service group is initiated once an application 4920 that forms part of that service group is started and registers the particular service group with the event manager 4904. As seen in FIG. 49, a first application 4926 has associated therewith two smart cards 4924 and 4926, and a second application 4934 is operable with smart cards 4928, 4930 and 4932. Accordingly, upon insertion of the card 4922 into the reader 1, the card daemon 4902 communicates that occurrence with the event manager 4904 which, via the launcher 4910 commences application 4926. The commencement of the application 4926 enables a service group 4936, this group also including application 4934. Applications that correspond to the currently established service group may be started by inserting the relevant smart cards. For example, removal of the card 4922 and insertion of the card 4932 operates to launch application 4934, maintaining the service group 4936 as being active. Further, the starting of applications that form part of the same service group does not cause other applications from the same service group to terminate. Rather, the other applications are kept running in the background.

Termination of a service group is initiated either by touching on an empty remote reader 1, or by inserting a smart card corresponding to a different service group, such as the card 4938, corresponding to application 4940 in service group 4942. Termination of a service group causes all the applications that are currently rung as part of that service group to be similarly terminated.

Applications running under the same service group may communicate with each other via the event manager 4904 by way of a service-group defined protocol 4950 as seen in FIG. 49. In the protocol 4950, the format and contents of data packets sent between applications (e.g. 4926 and 4934) should be defined by the authors of those applications that coexist within the same service group).

Figure 50:
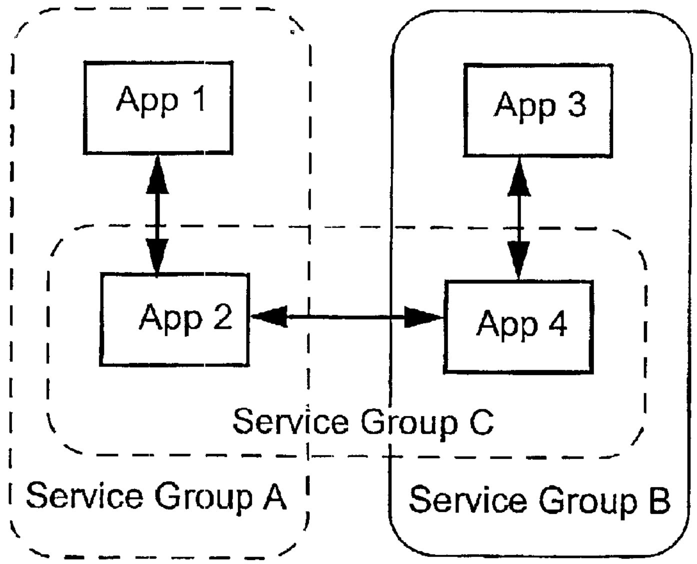
FIG. 50 illustrates the relationships between applications and service groups.

Seen in FIG. 50 is another feature of service groups within the architecture 4900, where a service group may contain one or more applications that may run as part of any other service group. These applications provide services that may be required across service groups. An example of such an application is a personal identification service that can provide the postal address and credit card details of a user (once the user has agreed to provide those details). In this respect, such a service may form a component of numerous other services or transactions that require a financial transaction, these including on-line shopping and banking.

The design of applications to support the architecture 4900 may or may not be the same as existing approaches to application design depending on whether applications developed require the new features provided by the architecture 4900. Existing applications will still function with some modification under the architecture 4900. An example of such a modification is where each application that runs under an existing architecture can be assumed to have a service group that has the same name as the running application (ie. each application forms its own service group having only one member), or some other method of choosing a group name that is unique, including not having a group name for existing applications or applications that do not work with other applications.

Applications within the same service group need not operate on the same physical hardware, and may not be able to communicate directly with each other by using operating system defined methods. Two methods of communication are preferably implemented in the event manager 4904 to provide a standard method of inter-application communication. These methods are:

(i) a datagram based protocol where a message is sent by one application to another; and (ii) a protocol based on a message board, where messages are posted by applications 4920 to a common area from which any application 4920 in the same service group are able to read the messages.

The event manager 4904 imposes no structure on the data that is passed between applications 4920. All the messages are just blocks of data of known length. Any other structure that is imposed on the data only needs to be understood by the applications of the particular service group. The blocks of data may be given types (e.g. raw data, .wav, .doc, etc.) which are stored by the event manager 4904 by the posting application.

A datagram method is used to allow the sending of arbitrary length data from one application in a service group to another application in the same service group, and require that the sending application knows the identification (ID)

number (also referred to above as the Xid) of the receiving application. The ID number is generated by the corresponding launcher 4910 when the application 4920 is started to uniquely identify that application 4920. The ID number is unique only in the context of the event manager 4904. In this fashion, many running applications can have the same ID number but every ID number will be unique amongst all the applications 4920 that are connected to the same event manager 4904 to which the particular application is connected. It is the responsibility of the corresponding launcher 4910 to ensure that this occurs, although the event manager 4904 can detect when duplicate ID numbers are about to be used and prevent the new application from starting.

To send a message using the datagram method, the sending application retrieves the Xid of the destination application from the event manager 4904 and then sends the message via the event manager 4904 to the destination application using this Xid to address the message. The event manager 4904 does nothing to the packet that contains the message except to ensure that the data length and sender fields of the header are correct.

For the datagram method to be available, the event manager 4904 must provide the applications with some method of determining what other applications are running in their service group. This information must also include some method for applications to identify what other applications are capable of. Such is performed in the architecture 4900 using a list of function strings that the application lists when the application registers with the event manager 4904. This list of functions is service specific as the event manager 4904 does not need to understand them in any way. Only other applications in the service need to understand what each function string means.

The event manager 4904 may impose some upper limit on the size of messages that can be passed using this method.

In the architecture 4900, the message board mentioned above allows data to be broadcast to all applications in the service group at once and also allows the applications in the service group to store data in a central repository. This removes the need for any one application to be always present m a service group. The message board also allows smart cards, and therefore applications in a service group, to be inserted/run in an arbitrary order. Applications post the data they contribute to the service group onto the message board and when an action needs to be taken by an application, the application can examine the message board for the data that is required.

To post data to the message board, the posting application sends to the event manager 4904 the data desired to be posted, a description string, and in some instances some form of typing information (e.g. a MIME type). If the application does not supply the type information, the event manager 4904 will assign the data a default type (e.g. default binary data, the MIME type application/octet-stream). The event manager 4904 then assigns this message a message identifier, which is used to identify the message in the message board. This message identifier is used to retrieve the message from the message board by other applications. The message identifier is also used by the posting application to remove the message from the message board. The message board, and any messages remaining on the message board corresponding to a service group are destroyed when a service group is terminated.

To retrieve a message from the message board, an application must find the message identifier of the message that is required. The application can obtain a listing of the messages on the message board, which will contain the message identifier, poster identifier and the message description of each of the messages on the board. The second method involves also obtaining a listing of running applications from the event manager 4904. This provides the application with the functions that each application provides for the service. The application requesting the message from the message board can then cross-reference the application identifier (Xid) of the application from which it needs the information, against the poster identifier on the message board, and then retrieve all messages posted by that application.

The format of both the messages and the message descriptions on the message board is decided by the service group and may be totally arbitrary. The event manager 4904 does not force any structure upon the data.

To support such a method of communication, the event manager 4904 is required to maintain the message board. To the event manager 4904, the message board appears simply as a list of known length data blocks. When an application posts a message to the message board, the event manager 4904 stores the data and its length. When an application reads a message from the message board, the event manager 4904 sends the data to the application. The event manager 4904 also creates a listing the contents of the message board for applications that request such a listing.

The event manager 4904 may limit the total size of messages that each application can post as well as the total size of all messages that can be posted by all applications in a service group, so that each application has a message size limit and each service group has a message size limit. The number of messages an application and service group may post may also be limited. The size of the descriptions of the messages may also be limited to a maximum length.

13.3 System Initialisation

This section describes the process of initially starting the system 600 incorporating the software architecture 4900 of FIG. 48. It is relevant to the computer system 600A as well as a distributed set-top box system 600B.

Firstly, the master launcher 4908 is started and listens over the network 220 for a reply over a communication port. The event manager 4904 is then started and makes a connection to the master launcher 4908.

This order of starting these two core parts of the architecture 4900 is arbitrary in the case of the system 600A, but has distinct advantages when used in a set-top box system 600B. In the system 600B the master launcher 4908 is already running when the event manager 4904 is started, it is possible to start more event managers when more users subscribe to the service, and to reduce the number of running event managers when users leave the service.

13.4 System Start-up

Figure 6A:
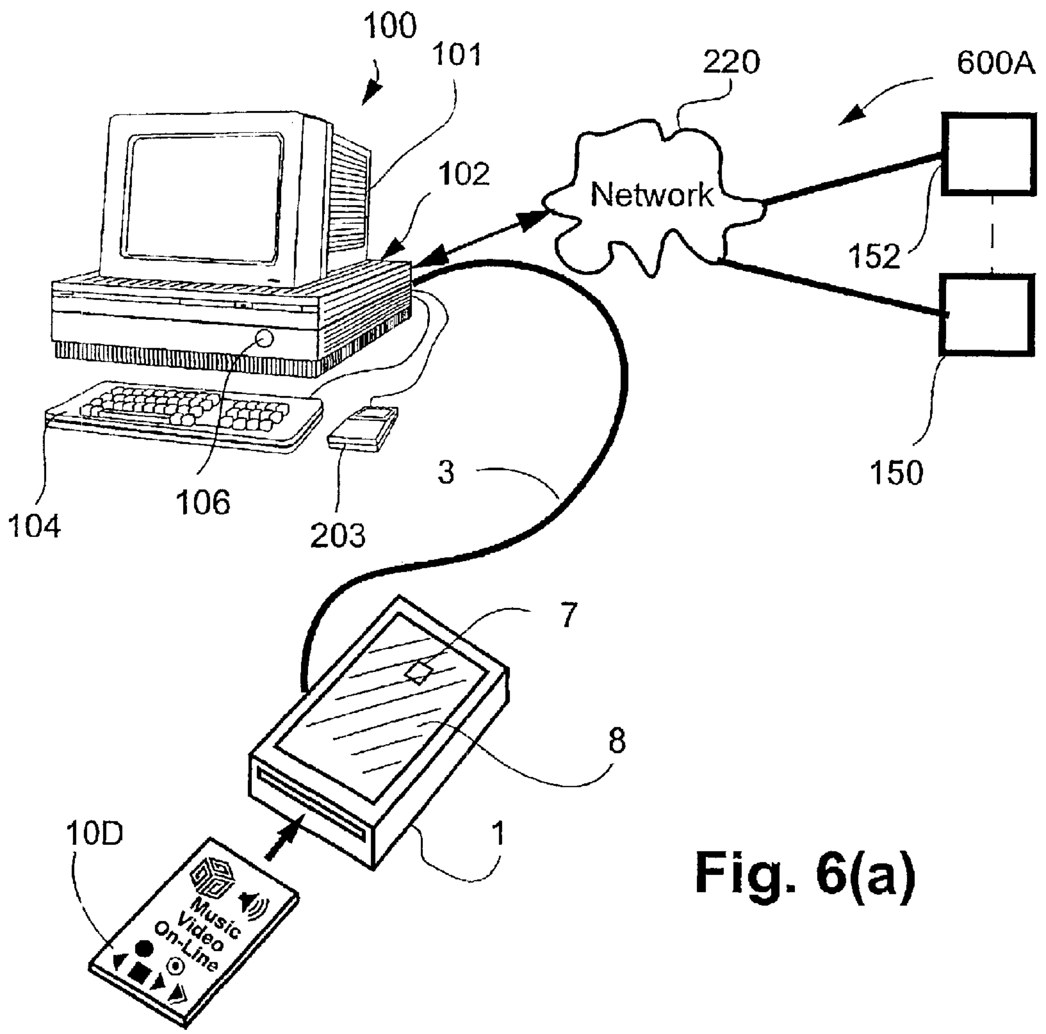
FIG. 6(*a*) shows a hardware architecture of a card interface system.
Figure 6B:
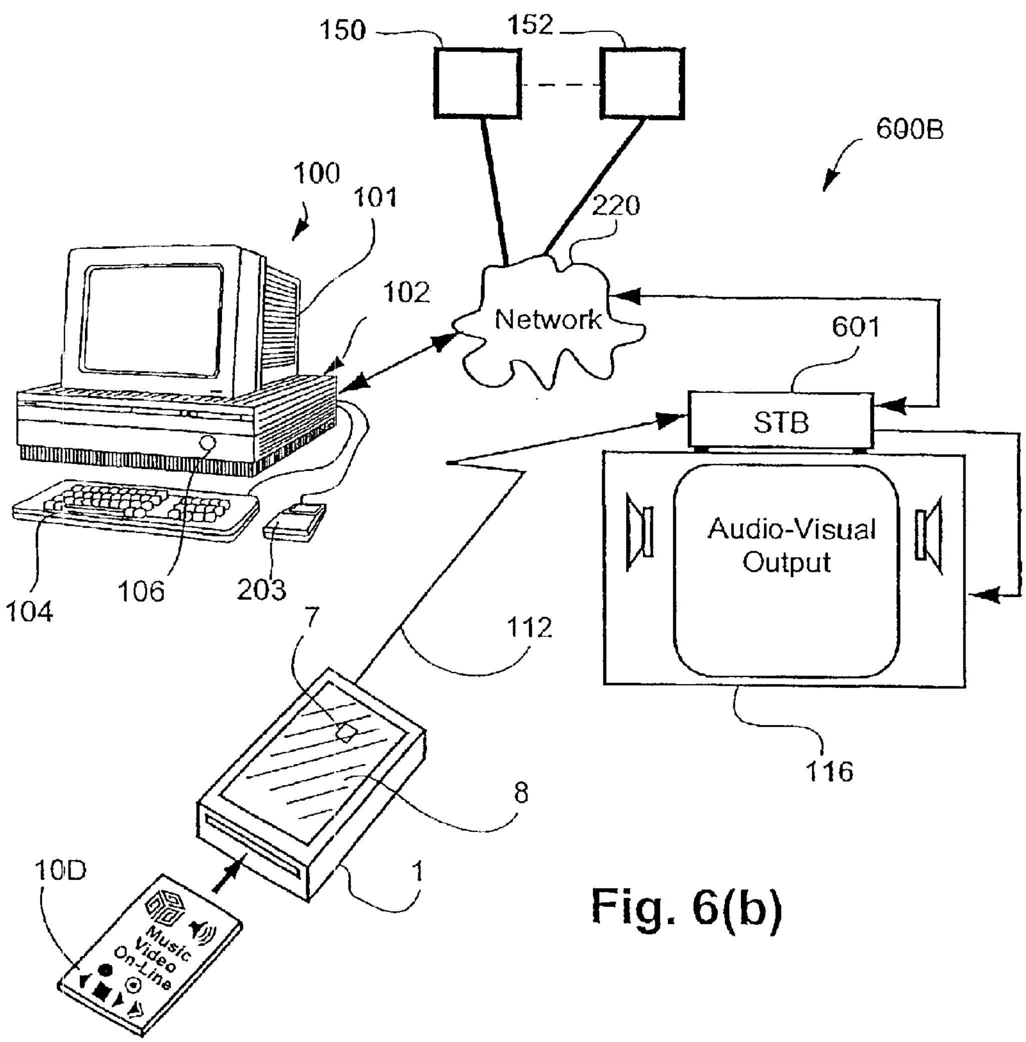

This section describes the process of starting a smart card system incorporating the hardware architecture of FIG. 6A or 6B and the alternative software architecture of FIG. 48. This description assumes that there is already an event manager 4904 and a master launcher running and they have an open connection.

(i) The I/O daemon 4902 is started and initiates a connection to the event manager 4904.

(ii) The event manager 4904 accepts the connection from the I/O daemon 4902. It is at this stage that any service accounting can be performed. For instance if the user hasn't paid the bill then the connection can be refused.

(iii) The event manager 4904 requests a new launcher 4910 from the master launcher 4908 informing the master launcher 4908 what port the event manager 4904 is listening on, and then waits for an incoming connection.

(iv) The master launcher 4908 starts a new launcher 4910 and gives the new launcher 4910 the address and port number of the event manager 4904.

(v) The new launcher 4910 initiates a connection with the event manager 4904.

(vi) The event manager 4904 accepts the connection.

The system 600 is now ready to start applications 4920 as the user inserts smart cards into the reader 1 and initiates a first button press.

13.5 Starting the First Smart Card Service

This section describes the process of starting a smart card service if no other service is running on the system 600 incorporating the software architecture of FIG. 48. This is the situation when the system is first initiated and can also occur if a service terminates, either though a time-out or because the user touched the remote 1 with no smart card 10 inserted.

(i) The user inserts the smart card 10 into the reader 1 and presses the touch panel 8.

(ii) The pressed event is sent to the event manager 4904 which reformats the packet and forwards it onto the launcher 4910.

(iii) The launcher 4910 receives the packet and recognises that no service is active and queries the directory service 4912 with the service identifier (the vendor identifier and the application identifier) and the service-specific identifier (the card identifier) of the smart card 10.

(iv) The query returns the location of the appropriate application 4920, which the launcher 4910 then fetches. The application 4920 will generally be sourced remotely from storage on a server computer somewhere in the network 220, but may need to be run locally to the launcher 4910. In advanced systems, the application may be run remotely from the launcher.

(v) The launcher 4910 informs the event manager 4904 that a new application 4920 is starting.

(vi) When the application 4920 has finished downloading to the launcher where it is to be run, it is started by the launcher 4910.

(vii) The application 4920 initiates a connection with the event manager 4904 and when the event manager 4904 has accepted the connection, the application 4920 registers with the launcher 4910. This includes what service groups that application 4920 is part of and what functions the application is capable of performing.

(viii) The launcher 4910 tells the new application 4920 that it is gaining focus.

The application 4920 at this stage has started and capable of receiving events. PRESS, RELEASE and MOVE messages generated from the reader 1 are forwarded to the applications 4920 by the event manager 4904 so long as they are intended from that application. The application 4920 cannot interact with the event manager 4904 in any way until registered has been completed. Further, the event manager 4904 will not forward events to the application and any events that are not application registration events that the event manager 4904 receives from an application 4920 that has not registered, will be discarded.

13.6 Starting, Controlling and Stopping an Application

Figure 56A:
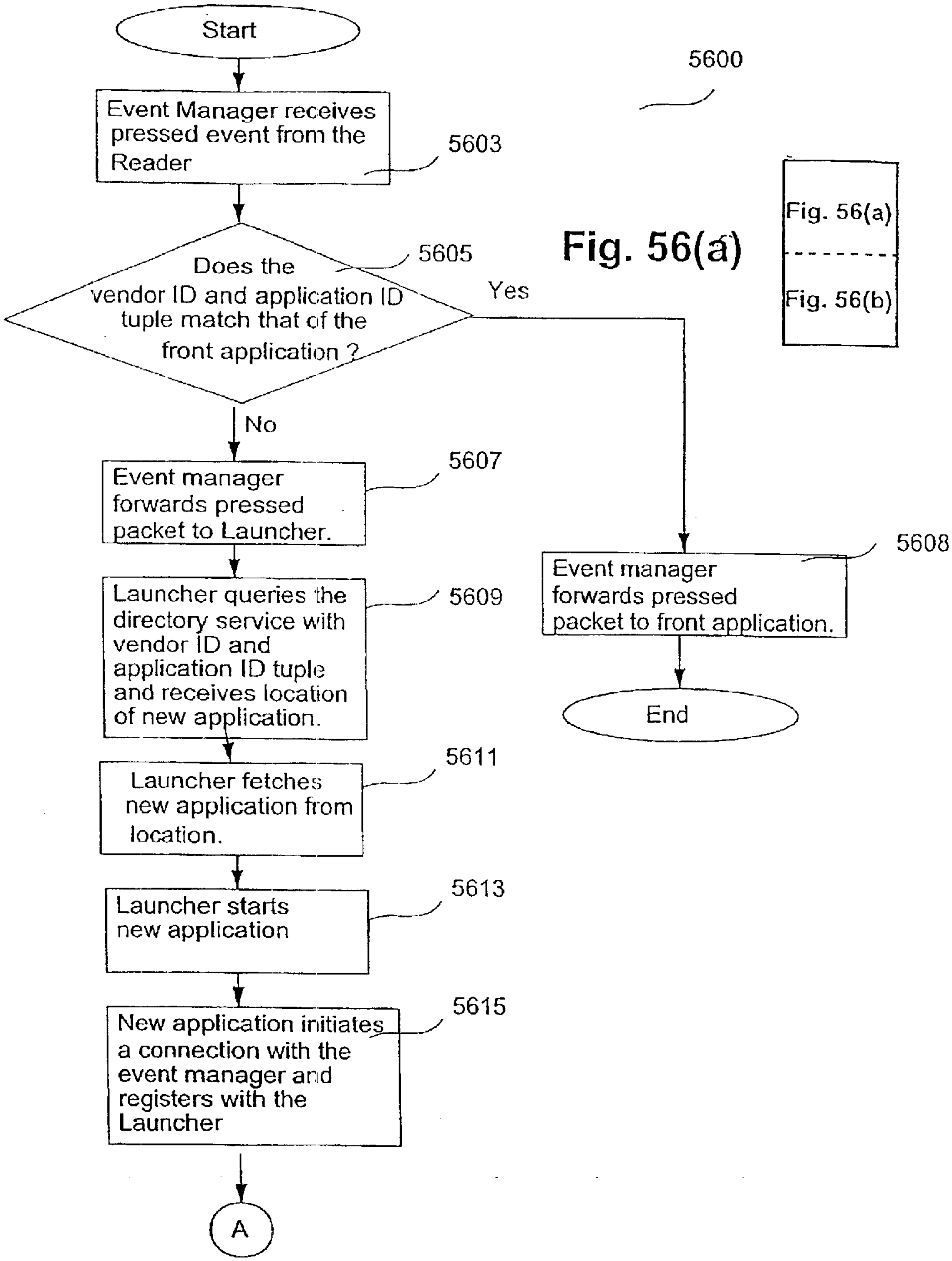
FIG. 56 shows a method of starting an application.
Figure 56B:
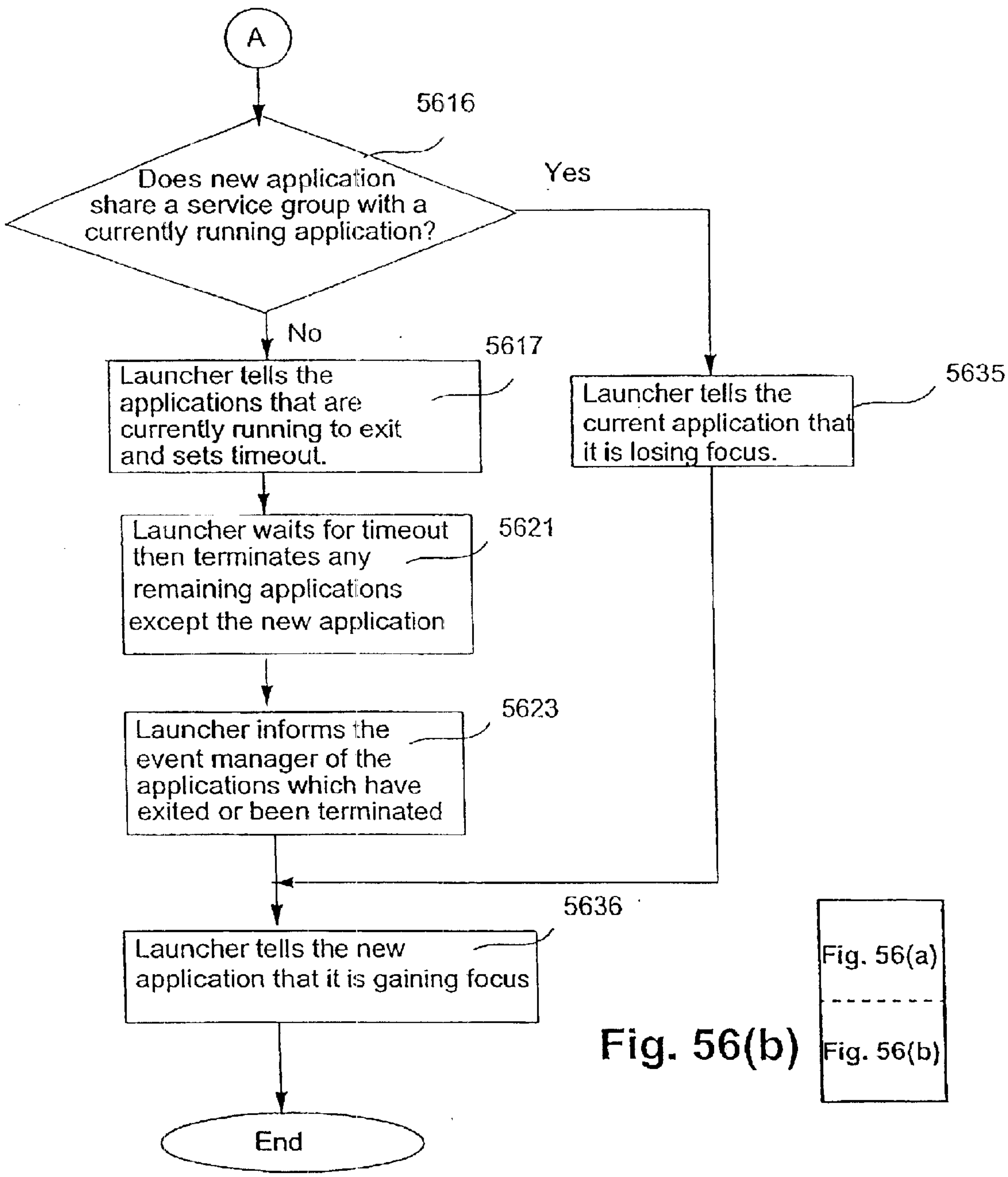

FIGS. 56(*a*) and (*b*) show a method 5600 of starting, controlling and stopping an application (a application #1–#n) of applications 4920 to provide a service to a user on the system 600 incorporating the software architecture 4900. The process of method 5600 is executed by CPU such as CPU 205 in system 600A or CPU 4305 in system 600B. A software program indicating the method 5600 is stored in a memory medium such as CD-R0M212 in system 600A or Memory 4306 in system 600B. When a user inserts the smart card 10 into the reader 1 and presses the touch panel 8 to select desired indicia, CPU45 in the reader 1 reads Card Header 1100 and data associated with the selected indicia from the smart card 10 and sends the pressed event (e.g. Press Message) associated with the selected indicia to the event manager 4904 that reformats the packet. The event manager 4904 sends the pressed packet (e.g. EM-READER PRESS) to Launcher 4910. The software program is executed by the CPU that executes at least Card Interface (Demon) 4902, Event Manager 4904, Launcher 4910 and Applications 4920 in same computing device, when Card Interface (Demon) 4902 receives the pressed event from the reader 1 and sends it to Event Manager 4904. On the other hand, if the software program is executed by each CPU in a separate computing device, a first CPU in a first computing device executing Event Manager 4904 executes steps from 5603 to 5608 and second CPU in a second computing device executing at least Launcher 4910 and applications 4920 executes steps from 5609 to 5636.

At step 5603, by executing Event Manager 4904, the CPU receives the pressed event from the reader 1 via Card Interface 4902 and at the next step 5605 the CPU determines if the Service Identifier (the vendor identifier and application identifier) in the pressed event matches that of a front application (e.g. application #1) of applications 4920 already running. If it is determined that the Service identifier matches that of the front application (e.g. application #1) using a matching table at the next step 5605, by executing Event Manager 4904 at the next step 5608 the CPU forwards the pressed packet to the front application and the method 5600 concludes. The table having a relation between each application of applications 4920 and corresponding service identifier is stored in a RAM in Memory 206 or Memory 4306. If it is determined that the service identifier does not match that of the front application at the step 5605, at the next step 5607 the CPU forwards the pressed packet from Event Manager 4904 to Launcher 4910. At the next step 5609, by executing Launcher the CPU queries the directory server 4912 with the service identifier and receives location of the new application (e.g. application #2) corresponding to the service identifier. At the next step 5611, by executing Launcher 4910, the CPU fetches the new application from the location. At the next step 5613, by executing Launcher 4910, the CPU executes the new application (e.g. application #2). At the next step 5615, the CPU initiates a connection between the new application and Event Manager 4306 and when Event Manager 4306 has accepted the connection, the CPU registers the new application with Launcher 4910 and also the application tells the Launcher 4910 which service groups it is part of. At the next step 5616, the CPU determines if the new application shares a service group with a currently running application using a service group table stored in a RAM in Memory 206 or Memory 4306. The table having a relation each service identifier and corresponding service group is stored in the RAM in Memory in Memory 206 or Memory 4306. For example, in the table, service identifier 1 (application #1) and service identifier 3 (application #3) correspond to a service group A and service identifier 2 (application #2) and service identifier 4 (application #4) correspond to a service group B. At the next step 5616 if it is determined that the new application shares the service group with the currently running application, at the next step 5635 by executing Launcher 4910 the CPU tells the current application (the front application) that it is losing focus. At the next step 5636 by executing Launcher 4910 the CPU tells the new application that it is gaining focus and the method 5600 concludes. In this case, the CPU is still executing the current application (the front application) in the background but no longer receives any events from the reader 1. By executing the current application the CPU can still send broadcast messages and messages to specific applications but cannot remove itself from service groups.

At the step 5616 if it is determined that the new application does not share the service group with the currently running application, at step 5617 by executing Launcher 4910 the CPU tells the applications that are currently running to exit and sets time-out. At the next step 5621 by executing Launcher 4910 the CPU waits for time-out then terminates any remaining applications except the new application. At the next step 5623 by executing Launcher 4910 the CPU informs the Event Manager 4904 of the applications which have exited or been terminated. At the next step 5636 by executing Launcher 410 the CPU tells the new application that it is gaining focus and the method 5600 concludes. In this case the CPU is now executing the new application and receives pressed packet such as EM-READER PRESS, EM-READER-RELEASE and EM-READEF MOVE that are intended for it. The system 600A or 600B is now running a new service with only one application within the service.]

13.7 Passing Data Between Two Applications

This section describes the process of passing data between two applications 4920 (application #1) and 4920 (application #2) using the datagram protocol on the system 600 incorporating the software architecture of FIG. 48. This method requires that the sending application #1 know the application identifier (Xid) of the receiving application #2.

(i) The sending application #1 gathers the data that it wishes to send.

(ii) The sending application #1 asks the launcher 4910 for the list of applications that are running in the current service group.

(iii) The launcher 4910 sends the application #1 the list of all applications in the current service group. This list includes the functions that each application has told the launcher 4910 that it can perform as well as the descriptive string the application provided. This list is order with the most recent application listed first.

(iv) The sending application #1 looks to see if there is a suitable recipient for the data. If there is not, then it is up to the application #1 to decide how to proceed. The application #1 could, for example, not bother sending the data, or possibly ask the user to insert another smart card 10, which will start the required application.

(v) If there is a suitable recipient then the sending application #1 sends the data to the receiving application #2 via the event manager 4904.

(vi) The event manager 4904 checks the message header to ensure that the sending application #1 has correctly filled out the data length and sender fields and then passes the message to the receiving application #2. If there is no such application #2 running, then the event manager 4904 discards the message and sends an error message back to the sending application #1.

13.8 Posting Data to a Message Board

This section describes the process of posting data to a common message board on the system 600 incorporating the software architecture 4900.

(i) The posting application 4920 gathers the data that it wishes to post on the message board.

(ii) The posting application 4920 sends the data to the event manager 4904 along with a short description of the data.

13.9 Retrieving Data from a Message Board

This section describes the process of retrieving data that has been previously been posted to the message board by another application on the system 600 incorporating the software architecture 4900.

(i) The requesting application #2 asks the event manager 4904 for a list of messages on the message board.

(ii) The event manager 4904 sends the application #2 the list of messages on the message board. This list will contain the short description of the data, the application identifier (Xid) for the application 4920 that posted the message to the message board and the message identifier for all messages on the message board.

(iii) The application #2 can then ask the event manager 4904 for a particular message by its message identifier, or the application #2 can request the list of all applications currently running from the launcher 4910.

(iv) If the application #2 has asked for the list of running applications the launcher 4910 will then send it to the application #2. This list will contain the application identifier (Xid) and the list of functions the corresponding application reported to the launcher 4910 that the corresponding application can perform.

(v) The requesting application #2 can then find all or some messages from the applications that perform the functions that it is looking for.

13.10 Removing Data from a Message Board

This section describes the process of removing data that has been previously posted to the message board by the same application, or another application on the system 600 incorporating the software architecture 4900.

(i) The requesting application #2 asks the event manager 4904 for a list of messages on the message board.

(ii) The event manager 4904 sends the application #2 the list of messages on the message board. This list will contain the short description of the data, the application identifier (Xid) of the posting application and the message identifier for all messages on the message board.

(iii) The application #2 can then ask the event manager 4904 to remove a particular message by specifying the specific message identifier.

13.11 Application Examples

EXAMPLE A: Card Orderings

A number of potential application card orderings exist that may be implemented. The architecture 4900 places no restriction on which card ordering, or combination of card orderings is adopted for an application 4920.

Figure 51A:
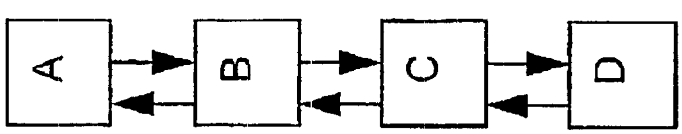
FIGS. 51A to 51C illustrates different types of card orderings within the architecture of FIG. 48.

Sequential card ordering in an service group, illustrated in FIG. 51A, requires that smart cards 10 for a particular set of applications to be inserted in a specified order. For example, card A followed by card B followed by card C, with removal and/or reinsertion following the same ordering.

Figure 51B:
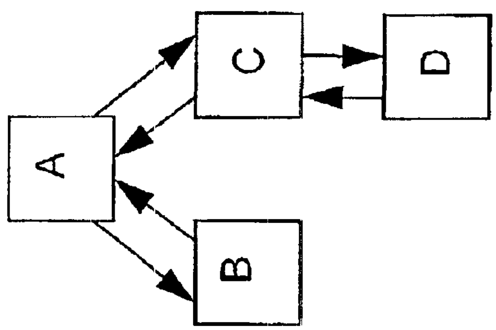
Figure 51C:
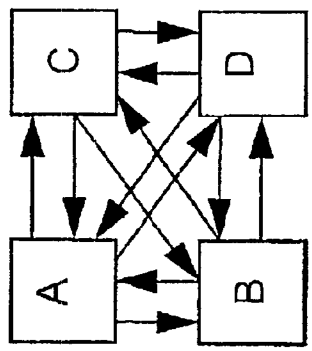

Hierarchical card ordering in a service group and requires the cards for a particular set of applications to be inserted in a tree-like fashion as illustrated in FIG. 51B where if card A is inserted, only cards B or C may be then inserted. If card B is removed, card A must be reinserted. If card C is inserted, only card D may be inserted, and if card D is removed, only card C may be inserted.

A fully-meshed card ordering in a service group permits cards for a set of applications to be inserted and used in any order.

EXAMPLE B: Pizza Ordering Service

With a prior art pizza ordering application, a number of choices for pizza type are presented (such as vegetarian, supreme and meat lovers), but no functionality is provided for customisation of the toppings or to make use of special offers.

An example set of applications that would make up a Joe's Pizzeria service group under the architecture 4900 could be as follows:

(i) Joe's Pizza Menu;

(ii) Topping Specialist;

(iii) Current Specials; and (iv) Personal identifier.

Each of these applications can be made to work with the other applications to create a fully featured pizza ordering service. The Joe's Pizza Menu application provides a user interface that allows a customer to select a pizza type (vegetarian, supreme etc.), drinks (cola, lime etc.) and side orders (garlic bread, pasta, etc.). This application also keeps a shopping-basket style list of the current order, and provides buttons on the smart card for resetting the order, and completing the order.

The Topping Specialist application provides a user interface that allows a customer to move through a list of currently ordered pizzas, and to add/remove toppings to a selected pizza from a set of toppings printed on the surface of the card. The list of pizzas available is obtained from a running Joe's Pizza Menu application. Changes made to the toppings of a pizza will propagate back to the Joe's Pizza Menu application for modification of the pizza order.

The Current Specials application provides controls to navigate through a list of current special offers available from Joe's Pizzeria. Any specials selected are communicated to a Joe's Pizza Menu application for addition to an existing order.

The Personal identifier application provides a method of selectively communicating the home address and home phone number of the user to the Joe's Pizza Menu application depending on the details that a user wishes to supply.

EXAMPLE C: Photo Lab Service

In prior art Photo Album and T-Shirt applications, a clipboard is shared (as a file) for communication of currently selected photographs. There is no facility however, for modification of a photograph (for example cropping, or increasing the brightness), or to have a number of linked cards that represent a full roll of film, with each card currently only containing a maximum of 20 photographs, each photograph being represented by an icon large enough to act as a button.

With the architecture 4900, a Photo Lab service may be designed that would have the following set of cards:

(i) Film_1*a,*

(ii) Film_1*b;*

(iii) T-Shirt printer; and (iv) Photo Enhancer.

The Film_1*a* and Film_1*b* cards represent a complete roll of Advantix (trade mark of Kodak Corp. of USA) film containing 40 photographs each, and may be inserted with either card first. Once either card is inserted, access is provided to the complete set of photographs spanning both cards with direct access to photos that are printed on the surface of the inserted card. This means that a slideshow function would cycle through the photographs corresponding to both cards. Each card would also have buttons for adding a particular photograph reference to the service group clipboard for user with another application in the Photo Lab service group, and the application would also provide a function returning a reference to the photograph currently being viewed.

The T-Shirt printer application provides the ability to either instantly print a T-Shirt transfer using the most recently viewed photograph (a reference to which is obtained from the Film application), or to compose a T-Shirt transfer from the set of photos residing on the clipboard.

As part of a simple photo editing service, the Photo Enhancer application operates on the most recently viewed photograph (obtained either from the T-Shirt application, or the Film application—whichever was most recently in the foreground). The Photo Enhancer may provide such operations as automatic crop, sharpen, blur, lighten darken etc., with the changes able to be pushed back to the photo server and made permanent.

EXAMPLE D: Video Email Service

Prior art video email applications provide a means to send video email messages to video email users appearing on the surface of the card. With some re-design it is possible to create a Video Email service according to the architecture 4900 in which an address book can be compiled of users that supply their smart card business cards to the owner of the address book. Applications forming the Video Email service are:

(i) Video Email Send;

(ii) Video Email Mailbox;

(iii) Video Email Address Book; and (iv) Business Card.

The Video Email Send application operates in much the same way as the prior art application, with the exception that an address may be obtained from an inserted personal identification card, or an inserted Business Card.

The Video Email Mailbox application provides functions for retrieving video email messages from a remote server, and can also provide the address of senders for use as a reply address with the Video Email Send application.

Address book functionality is provided by the Video Email Address Book application. This application allows a user to build up a list of addresses from different Business Cards, personal identifier cards, or Video Email Mailbox cards that have been inserted. One or more entries from the list of addresses may be selected for use with a Video Email Send application.

EXAMPLE E: Shopping Basket Service

With conventional software architectures, applications that provided online shopping needed to each maintain their own purchasing system, including a shopping basket, ordering, billing, and shipping means. A shopping basket service designed to make use of the features available as part of the architecture 4900 would allow these functions to be split out of each online shopping application, leaving more user interface area for other functions. Applications that would form part of such a Shopping Basket Service are:

(i) E-Deliver Shopping Basket;

(ii) Davy Jones Online; and (iii) Pace Bros. Online.

The E-Deliver Shopping Basket application provides an overall shopping basket management facility, payment, and ordering facilities.

Davy Jones Online, and Pace Bros. Online applications provide facilities for browsing through a list of available items for purchase, with associated item descriptions, from corresponding department stores. When an item is found that a user wants to purchase, the item can be added to the shopping basket for future ordering and delivery by way of the E-Deliver Shopping Basket application.

It will be appreciated from the forgoing, that the architecture 4900 may be used to implement a card interface system that affords expanded flexibility through sectionalising management processes and through the judicious launching of applications. This has permitted applications to be operated co-operatively to achieve a functional result. Further, such enables the various components of the architecture 4900 to be operated from hardware platforms of varying complexity through the capacity to operate procedures on platforms commensurate with their complexity. Such platforms range from low end set-top boxes with limited processing power, to home PC's, and remote server computers. Specifically, with a "dumb" set-top box, the card daemon 4902 would be run from within the set-top box and the balance of all processes from one or more remote server computers. Conversely, with a smart set-top box or home-style personal computer, all processes may be operated from within the one piece of hardware, excepting for where external communications via the network 220 is essential.

The architecture 4900 is also extensible to support security models appropriate to a particular application in order to protect both users and vendors from unauthorised data siphoning and fraud.

By virtue of the event manager 4904 acting as a conduit of event commands, the architecture is able to operate with applications developed over a range of versions of the communication protocol, as such would typically be developed over the course of time.

The architecture 4900 allows the card interface system 600 to continue to function even when card applications are not complying with expected modes of operation. This includes applications unexpectedly exiting, refusing to exit on command, and sending incorrect or excessive data to the system 600. The architecture 4900 supports multi-card applications by virtue of each card in the application belonging to the same service group, thereby ensuring that the application is maintained running when a card is removed and a new card inserted.

13.12 Application Management System

The architecture 4900 has been described above utilising the concept of service groups, their establishment, and their extinction, in order to permit multiple applications to operate simultaneously without overloading computing resources and ensuring adequate response.

Figure 55:
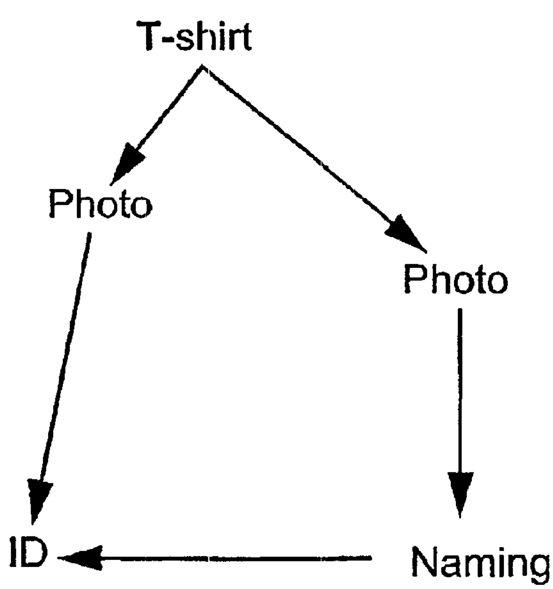
FIG. 55 shows a directed graph representation of a multi-application method.

An alternative approach in considering multiple applications arises from interpreting data flow between applications as being from producers of data to consumers of data. FIG. 55 shows a directed graph, with the graph direction flowing from consumers to producers for performing a collective function, in this case a T-shirt having a name and a photograph transferred to its surface, that data being derived from a number of other applications. The management of applications within such a graph structure depends upon the accessibility of nodes of the graph. Specifically, when a node becomes unreachable in the graph, the application at that node should be terminated, since, at that stage, that application is unable to perform a cognisant function. Further, links to a node should be removed when a consumer of that application's product de-registers for that service. When an application starts, the application is placed in the tree. If the application is a producer of a type that a consumer wants, the application is placed under that node in the tree.

As described above, the applications 4920 are referenced by their corresponding vendor identifier and application identifier which together are equivalent to the service identifier described above for the architecture 200. The application identifier (or Xid) is used as a unique key for quick matching when starting-up an already running application. There are two application identifiers, the one stored on the card with the vendor identifier and the card identifier (A card identifier is equivalent to the service-specific identifier described above with reference to the architecture 200), and one assigned by the system to applications when they start (the latter application identifier being referred to herein also as the component identifier or Xid, the former application identifier being related to the service identifier as described above).

Each application may register, using its Xid for identification, as a producer or consumer of a functionality on a needs basis. The application knows what it needs at a certain point in time by way of user interaction. For example, the user may navigate through the application to an "add photo" screen, at which point the application may register as a photo consumer. Registration in this regard is preferably be on the basis of a functionality, rather than a service group, as a service group approach would be too general for practical purposes. Further, such wouldn't allow an application to be linked to another in a consumer/producer relationship when the producer may not be able to provide the specific service that the producer requires unless all the applications in a service group support all functionality's offered by that service group.

Such a model presents two options for implementation, since an application may require two or more functions from any other applications:

1. Each node in the graph has only one connection to any other node. This means that the connection must also contain a list of the service included in the consumer/producer relationship. Each time a consumer de-registers for a service the list entry is removed. When the list of services for a connection becomes empty, the connection is removed. When a connection is removed, any producer that is linked by that connection is also checked. If the producer node is no longer connection to any other, that node may be removed.
2. This option is similar to (1) above except that instead of keeping a list of services, each specific service is a separate connection between the consumer/producer node. Thus, there may be multiple connections between two applications. When a consumer de-registers for a service, that connection is removed. If the producer is no longer connected, the consumer is terminated.

Such proposals are problematic in that each allows the application associated with the smart card presently in the reader 1 to be terminated by an event other than a specific user action. This may be confusing from the user point of view. An alternative approach to termination of an application is therefore desired.

In such an alternative approach, the architecture 4900 may be operated without specific dependence upon any application 4920 being a member of a specific service group as described above, but through the transient formation of what is referred to herein as a "dominant" service group. A dominant service group arises from any transient functional relationship between two or more current applications being determined from whether any application 4920 is classed as either a producer, a consumer, both a producer and consumer, or neither a producer nor a consumer.

Such a management system for the applications 4920 revolves around the concept of the "dominant" service group being formed when a producer/consumer pair of applications, or a single application where that application meet both criteria, in the same service group are registered. For example simultaneous operation of applications Ac and Ap will cause service group A to be dominant and satisfies a producer-consumer pair, whereas AcBp or ApBc whilst satisfying a producer-consumer pair, will not create a dominant service group. According to the management system, when a dominant service group is formed, all applications not sharing that group are terminated. The dominant service group may exist in conjunction with a second dominant service group, provide both are registered simultaneously. For example, if Application#1 starts and registers ApBp and Application#2 starts and registers AcBc, A and B are then dominant. For two or more dominant service groups to exist, they must be formed when a new application starting registers for each group establishing a producer-consumer pair. A producer/consumer pair of applications forming a service group registered after a dominant service group becomes a "subsidiary" of the dominant group. A subsidiary group of a subsidiary group may also be formed. A subsidiary of a subsidiary is formed when a producer of the subsidiary that was already registered as a consumer for the second subsidiary.

The net effect of such a management structure is the creation, and subsequent dismantling, of a tree or graph of interacting applications that pass data there between to achieve a final result desired by the user. Specifically, such a result may not be readily apparent from on the face of the applications being utilised, in contrast to Example B above for the pizza ordering service. This application management structure is best described with reference to the examples below.

The examples below make reference to a number of applications, details of which are described in Table 4 below.

TABLE 4

| Card Application Name | Description | Service Group Member (p = producer, c = consumer, iv = neither) |
|---|---|---|
| ID1 | Identification detail card | Zp Cp |
| ID2 | Identification detail card | Zp Qp |
| PhotoID | photograph identification card | Zp Qp Ap |
| Photo 1 | photograph card | Ap Fp |
| Photo 2 | photograph card | Mp Ap |
| PIN | personal identification number card | Pp |
| Bank | electronic banking card | Bn |
| Pizza | pizza ordering card | Rn |
| T-shirt | T-shirt manufacture | Tp |
| CardMaker | card used for making other cards | Sp |

Figure 53A:
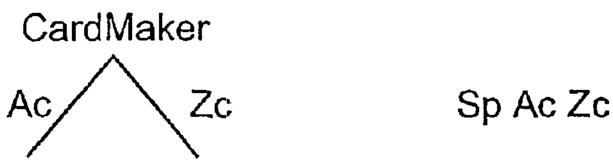
FIGS. 53A to 53E illustrate an example of a multi-card application structure.
Figure 53B:
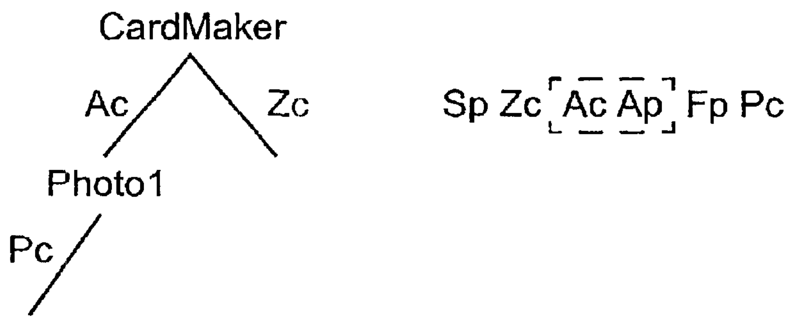
Figure 53C:
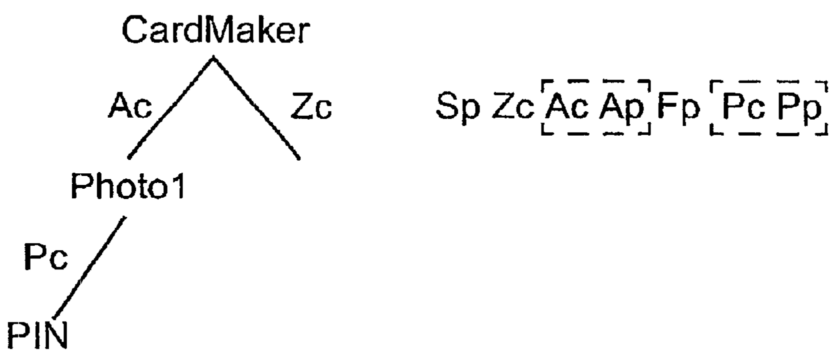
Figure 53D:
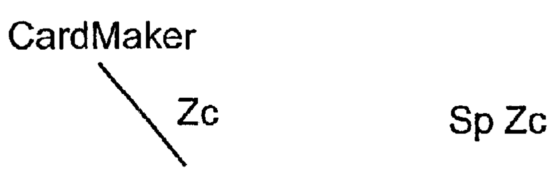
Figure 53E:

EXAMPLE F:

In this example, it is desired by the user to create a greeting card having the recipient's name, a standard message, and a photograph on the card. A first step using the cards of Table 4 would be for the user to insert the CardMaker application card into the reader 1. Such an action commences that application and registers that application as a consumer of service groups A and Z. Applications may dynamically change their service group membership. For example, CardMaker may start and present the user with a screen display asking if the user wants to make a card identical to the card created on a previous occasion. Upon answering "NO", CardMaker registers as a consumer for ID1 and Photo1 since a new card will be made. A process tree for this stage appears as shown in FIG. 53A. Next, the user knows that a photograph is required, and provides that photograph by removing the CardMaker application and by inserting the Photo1 application. The CardMaker application remains in operation upon removal from the reader 1 since, its processes have yet to perform a function. The insertion of Photo1 application crates a dominant service group in Ac and Ap as illustrated, meaning that the CardMaker application requires a photograph and the Photo1 application can supply that photograph. The Photo1 application, requires a PIN to access the photograph and the arrangement is thus as represented in FIG. 53B. Not all photographs on the Photo1 card may require a PIN to unlock them for use, so Photo1 only registers as Pc when it requires a PIN to proceed, such as in the present case. The PIN card is then provided according to FIG. 53C. As seen from FIG. 53C, a second producer-consumer pair is formed, and in this case the provision of the PIN, allows the Photo1 card to supply the photograph selected by the user to the CardMaker application. Those tasks having been completed, the left branch of the process tree is extinguished and those corresponding "performed" applications de-register from the event manger 4904, as shown in FIG. 53D. The next step to complete the process is to insert a card having the desired name, which in this case comes from the application ID1 as shown in FIG. 53E. This application supplies the required name and the CardMaker application is thus satisfied, thereby permitting all other applications to de-register and terminate. The CardMaker application can then output the required card without interaction with any other application.

In an alternative approach, the PIN application may be required to access both the photograph and the name. As such, the PIN application card need only be inserted the once only if the PIN for both photo cards is the same, and a process tree such as that shown in FIG. 54 may be formed. In this example PhotoID and Photo1 are used since PhotoID may have a picture of the recipient of the card being made, and Photo1 may have an attractive background picture to place over the photo.

Figure 54:
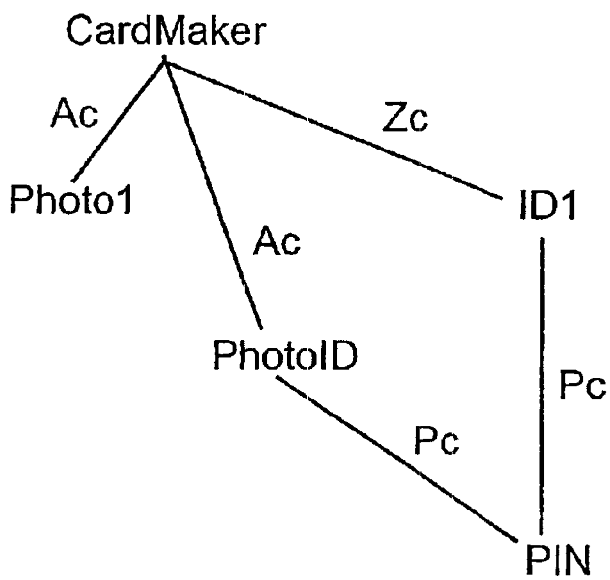
FIG. 54 shows an alternative approach to achieve the end of FIGS. 53A to 53E.

FIG. 54 demonstrates that multiple links to nodes in the process tree are permitted, and that applications on unreachable nodes (being those with no links) are terminated.

Preferably, an upper limit on running applications is set to be seven (7). If this number is exceeded, termination of applications commences with the oldest leaf application in the process tree.

The foregoing describes only some arrangements and variations on those arrangements of the present invention, and modifications and/or changes can be made thereto without departing from the scope and spirit of the invention, the embodiments being illustrative and not restrictive.

What is claimed is:

1. An interface card comprising:

a substrate with a plurality of indicia formed thereon, said card being configured for insertion into a receptacle of a card read device; and a memory for storing first data identifying one of said indicia, said first data being transmitted to a service providing apparatus upon selection of said one indicia, wherein second data identifying said interface card is transmitted to said service providing apparatus multiple times between an insertion and a subsequent removal of said interface card from said receptacle of said card read device, said service providing apparatus being configured to provide a service based on said first data and said second data.

2. An interface card according to claim 1, wherein said second data is transmitted to said service providing apparatus upon selection of said one indicia.

3. An interface card according to claim 1, wherein said second data is transmitted to said service providing apparatus upon said selection of said indicia being released.

4. An interface card according to claim 1, wherein said second data is transmitted to said service providing apparatus upon said interface card being inserted into said card read device.

5. An interface card according to claim 1, wherein said second data is transmitted to said service providing apparatus upon said interface card being removed from said card read device.

6. An interface card according to claim 1, wherein said second data is transmitted to said service providing apparatus upon a position of said indicia selection moving.

7. An interface card according to claim 6, wherein said second data is a service identifier.

8. An interface card according to claim 7, wherein said service identifier is set by a vendor for us by an application.

9. An interface card according to claim 8, wherein said service identifier is assigned to said vendor by a central authority.

10. An interface card according to claim 1, wherein said second data is a pseudo-random number.

11. An interface card according to claim 1, wherein said second data is incremented each time said control template is inserted into said receptacle.

12. An interface card according to claim 1, wherein said service providing apparatus is a personal computer.

13. A control template configured for insertion into a receptacle of a card read device, said template comprising:

an electronic card formed of a substrate having associated therewith a memory device;

a plurality of indicia arbitrarily formed on said substrate; and first data stored within said memory device, said first data identifying one of said indicia and being transmitted to a service providing apparatus upon selection of said one indicia, wherein second data identifying said control template is transmitted to said service providing apparatus multiple times between an insertion and a subsequent removal of said control template from said receptacle of said card read device, said service providing apparatus being configured to provide a service based on said first data and said second data.

14. A control template according to claim 13, wherein said second data is transmitted to said service providing apparatus upon selection of said one indicia.

15. A control template according to claim 13, wherein said second data is transmitted to said service providing apparatus upon said selection of said indicia being released.

16. A control template according to claim 13, wherein said second data is transmitted to said service providing apparatus upon said electronic card being inserted into said card read device.

17. A control template according to claim 13, wherein said second data is stored in said memory device of said control template.

18. A control template according to claim 13, wherein said service providing apparatus is a set-top-box.

19. A method of providing a service, to be received from a service providing apparatus, using an interface card, said interface card comprising a substrate with a plurality of indicia formed thereof and being configured for insertion into a receptacle of a card read device, said method comprising the steps of:

transmitting first data identifying one of said indicia to said service providing apparatus upon selection of said one indicia, and transmitting second data identifying the interface card to said service providing apparatus multiple times between an insertion and a subsequent removal of said interface card from said receptacle of said card read device, wherein said service is provided by said service providing apparatus based on said first data and said second data.

20. A method according to claim 19, wherein said second data is transmitted to said service providing apparatus upon selection of said one indicia.

21. A method according to claim 19, wherein said second data is transmitted to said service providing apparatus upon said selection of said indicia being released.

22. A method according to claim 19, wherein said second data is transmitted to said service providing apparatus upon said interface card being inserted into said card read device.

23. A method according to claim 19, wherein said second data is transmitted to said service providing apparatus upon said interface card being removed from said card read device.

24. A method according to claim 19, wherein said second data is transmitted to said service providing apparatus upon a position of said indicia selection moving.

25. A method according to claim 19, wherein said second data is a service identifier.

26. A method according to claim 25, wherein said service identifier is set by a vendor for use by an application.

27. A program that when executed by a computer performs a method for providing a service, to received from a service providing apparatus, using an interface card, said interface card comprising a substrate a plurality of indicia formed thereon and being configured for insertion into a receptacle of a card read device, said program comprising the steps of:

transmitting first data identifying one of said indicia to said service providing apparatus upon selection of said one indicia; and transmitting second data identifying the interface card to said service providing apparatus multiple times between an insertion and a subsequent removal of said interface card from said receptacle of said card read device, said service being provided by said service providing apparatus based on said first data and said second data.

28. A program according to claim 27, wherein said second data is transmitted to said service providing apparatus upon selection of said one indicia.

29. A program according to claim 27, wherein said second data is transmitted to said service providing apparatus upon said selection of said indicia being released.

30. A program according to claim 27, wherein said second data is transmitted to said service providing apparatus upon said interface card being inserted into said card read device.

* * * * *

UNITED STATES PATENT AND TRADEMARK OFFICE

CERTIFICATE OF CORRECTION

PATENT NO. : 6,978,933 B2
APPLICATION NO. : 10/363217
DATED : December 27, 2005
INVENTOR(S) : Sue-Ken Yap et al.

It is certified that error appears in the above-identified patent and that said Letters Patent is hereby corrected as shown below:

DRAWINGS:
Sheet 49, Figure 58, "Is there an entry in the directory mapping table for" should read -- Is there an entry in the directory mapping table for Service ID? --.

COLUMN 3:
Line 11, delete "card"; and
Line 30, delete "a" (second occurrence).

COLUMN 21:
Line 53, "user" should read -- User --.

COLUMN 30:
Line 57, "pane 18" should read -- panel 8 --.

COLUMN 32:
Line 19, "it's" should read -- its --.

COLUMN 33:
Line 60, "becoming" should read -- become --.

COLUMN 35:
Line 1, "EM_EVENT_MANGER_XID" should read -- EM_EVENT_MANAGER_XID --.

COLUMN 36:
Line 14, "set" should read -- sent --.

COLUMN 43:
Line 57, "interface" should read -- interfaced --.

COLUMN 54:
Line 13, "examples" should read -- example --; and
Line 22, "alternatively," should read -- alternative, --.

COLUMN 56:
Line 13, "has" should read -- have --.

COLUMN 61:
Line 41, "m" should read -- in --.

UNITED STATES PATENT AND TRADEMARK OFFICE

CERTIFICATE OF CORRECTION

PATENT NO. : 6,978,933 B2
APPLICATION NO. : 10/363217
DATED : December 27, 2005
INVENTOR(S) : Sue-Ken Yap et al.

It is certified that error appears in the above-identified patent and that said Letters Patent is hereby corrected as shown below:

COLUMN 62:
Line 23, "listing" should read -- listing of the --.

COLUMN 63:
Line 15, "though" should read -- through --;
Line 51, "and capable" should read -- and is capable --;
Line 57, "registered" should read -- registration --; and
Line 64, "(a" should read -- (an --.

COLUMN 64:
Lines 14 and 16, "(Demon)" should read -- (Daemon) --.

COLUMN 65:
Line 21, "Launcher 410" should read -- Launcher 4910 --;
Line 28, "service.]" should read -- service. --; and
Line 46, "order" should read -- ordered --.

COLUMN 66:
Line 53, "an" should read -- a --; and
Line 59, "and" should be deleted.

COLUMN 67:
Line 67, "user" should read -- use --.

COLUMN 70:
Line 23, "producer" should read -- consumer --;
Line 25, "ality's" should read -- alities --; and
Line 37, "connection" should read --connected --.

COLUMN 71:
Line 7, "provide" should read -- provided --.

COLUMN 72:
Line 4, "crates" should read -- creates --;
Line 18, "manger" should read -- manager --; and
Line 28, "the" (second occurrence) should be deleted.

COLUMN 73:
Line 15, "us" should read -- use --.

UNITED STATES PATENT AND TRADEMARK OFFICE

CERTIFICATE OF CORRECTION

PATENT NO. : 6,978,933 B2
APPLICATION NO. : 10/363217
DATED : December 27, 2005
INVENTOR(S) : Sue-Ken Yap et al.

It is certified that error appears in the above-identified patent and that said Letters Patent is hereby corrected as shown below:

<u>COLUMN 74</u>:
Line 34, "to received" should read -- to be received --; and
Line 36, "substrate a" should read -- substrate with a --.

Signed and Sealed this

Twenty-sixth Day of December, 2006

JON W. DUDAS
*Director of the United States Patent and Trademark Office*